April 14, 1959 R. B. TROUSDALE 2,882,341

TELEPHONE SYSTEM

Filed July 28, 1952 35 Sheets-Sheet 1

INVENTOR.
Robert B. Trousdale
BY T. L. Bowes
Attorney

INVENTOR.
Robert B. Trousdale
BY
T. L. Bowes
Attorney

April 14, 1959 R. B. TROUSDALE 2,882,341

TELEPHONE SYSTEM

Filed July 28, 1952 35 Sheets-Sheet 3

INVENTOR.
Robert B. Trousdale
BY T. L. Bowes
Attorney

April 14, 1959 R. B. TROUSDALE 2,882,341

TELEPHONE SYSTEM

Filed July 28, 1952 35 Sheets-Sheet 4

INVENTOR.
Robert B. Trousdale
BY
T. L. Bowes
Attorney

April 14, 1959 R. B. TROUSDALE 2,882,341

TELEPHONE SYSTEM

Filed July 28, 1952 35 Sheets-Sheet 5

INVENTOR.
Robert B. Trousdale
BY T. L. Bowes
Attorney

INVENTOR.
Robert B. Trousdale
BY T. L. Bowes
Attorney

INVENTOR.
Robert B. Trousdale
BY J. L. Bowes
Attorney

April 14, 1959 R. B. TROUSDALE 2,882,341

TELEPHONE SYSTEM

Filed July 28, 1952 35 Sheets-Sheet 8

INVENTOR.
Robert B. Trousdale
BY
T. L. Bowes
Attorney

INVENTOR.
Robert B. Trousdale
BY T. L. Bowes
Attorney

TELEPHONE SYSTEM

Filed July 28, 1952 35 Sheets-Sheet 10

INVENTOR.
Robert B. Trousdale
BY T. L. Bowes
Attorney

April 14, 1959 R. B. TROUSDALE 2,882,341

TELEPHONE SYSTEM

Filed July 28, 1952 35 Sheets-Sheet 11

INVENTOR.
Robert B. Trousdale
BY J. L. Bowes
Attorney

April 14, 1959 R. B. TROUSDALE 2,882,341

TELEPHONE SYSTEM

Filed July 28, 1952 35 Sheets-Sheet 12

INVENTOR.
Robert B. Trousdale
BY T. L. Bowes
Attorney

April 14, 1959 R. B. TROUSDALE 2,882,341

TELEPHONE SYSTEM

Filed July 28, 1952 35 Sheets-Sheet 13

INVENTOR.
Robert B. Trousdale
BY T. L. Bowes
Attorney

INVENTOR.
Robert B. Trousdale
BY T. L. Bowes
Attorney

Conversation Timing Pulse Generator ~ 57

INVENTOR.
Robert B. Trousdale
BY T. L. Bowes
Attorney

April 14, 1959 R. B. TROUSDALE 2,882,341

TELEPHONE SYSTEM

Filed July 28, 1952 35 Sheets-Sheet 16

INVENTOR.
Robert B. Trousdale
BY T. L. Bowes
Attorney

April 14, 1959 R. B. TROUSDALE 2,882,341

TELEPHONE SYSTEM

Filed July 28, 1952 35 Sheets-Sheet 17

INVENTOR.
Robert B. Trousdale
BY T. L. Bowes
Attorney

INVENTOR.
Robert B. Trousdale
BY
J. L. Bowes
Attorney

INVENTOR.
Robert B. Trousdale
BY J. L. Bowes
Attorney

INVENTOR.
Robert B. Trousdale
BY
T. L. Bowes
Attorney

Line Circuit - 16

INVENTOR.
Robert B. Trousdale
BY T. L. Bowes
Attorney

Harmonic Ringing Modulator Circuit-100

INVENTOR.
Robert B. Trousdale
BY
T. L. Bowes
Attorney

April 14, 1959 R. B. TROUSDALE 2,882,341

TELEPHONE SYSTEM

Filed July 28, 1952 35 Sheets-Sheet 23

Trunk Marking Pulse Generator-56

INVENTOR.
Robert B. Trousdale
BY T. L. Bowes
Attorney

April 14, 1959 R. B. TROUSDALE 2,882,341

TELEPHONE SYSTEM

Filed July 28, 1952 35 Sheets-Sheet 24

Trunk Marking Pulse Generator-56

INVENTOR.
Robert B. Trousdale
BY T. L. Bowes
Attorney

INVENTOR.
Robert B. Trousdale
BY
T. L. Bowes
Attorney

INVENTOR.
Robert B. Trousdale
BY
T. L. Bowes
Attorney

Harmonic Ringing Frequency Generator-98

INVENTOR.
Robert B. Trousdale
BY J. L. Bowes
Attorney

Harmonic Ringing Frequency Generator-98

INVENTOR.
Robert B. Trousdale
BY
T. L. Bowes
Attorney

Harmonic Ringing Amplifier & Supply Circuit-101

INVENTOR.
Robert B. Trousdale
BY T. L. Bowes
Attorney

INVENTOR.
Robert B. Trousdale
BY
T. L. Bowes
Attorney

April 14, 1959 R. B. TROUSDALE 2,882,341

TELEPHONE SYSTEM

Filed July 28, 1952 35 Sheets-Sheet 31

INVENTOR.
Robert B. Trousdale
BY
T. L. Bowes
Attorney

INVENTOR.
Robert B. Trousdale
BY T. L. Bowes
Attorney

INVENTOR.
Robert B. Trousdale
BY
T. L. Bowes
Attorney

INVENTOR.
Robert B. Trousdale
BY
T. L. Bowes
Attorney

April 14, 1959 R. B. TROUSDALE 2,882,341

TELEPHONE SYSTEM

Filed July 28, 1952 35 Sheets-Sheet 35

INVENTOR.
Robert B. Trousdale
BY
T. L. Bowes
Attorney 2,882,341

TELEPHONE SYSTEM

Robert B. Trousdale, Rochester, N.Y., assignor, by mesne assignments, to General Dynamics Corporation, a corporation of Delaware Application July 28, 1952, Serial No. 301,215
46 Claims. (Cl. 179—18)

The present invention relates to improved methods and apparatus for selectively setting up signal transmission connections between the lines of a signalling system, and, more particularly, to improved methods and apparatus for setting up two-way communication connections between the lines of an automatic telephone system wherein special service features are provided. Specifically, the present invention is directed to certain improvements in a fully automatic telephone system of the improved form disclosed and claimed in a copending application of Robert B. Trousdale and Frank A. Morris, Serial No. 134,974, filed on December 24, 1949, issued December 11, 1956, as U.S. Letters Patent No. 2,773,934, and assigned to the same assignee as the present invention, whereby the special service features of trunk hunting, timing out links at the end of a predetermined period, and fully harmonic or semi-selective harmonic ringing on a party line basis may be accomplished.

Many types of automatic switching apparatus have been proposed and developed for transmitting signals between the lines of telephone, telegraph, and other communication systems. In the main, the apparatus proposed and developed for this purpose utilizes electromechanical devices embodying moving mechanical parts, such, for example, as relays, stepping switches, and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations various proposals have been made for utilizing electronic facilities, such, for example, as cathode ray tubes, for the purpose of transmitting signals between the lines of a signalling system on a selective basis. However, most, if not all, of these proposals are limited to arrangements for providing one-way signal transmission between two lines and include no provisions whatever for performing special service features, such, for example, as trunk hunting, restricted service and conversation timing, which have come to be considered as indispensable in the present state of the electromechanical telephone system art and without which the electronic system is completely unable to compete with the present-day electromechanical system on an economical and practical basis.

It is an object of the present invention, therefore, to provide new and improved methods and apparatus for selectively setting up two-way communication connections between any pair of lines of a signalling system wherein one or more of the above-enumerated special service features is provided.

It is another object of the present invention to provide an automatic telephone system capable of providing all of the services of electromechanical switch-type systems, including trunk hunting service, conversation timing service, and harmonic ringing party line service, but which consists exclusively of electron conducting devices such, for example, as electron tubes, gas tubes, crystal rectifiers, semi-conductors, and the like, together with interconnecting circuit components therefor.

It is still another object of the present invention to provide a new and improved electronic telephone system wherein facilities are provided for imposing certain restrictions on the use of one group of lines of the system without imposing the same restrictions on another group of lines of the system.

It is a further object of the present invention to provide an electronic telephone system wherein party line ringing facilities are provided for transmitting a party line ringing signal over the called substation associated with the called line and wherein the party line ringing facilities are employed for timing the duration of the conversation after the called line answers.

It is still another object of the present invention to provide a new and improved electronic telephone system wherein the connection is interrupted after a predetermined conversation timing interval and wherein the calling and called line subscribers are notified of the approaching end of the conversation by means of a warning tone signal a predetermined time interval before the connection is interrupted.

According to a still further object of the invention, an improved electronic telephone system is provided which is fully automatic in operation and is adapted for special service features, which compares favorably in first cost with electromechanical systems of the same capacity and requires a minimum of special circuit components in the construction thereof, and yet is capable of providing reliable service with a minimum amount of maintenance.

The invention both as to its organization and method of operation together with further objects and advantages thereof will best be understood by reference to the following specification taken in connection with the accompanying drawings in which:

Figs. 1, 2, 3, and 4, when arranged in the manner shown in Fig. 5 diagrammatically illustrate an automatic telephone system characterized by the features of the present invention;

Figs. 2A, 2B, and 2C, when laid side by side in the order named diagrammatically illustrate the components of one of the finder-connector links embodied in the system shown in Figs. 1 to 4, inclusive;

Figs. 6 to 26, when arranged in the manner shown in Fig. 27 illustrate certain details of the system shown in Figs. 1 to 4, inclusive;

Figs. 28, 29, 30, and 31, when laid side by side in the order named graphically illustrate the time relationships between certain of the pulses developed by and utilized in the various components of the system;

Fig. 32 graphically illustrates the time relationships between certain waveforms developed by the harmonic ringing facilities of the system shown in Figs. 1 to 4, inclusive, and Fig. 33 graphically illustrates the time relationships between certain of the pulses developed by and utilized in the trunk hunting facilities of the system shown in Figs. 1 to 4, inclusive.

In general the electronic telephone system herein disclosed is capable of serving 100 lines, each of which lines may have associated therewith a number of party line substations up to a maximum of ten such party line substations for each line. More specifically, the system is capable of providing two-way communication between any two lines of a 100 line group and on either a private or party line basis, and includes entirely novel facilities for performing the special service functions of:

(1) Trunk hunting in response to a call directed to a called line trunk group until an idle trunk within the called trunk group is found and the transmission of a busy tone signal to the calling substation in the event all of the trunks in the called trunk group test busy.

(2) Fully selective or semi-selective harmonic ringing of the party line substations connected to the called line in accordance with the ringing frequency and code assigned to the called party line substation.

(3) Initiation of a conversation timing period of predetermined duration as soon as the called line subscriber answers, the transmission of a warning tone signal over the calling and called lines after approximately 90% of the conversation period has elapsed to inform the calling and called line subscribers that the call is about to be terminated, and the automatic termination of the call at the end of the conversation timing period irrespective of any action on the part of the calling and called line subscribers.

All of the above functions are accomplished on a fully automatic basis without the use of any relays, stepping switches, or other equivalent mechanical devices having moving parts. With the exception of the line circuits, all equipment provided in the system to perform the described functions is common to the lines of the system, whether private or party, thus minimizing duplication of system components.

Basically the present improved system utilizes a system of multiplexing, namely pulse sampling effectively at an ultrasonic rate of the control and intelligence signals produced at each substation of the system, to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

In order to provide for harmonic ringing of different ones of the substations associated with any one of the lines of the system in accordance with party line ringing signals of different frequencies which are assigned to these substations on a decimal basis, a party line ringing signal cycle having a duration of approximately 7½ seconds is established during which five different pairs of coded party line ringing signals of different frequencies are produced and may be selected in the connector on a third or party line digit basis to effect ringing of different pairs of substations associated with the called line in accordance with the particular party line code ring assigned to the particular called substation.

GENERAL DESCRIPTION OF THE SYSTEM

Referring now to the drawings and more particularly to Figs. 1, 2, 3, and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a distributor 15 of which only one is required in the system and the common equipment indicated generally at 17 in Fig. 4 of the drawings. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate two two-conductor lines which are respectively identified by the designations 23 and 32. The lines 23 and 32 may be used for either private or party line service. In the illustrated embodiment the line 23 is shown as a private line and accordingly extends only to the single substation A having the directory number designation No. 231, the last digit "1" being added to provide uniform directory numbering. On the other hand, the line 32 is shown as a party line and extends to a series of ten parallel connected substations A', B', C'–J', inclusive, having respectively assigned thereto the directory number designations No. 321, No. 322, No. 323–No. 320, inclusive.

In the system of the present invention facilities are provided for party line ringing on either a fully selective or semi-selective harmonic ringing basis. Thus, if a maximum of five substations are connected to one of the lines of the system, a fully selective harmonic party line ringing system is employed wherein each of the substations is provided with ringing facilities which respond to different ringing frequencies. Each of the five substations is assigned a different ringing period of 1½ seconds' duration, which ringing periods recur in successive ringing cycles of 7½ seconds' duration. Thus, any one of the five substations is rung for a period of 1½ seconds followed by a period of 6 seconds of silence and only the particular substation which responds to the ringing frequency transmitted during a particular ringing period is rung.

If more than five substations, up to a maximum of ten substations, are associated with one of the lines of the system, a semi-selective harmonic ringing service is provided wherein pairs of substations are provided with ringing facilities which respond to the same ringing frequency and each ringing period is coded to provide either one long ring or two short rings during the particular ringing period assigned to each pair of substations. With this arrangement two substations are rung simultaneously with either a long ring of 1½ seconds or two short rings of ½ second duration separated by ½ second of silence, and the called line subscribers distinguish between their own calls and that of the other subscriber assigned the same ringing frequency by determining whether it is one long or two short rings.

Also in the system of the present invention facilities are provided for private branch exchange operation wherein a plurality of lines are designated as private branch exchange trunks and a trunk hunting operation is performed in response to a call directed to one of the private branch exchange trunks to select an idle line within the called trunk group. To this end different groups of lines of the system may be designated as private branch exchange trunk groups and all but the last line in each trunk group is marked as a private branch exchange trunk by means of the common trunk marking pulse generator 56 shown in Fig. 4, as will be described in more detail hereinafter.

Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to party line ringing control signals derived from one of the connectors **12*b*, 13*b* or 14*b* by way of the distributor 15 to transmit ringing current at a particular selected frequency to the associated substation or substations on a call incoming thereto. To perform these functions, the line circuit 10 is connected by way of the conductors 53*a* and 53*b* to one of the gate circuits provided in the multiplexer 11, and is connected by way of the conductor 44 to the corresponding gate circuit provided in the distributor 15. The line circuit 10 is also connected to certain components of the common equipment 17 in the manner described below. Similarly, the line circuit 16 is connected by way of the conductor 54 to one of the gate circuits in the distributor 15 and by way of the conductors 45*a* and 45*b*, which form the illustrated cable 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and the distributor 15 and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders **12*a*, 13*a* and 14*a* and also to the multiplexer input terminals of each of the connectors 12*b*, 13*b* and 14*b*. In reverse manner, the distributor 15 performs the function of repeating intelligence signals derived from the connectors 12*b*, 13*b* and 14*b* in pulse time positions corresponding to particular calling and called lines to the line circuits respectively terminating the lines. To this end, the input terminals of the distributor 15 are connected by way of the common conductor 51 to the output terminals of each of the connectors 12*b*, 13*b* and 14*b*. In performing the described functions, the multiplexer 11 and the distributor 15 are controlled by certain components of the common equipment 17** in the manner hereinafter explained.

The finders of the various links, such, for example, as the finder **12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potential upon a plurality of the tubes in the connector 12*b* over the +B switch conductor 12*c*. When operatively associated with a particular calling line, the finder 12*a* also performs the function of guarding the calling line against intrusion of an incoming call to the line. This is accomplished through operation of the finder 12*a* to feed busy pulses occurring in the particular pulse time position assigned to the calling line with which the finder is operatively associated over the common busy pulse out conductor 52*a* to the link coupling circuits 24 in the common equipment 17. From the link coupling circuits 24 the busy pulses are fed to the common busy pulse in conductor 52*b* which is multipled to each of the finders and connectors of the system. The finder 12*a* further performs the function of supplying an allotting signal to the finder 13*a* of the next succeeding link 13 when the finder 12*a*** is taken into use so as to provide a self-allotting system for the finder-connector links of the system.

To perform the above functions in the manner fully explained below, the finder **12*a* comprises (see Fig. 2A), a pulse input circuit 200, a +B switching circuit 201, a pulse combining circuit 202, tens and units coincidence tube circuits 203 and 204, a finder pulse forming circuit 205 and a self-allotting circuit 206. It will be noted that the finder 12*a* and connector 12*b* are connected on an individual link basis by only three conductors, namely the +B switch conductor 12*c*, the finder gate pulse conductor 12*d*, and the conversation timing control pulse conductor 12*e*. The finder 13*a* and connector 13*b* of the link 13 are similarly connected on an individual link basis by means of the conductors 13*c*, 13*d*, and 13*e* which respectively correspond to the conductors 12*c*, 12*d*, and 12*e* of the link 12. Similarly, the conductors 14*c*, 14*d*, and 14*e* are provided to connect the finder 14*a* and connector 14*b* of the link 14**.

Each of the connectors **12*b*, 13*b*, and 14*b* performs a plurality of different functions, including those functions related to the special service features of trunk hunting, conversation timing, and fully selective or semi-selective harmonic ringing. Thus the connector 12*b*, for example, is controlled by finder gate pulses delivered thereto over the conductor 12*d* to accept and respond to signal bearing multiplexer pulses occurring in the pulse time position corresponding to the calling line with which the link is associated. It also responds to the application of operating anode potential to the conductor 12*c* and to the finder gate pulses appearing on the conductor 12*d* to feed a dial tone signal to the distributor 15** on connector signal pulses occurring in the pulse time position assigned to the calling line with which it is operatively associated, thereby to return the usual dial tone signal to the calling subscriber.

As discussed previously above, the connector **12*b* includes facilities for trunk hunting to select an idle line within a called trunk group in response to a call directed to one of the lines in this trunk group. Thus, the connector 12b responds to dial pulses occurring during a first, or tens, digit and a second, or units, digit which originate at the calling line with which the link 12 is operatively associated to select the particular pulse time position assigned to the called line. The connector then tests the pulse time position assigned to the called line to determine the idle or busy condition of that line and transmits busy tone carrying pulses to the distributor 15 in the pulse time position assigned to the calling line in the event the called line tests busy. If the called line tests busy and is a member of a private branch exchange trunk group, the connector 12b selects the pulse time position next adjacent the time position assigned to the called line i.e., the time position assigned to the next line of the system and tests successive adjacent pulse time positions until either an idle line is found or the last line in the called trunk group is reached. In the event that all of the lines in the called trunk group test busy, the connector 12b transmits busy tone carrying pulses to the distributor 15** in the pulse time position assigned to the calling line.

Incident to the selection of an idle time position the connector 12b conditions itself to accept signal carrying pulses from the multiplexer 11 which occur in the pulse time position corresponding to the selected idle called line, to store the intelligence carried by these pulses and to transmit the intelligence to the distributor 15 on connector signal pulses occurring in the time position corresponding to the calling line with which the link 12 is operatively associated. In effect, therefore, the connector functions to shift signal carrying pulses from the pulse time position assigned to the calling line to the pulse time position assigned to the called line and also to shift return signal pulses carrying intelligence derived from the called line from the particular pulse time position assigned to the called line to the particular pulse time position corresponding to the calling line.

In addition, the connector 12b performs the auxiliary functions of terminating dial tone transmission to the calling substation when the first line selecting impulse is dialed into the connector and feeding busy pulses occurring in the pulse time position assigned to the idle called line over the common busy pulse out conductor 52a to the link coupling circuits 24 and from the link coupling circuits 24 over the common busy pulse in conductor 52b to the other links of the system thereby to guard the called line against seizure through another link.

The connector 12b responds to dial pulses which occur during a third, or party line ringing, digit originating at the calling line with which the link 12 is operatively associated to select a party line ringing signal which corresponds to the ringing frequency assigned to the called substation associated with the called line in the event the called line tests idle, and concurrently therewith the connector 12b transmits pulses which are modulated with a corresponding ringback tone signal to the distributor 15 in the pulse time position assigned to the calling line thereby to signal the calling subscriber that the called substation associated with the called line is being rung. The connector 12b terminates the party line ringing signal and concurrently terminates ringback tone signal transmission to the calling substation in response to answering of the call at the called party line substation.

When the called subscriber answers, the connector 12b initiates a conversation timing cycle and at the end of the conversation timing period the connector 12b is arranged either to release the link 12 completely from the calling and called lines or to return a busy tone to the calling subscriber irrespective of any action of the calling and called subscribers participating therein. The connector 12b is also arranged to transmit warning tone carrying pulses to the distributor 15 in the pulse time positions assigned to the calling and called lines a predetermined interval before the end of the conversation timing period to inform the calling and called line subscribers that the call will be terminated automatically a short interval thereafter.

To perform the above-mentioned functions in the manner fully explained below, the connector 12b, as diagrammatically illustrated in Figs. 2B and 2C and as shown in detail in Figs. 6 to 10, inclusive, and 13 to 16, inclusive, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by signal bearing pulses transmitted to the connector from the multiplexer 11 in the pulse time position assigned to the calling line. The connector 12b further comprises a called line out gate circuit 224 for gating to the distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate to the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12b of the present invention additionally comprises a plurality of components for responding to three digits of dial impulses repeated to the connector or multiplexer pulses occurring in the pulse time position assigned to the calling line, the third digit identifying the particular party line ringing signal assigned to the called party line substation. In general, the dial impulse responsive equipment of the connector 12b comprises a dial impulse integrator circuit 209 which receives dial impulses from the reconstructor circuit 208, tens, units and party inverter circuits 260, 261 and 262, respectively, to which impulses are repeated by the dial impulse integrator circuit 209, the units and party inverter circuits 261 and 262 also acting as start gate circuits for the units and party digit channels, respectively; tens, units and party digit registers 211, 215 and 265 which are respectively controlled in accordance with the numerical values of the tens, units and party digits repeated to the circuits 260, 261 and 262 from the integrator circuit 209; tens, units and party register pulsers 210, 214 and 263 which are respectively interposed between the inverter circuit and the digit register of the tens, units and party digit channels, and tens, units and party sequence timing circuits 212, 216 and 264 which in effect function as the digit counting components of the connector, i.e., initiate certain operations at the ends of the first, second and third digits dialed into the connector.

The connector 12b further comprises a connector pulse forming circuit 217 which is controlled in accordance with the settings imparted to the tens and units digit registers 211 and 215 at the end of the second digit to produce connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy pulse in conductor 52*b*, a busy lock circuit 219 and a busy gate circuit 220.

The trunk hunting facilities of the connector comprise a trunk hunting control circuit 283 jointly controlled by the connector pulse forming circuit 217, the units sequence timing circuit 216, busy pulses transmitted to the connector over the common busy pulse in conductor 52*b*, and trunk marking pulses transmitted to the connector over the common trunk marking pulse conductor 56*a*; a units register advancer 281 and a tens register advancer 280.

The conversation timing facilities of the connector 12*b* comprise a conversation timing warning tone circuit 284 jointly controlled by the party digit register 265, the ring trip circuit 221 and a warning tone signal transmitted to the connector over the common conductor 58*a*; a party register advancer 282 and a conversation timing control circuit 285, the circuit 285 operating to produce a control pulse at the end of a predetermined conversation period which in one embodiment is transmitted to the +B switching tube in the circuit 201 in the finder 12*a* to effect release of the link 12 by extinguishing this tube. In another embodiment this control pulse is used to make the connector busy and return busy tone to the subscriber to inform him that the conversation timing period is over.

In addition, the connector 12*b* comprises supervisory tone gate circuits 225 having the function of gating dial and busy tones to the calling line and including a ringback tone gate circuit having the functions of gating a particular party line ringback tone signal selected by the party digit register 265 in accordance with the identity of the called substation to the calling line and transmitting a ringing control signal to the called line out gate circuit 224; a code start circuit 268 which performs the function of delaying the transmission of the selected party line ringback tone signal through the ringback tone gate circuit until the start of each party line ringing period, and a ring trip circuit 221 which is assigned the function of terminating ringing current transmission to the called substation, concurrently initiating the conversation timing period when a call answering operation is performed at the called substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network. As controlled by the phase shifter and pulse former network 19, the units pulse ring circuit 20 functions sequentially to develop the positive unit pulses which define the pulse time positions of the pulse frames, appear on the conductors within the cable 31, and are fed by way of these conductors to the various intelligence transmitting and control components of the system. More specifically, the cable 31 comprises ten units pulse conductors 31*a*, 31*b*–31*j* over which positive unit pulses are sequentially transmitted in the order named to the units coincidence tube circuits 204 of the finders 12*a*, 13*a* and 14*a*, the units digit registers 215 of the connectors 12*b*, 13*b* and 14*b*, and the units gate circuits of the trunk marking pulse generator 56, as described in more detail hereinafter. The positive units pulses developed upon the two conductors 31*a* and 31*f* are also employed to control a supervisory carrier supply circuit 26.

The positive units pulses are sequentially developed on the units conductors 31 at a frequency rate of 100 kilocycles and each tenth positive units pulse, i.e., each pulse appearing on the units pulse conductor 31*j*, is used to step, or trigger, a tens pulse ring circuit 21 having the function of developing the positive tens pulses, each of which spans the time interval of ten units pulses. The positive tens pulses as sequentially produced by the ring circuit 21 on the tens pulse conductors 32*a*, 32*b*–32*j*, forming the illustrated cable 32, are impressed upon the gate circuits of the multiplexer 11, the tens pulse gate circuits of the distributor 15, the tens coincidence tube circuits 203 of the finders 12*a*, 13*a* and 14*a*, and the tens pulse gate circuits of the trunk marking pulse generator 56, in the manner more fully explained below. In this connection it will be noted that all of the components of the system of the present invention are arranged to operate with tens and units pulses of only one polarity, i.e. positive tens and units pulses, thereby materially simplifying the system and reducing the number of conductors between the various units of the system.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

In order to provide facilities for effecting party line ringing of the called substation on either a fully selective or a semi-selective harmonic ringing basis, the common equipment 17 further includes a harmonic ringing oscillator 97, which operates independently of the other components of the system, and is designed to operate at an audio frequency (preferably 1200 cycles) which is suitable for subdivision into a group of harmonically related ringing frequencies. The oscillator 97 is connected over the conductor 102 to a harmonic ringing frequency generator 98 which operates under the control of the 1200 cycle signal from the oscillator 97 to develop five continuous wave ringing signals of different frequencies which are suitable for exciting the ringing facilities of five different substations connected to one of the lines of the system. In the illustrated embodiment the ringing frequencies developed by the generator 98 correspond to the frequencies of the conventional harmonic ringing series so that conventional frequency sensitive ringers may be employed in the substations of the system. Thus, continuous wave signals having the frequencies 16⅔ c.p.s., 25 c.p.s., 33⅓ c.p.s., 50 c.p.s., and 66⅔ c.p.s. are respectively impressed upon the conductors 103–107, inclusive. However, it will be understood that either of the two other series of ringing frequencies, in the synchromonic and the decimonic series may be developed in substantially the same manner as will be described in more detail hereinafter. The synchromonic series contains only frequencies which are not harmonically related and the decimonic series contains frequencies which are related in multiples of ten.

The common equipment 17 further comprises the harmonic ringing code forming circuit 99 which operates independently of the other components of the system to develop two different party line code ringing signals during each of five successive ringing periods which recur during repetitive ringing cycles established by the circuit 99. In the illustrated embodiment each ringing period lasts for approximately 1½ seconds and is separated from the adjacent ringing periods by a short guard interval, the over-all ringing cycle being approximately 7½ seconds long. During each of the five ringing periods the code forming circuit 99 produces both a long ringing pulse, which lasts for 1½ seconds, and two short ringing pulses each of ½ second duration separated by a ½ second silent period. The series of ten coded ringing pulses formed by the circuit 99 are used to control a harmonic ringing modulator circuit 100 wherein the 1½ second ringing pulses are used as gating pulses sequentially to gate to a common output conductor 108 the different ringing frequencies impressed on the conductors 103–107, inclusive, by the generator 98, and the multiplexed ringing frequencies thus impressed on the conductor 108 are transmitted to a harmonic ringing amplifier and supply circuit 101.

The common equipment 17 also includes a ringback tone generator **29*c* which performs the function of developing a continuous audible ringback tone signal (preferably 200 c.p.s.) which is supplied over the conductor 27*b* to the harmonic ringing modulator circuit 100. Each one of the ten codes formed by the circuit 99** is used to develop corresponding pulses of ringback tone on the ten ringback tone conductors 48*a*–48*j*, inclusive, which form the illustrated ringback tone cable 48. These ringback tone pulses are transmitted over the cable 48 to the party digit registers 265 of the connectors **12*b*, 13*b*, and 14*b*. The harmonic ringing amplifier and supply circuit 101 filters and amplifies the multiplexed ringing frequencies transmitted thereto over the conductor 108, and includes a combined bias voltage and multiplex ringing current source which is connected to each of the line circuits 10, 16, etc. over the common multiple conductors 61*a* and 61*b* forming the illustrated cable 61**.

In order to mark certain consecutively numbered groups of the lines of the system as private branch exchange trunks, the common equipment 17 includes the trunk marking pulse generator 56 which is jointly controlled by the positive units pulses transmitted thereto over the cable 31 and the positive tens pulses transmitted thereto over the cable 32 and develops on the common output conductor **56*a* thereof trunk marking pulses which appear in the time positions assigned to each of the lines in each trunk group with the exception of the last line in each group which is unmarked. The trunk marking pulses produced on the conductor 56*a* are impressed upon the trunk hunting control circuits 283 in each of the connectors 12*b*, 13*b* and 14*b*** of the system.

To provide a trunk hunting arrangement wherein the tens and units digit registers are successively driven to different settings to hunt for an idle line, there is provided in the common equipment 17 a trunk hunting drive pulse generator 55 which operates independently of the other components of the system to develop positive trunk hunting drive pulses of relatively short duration which recur at a relatively low rate (preferably in the order of 100 pulses per second) which are impressed on the common conductor **55*a* and are connected by way of this conductor to the units register advancers 281 in each of the connectors 12*b*, 13*b*, and 14*b***.

In order to provide facilities for timing the conversation period and for warning the calling and called line subscribers when the call is about to be terminated, the common equipment 17 includes a conversation timing pulse generator 57 and a conversation timing warning tone generator 58. The timing pulse generator 57 operates independently of the other components of the system to develop relatively narrow positive conversation timing pulses which preferably have a repetition rate of about one every 40 seconds and are connected by way of the common conductor **57*a* to the party register advancers 282 in each of the connectors 12*b*, 13*b*, and 14*b*. The conversation timing warning tone generator 58 also operates independently of the other components of the system to develop a continuous wave warning tone signal (preferably 400 c.p.s.) which is connected by way of the common conductor 58*a* to the conversation timing warning tone circuits 284 in each of the connectors 12*b*, 13*b*, and 14*b***.

The common equipment also includes a busy tone generator **29*a* and a dial tone generator 29*b* which are respectively connected by way of the common conductors 46 and 47 to the supervisory tone gate circuits 225 in each of the connectors 12*b*, 13*b*, and 14*b*. The common equipment 17 further comprises the link coupling circuits 24 which include a busy pulse drive channel for repeating busy pulses supplied thereto over the common busy pulse out conductor 52*a* to the busy pulse in conductor 52*b* which is multipled to the finders and connectors of all the links of the system, and a supervisory carrier drive channel for repeating the 100 kc. supervisory carrier supplied thereto over the conductor 37 from the supervisory carrier supply circuit 26 to the self-allotting circuit 206 of the finder 12*a* over the conductor 36*a* to permit the finder 12*a*** to handle the first incoming call.

In order to render the mode of operation of the system more readily understandable, a pulse chart has been illustrated in Figs. 28 to 31, inclusive, to show the relative widths of the pulses developed by the common equipment components 19, 20, 21 and 22 during two successive pulse frames, as well as the time or phase relationship between the pulses. As there shown, the units pulse ring drive pulses **95*a*, appearing on the conductor 40 are produced by the phase shifter and pulse former circuit 19 along the zero potentital reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i.e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*a*, 31*b*–31*j* are produced along the zero potential reference lines 62, 63–71. It will be noted that the units pulses are produced by the units pulse ring circuit 20** at the fundamental frequency rate of one megacycle. However, due to diversion of the pulses successively to different ones of the units pulse conductors *a*, *b–j*, the pulses along any particular zero potential reference line, such, for example, as the line 62, recur only at a frequency rate of one hundred kilocycles. It will also be noted that the units pulses are successively produced on the units pulse conductors **3*a* to 3*j*, inclusive, in the order of alphabetical designation of these conductors. Thus, successive positive units pulses produced along any particular zero potential reference line, as, for example, those occurring during the units pulse periods 62*a*, 62*b*, 62*c*, etc., along the potential reference line 62**, are separated by a time interval equaling the sum of nine units pulse time positions and during which units pulses are produced successively along each of the nine other zero potential reference lines.

The positive tens pulses successively produced by the tens pulse ring circuit 21 on the tens pulse conductors 32*a*, 32*b*–32*j* are illustrated as appearing along the ten zero potential reference lines 72 to 81, inclusive. It will be noted that each tens pulse persists for a time interval exactly equaling the time required to produce ten units pulses. Thus, the tens pulse period 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the units pulses 62*a*, 62*b*, 62*c*, etc., appearing along the zero potential reference line 62 and impressed upon the units pulse conductor 31*a*, by the units pulse ring circuit 20. Further, each tens pulse period terminates at the exact instant of termination of the units pulses 71*a*, 71*b*, 71*c*, etc., appearing along the zero potential reference line 71 and produced by the units pulse ring circuit 20 on the conductor.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. This the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 28 to 31, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12, 13—10, are defined by the first tens pulse period 72*a* of the frame within which the ten units pulse periods 62*a*, 63*a*, 64*a*–71*a* occur. Similarly, the second ten pulse time positions, which are respectively assigned to the lines of the system having the directory number designations 21, 22, 23—20, are defined by the second tens pulse period 73*a* during which the ten units pulse periods 62*b*, 63*b*, 64*b*–71*b* occur. Again, the third ten pulse time positions, which are respectively assigned to the lines of the system having the directory number designations 31, 32, 33—30, are marked out by the third tens pulse time period 74*a* during which the ten units pulse periods 62*c*, 63*c*, 64*c*–71*c* occur. Thus, it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding channel pulse 84*b* occurs well within the limits of this pulse time position. Similarly, the pulse time position assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

In order further to render the mode of operation of the fully selective or semi-selective harmonic ringing system of the present invention more readily understandable, a harmonic code sequence chart has been illustrated in Fig. 32 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168, and 169 on five different output code buses thereof which recur in succession during successive harmonic ringing cycles of approximately 7½ seconds' duration. The long ringing pulses 165–169, inclusive, define a succession of five ringing periods which are separated by guard intervals 186 of relatively short duration. The code forming circuit 99 also operates to produce on five other code buses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180 (Fig. 32 (11)) which occur substantially at the end of each of the guard intervals 186. The code start pulses 180 are transmitted over the common conductor 5 to each of the connectors 12*b*, 13*b*, and 14*b* to delay the selection of a particular party line ringing signal until the end of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage wave form substantially as shown in Fig. 32 (12). Thus, during the first ringing period the ringing pulse 165 is used to gate a 66⅔ c.p.s. ringing voltage to the common conductor 108. After the guard interval 186, the ringing pulse 166 is employed to gate a 50 c.p.s. ringing voltage to the conductor 108 during the second ringing period. Likewise, the successive ringing pulses 167, 168, and 169 are employed successively to gate to the common output conductor 108 ringing voltages having frequencies of 33⅓ c.p.s., 25 c.p.s., and 16⅔ c.p.s.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being rung in a particular code sequence, the long and short ringing pulses (Figs. 32 (1)–(10), inclusive) developed by the harmonic ringing code forming circuit 99 are used individually to gate to the output conductors 48*a*–48*j*, inclusive, a ringback tone signal for the duration of the ringing pulse. Thus, the ringing pulse 165 developed in the code forming circuit 99 is used to develop a ringback tone signal 165*a* which persists for the duration of the first ringing period. Likewise, the short ringing pulses 170 and 171 are employed to produce the ringback tone signals 170*a* and 171*a* which have a duration of one-half second and are separated by a one-half second interval, the signals 170*a* and 171*a* also occurring during the first ringing period. In the same manner the pulses 166, 172, and 173 are employed to develop the corresponding ringback tone signals shown in Figs. 32 (15) and (16) during the second ringing period. In a similar manner the long and short ringing pulses which are produced during the third, fourth, and fifth ringing periods are employed to produce the ringback tone signals shown in Figs. 32 (17)–(22), inclusive.

With the above general description of the harmonic code sequence chart illustrated in Fig. 32 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals. In the event that a maximum of five substations are associated with any one line of the system, only the long ringing pulses 165–169, inclusive, need be employed and under these conditions the first substation would be provided with ringing facilities which are responsive to a 66⅔ c.p.s. ringing current, the second substation would be provided with ringing facilities which are responsive to 50 c.p.s. ringing current, the third substation would be provided with ringing facilities responsive to 33⅓ c.p.s. ringing current, the fourth substation would be provided with ringing facilities responsive to 25 c.p.s. ringing current, and the fifth substation would be provided with ringing facilities responsive to 16⅔ c.p.s. ringing current. The five substations would be assigned different third digit directory number designations and one of the ringback tones 165*a*–169*a*, inclusive, would be selected in the connector in response to the dialing of a third digit at the calling substation. If, for example, a substation having ringing facilities responsive to 66⅔ c.p.s. ringing current is selected in the connector, the ringback tone signal 165*a* is selected and is used to control the application of ringing current so that only the 66⅔ c.p.s. signal 181 (Fig. 32 (12)) is applied to the called line and only the substation having ringing facilities which respond to this ringing frequency will be rung.

In the event that more than five substations up to a maximum of ten are associated with one of the lines of the system, the group of substations is divided into pairs and each pair of substations is provided with ringing facilities responsive to the same ringing frequency. Thus, the substations A′ and B′ associated with the line 32 and assigned the directory number designations 321 and 322 would both be provided with ringing facilities responsive to the same ringing current, for example a 66⅔ c.p.s. ringing current. If the calling subscriber wishes to call substation A′ he dials 321 and the connector responds to the third digit of "1" by selecting the ringback tone signal 165*a* so that a 66⅔ c.p.s. ringing current is transmitted over the called line 32 during the entire first ringing period. Only the ringers at the substations A′ and B′ will then be rung for a period of approximately 1½ seconds and the subscriber at the substation A′ will know that the call is intended for him. On the other hand, if the calling subscriber wishes to call the substation B′ associated with the line 32, he dials the number 322 and the connector responds to the third digit of "2" by selecting the ringback tone signal consisting of the short pulses 170*a* and 171*a* which control the application of 66⅔ c.p.s. ringing current to the line 32 so that the ringing facilities at both the substations A′ and B′ are rung in two short rings. The subscriber at the substation B′ is then notified that his substation is being rung.

In a similar manner the substations C′ and D′ are provided with ringing facilities responsive to 50 c.p.s. ringing current, the substations E′ and F′ are provided with ringing facilities responsive to 33⅓ c.p.s. ringing current, etc. However, it will be understood that certain ones of the lines of the system may be adapted for private service, in which case the private line will, of course, have only one substation associated therewith. Thus, in the illustrated embodiment the line 23 is adapted for private service and is associated therewith only the one substation A to which is assigned the directory number designaton 231. When the line 23 is called by dialing the number 231, the connector responds to the third digit of "1" by transmitting a 66⅔ c.p.s. ringing current over the line 23 and the substation A is provided with ringing facilities responsive to this ringing current so that the substation A is rung during the first ringing period of each harmonic ringing cycle.

In order to render the mode of operation of the trunk hunting facilities of the present invention more readily understandable, a trunk marking pulse chart has been illustrated in Fig. 33 to show the time and phase relationship of the trunk marking pulses developed by the trunk marking pulse generator 56 in the common equipment 17. Referring to this figure, the one hundred time positions which comprise one pulse frame are illustrated as a series of ten horizontal strings of blocks corresponding to the ten tens digit levels of the lines of the system. In each of the blocks there is shown the directory number designation of the line which is assigned the corresponding units time position. Thus, the first units time position 62*a* in each time position frame is assigned to the line having the directory number designation "11," the second units time position 63*a* in each time position frame is assigned to the line having the directory number designation "12," the third units time position 64*a* in each time position frame is assigned to the line having the directory number designation "13," and the tenth units time position 71*a* is assigned to the line having the directory number designation "10." In the second tens digit level the eleventh units time position 62*b* in each time position frame is assigned to the line having the directory number designation "21," and the twentieth units time position 71*b* in each time position frame is assigned to the line having the directory number designation "20." Likewise, in the tenth tens digit level the ninety-first units time position 62*j* in each time position frame is assigned to the line having the directory number designation "01" and the one-hundredth units time position 71*j* is assigned to the line having the directory number designation "00."

In order to mark certain lines of the system as private branch exchange trunks, the trunk marking pulse generator 56 selects certain ones of the units pulses supplied thereto over the multiple conductor cable 31 and gates the selected units pulses by means of appropriate tens pulses supplied thereto over the multiple conductor cable 32 to provide trunk marking pulses which occur once in each time position frame in particular units pulse time positions. As will be described in more detail hereinafter, the last line in each trunk group is unmarked.

In the trunk marking pulse chart of Fig. 33 there are shown nine different private branch exchange trunk groups. One of these trunk groups is comprised of the lines having the directory number designations 32–42, inclusive, and the trunk marking pulse generator 56 operates to develop trunk marking pulses during each of the time positions assigned to these lines except the last line 42. It will be evident from Fig. 33 that this trunk group includes lines which are positioned in different tens digit levels. Thus, the lines 32–39, inclusive, and 30 are located in the third tens digit level, whereas the lines 41 and 42 are located in the fourth tens digit level. Since the line 42 is the last line in this trunk group no trunk marking pulse is produced in the time position 63*d* assigned thereto. A second trunk group is shown as comprising a group of thirty-two lines starting with the line 45 and ending with the line 76. Accordingly, trunk marking pulses are produced in all of the consecutive time positions assigned to these lines except the last line 76. It will be noted that this trunk marking group of thirty-five lines includes lines having four different tens digit directory number designations. A third trunk group is illustrated as comprising the lines 91, 92, and 93, the lines 91 and 92 being marked by trunk marking pulses. In a similar manner the lines 94, 95, and 96 comprise a fourth trunk group, and the lines 97, 98, and 99 comprise a fifth trunk group. The lines 90, 01, and 02 comprise a sixth trunk group, only the lines 90 and 01 being marked by corresponding trunk marking pulses produced in their respective time positions. A two-line trunk group is shown as comprising the lines 03 and 04 constituting the seventh trunk group. The eighth trunk group includes a plurality of lines in the tenth tens digit level and also a plurality of lines in the first tens digit level. Thus, the eighth trunk group comprises the lines 05–09, inclusive, 00, and 11–15, inclusive. It will be noted that the eighth trunk group includes lines in the last tens digit level as well as the first tens digit level so that the trunk hunting facilities of the system are capable of hunting not only through different tens digit levels but from the last time position to the first time position, i.e., from the time position 71*j* to the time position 62*a*. A ninth trunk group is illustrated as comprising the three lines 26, 27 and 28, the lines 26 and 27 being marked by corresponding trunk marking pulses.

*Operation of the system as a whole*

Briefly to consider the general mode of operation of the system, it may be assumed that the party line substation B′ is called from the private substation A during a period when the finder-connector link 12 is idle. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53*b* to the gating circuit of the multiplexer 11 which individually corresponds to the line 23. The multiplexer 11 responds to this change in magnitude of the controlling bias potential supplied thereto from the line circuit 10 by opening this gate circuit. Accordingly, only the signal pulses 84*b* occurring during the pulse time positions 64*b* of successive pulse frames, are permitted to pass over the common conductor 50 to the pulse input circuits 200 of the finders 12*a*, 13*a*, and 14*a* and the in gate circuits 207 and 223 of the connectors 12*b*, 13*b*, and 14*b* in parallel. At this point the pulses transmitted from the multiplexer 11 over the common conductor in the pulse time position 64*b* may be regarded as multiplexer pulses 84*b*.

In the illustrated embodiment, the finder-connector links of the system are arranged in a predetermined sequence and are allotted one at a time to successive calling lines of the system by means of the self-allotting circuits 206 contained in each of the finders 12*a*, 13*a*, and 14*a*. Initially, only the link 12 is conditioned by means of the self-allotting circuit 206 in the finder 12*a* to handle a call placed on a calling line of the system. However, when the link 12 is taken into use, the self-allotting circuit 206 in the finder 12*a* diverts a supervisory carrier signal to the finder 13*a* of the link 13 to condition this link to handle the next succeeding call. Accordingly, only the link 12 is conditioned to handle the first call and the connector 12*b* of this link is as yet inoperative so that only the finder 12*a* initially responds to the multiplexer pulses 84*b* delivered thereto from the multiplexer 11 over the conductor 50 in the described pulse time position 64*b*.

In the finder 12*a* the multiplexer pulses 84*b* are repeated by the pulse input circuit 200 to effect substantially immediate operation of the +B switching circuit 201 embodied in this finder, whereby operating anode potentials are delivered to the tubes of the circuits 209, 211, 212, 215, 216, 218, 219, 264, 265 and 285 of the connector 12*b* over the +B switch conductor 12*c* with the result that the connector 12*b* is conditioned for operation, i.e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the positive tens pulses developed by the tens pulse ring circuit 21 and the positive units pulses developed by the units pulse ring circuit 20.

In responding to the tens and units pulses impressed thereon coincidentally with the multiplexer pulses 84*b*, the tens and units coincidence tube circuits 203 and 204 of the finder 12*a* cooperate with the finder pulse forming circuit 205 and the combining circuit 202 of this finder to produce finder gate pulses which are transmitted over the conductor 12*d* to the circuits 207, 208, and 226 of the connector 12*b* and have the effect of initially limiting the response of the connector only to multiplexer pulses 84*b* appearing in the pulse time position 64*b*. The combining circuit 202 of the finder 12*a* also gates busy pulses in the pulse time position 64*b* which are fed over the common busy pulse out conductor 52*a* to the link coupling circuits 24 wherein the busy pulses are amplified and supplied over the common busy pulse in conductor 52*b* to all of the finders and connectors of the system to prevent these finders from responding to multiplexer pulses occurring in this time position. Thus, the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the pulse time position 64*b*.

Operation of the +B switching circuit in the finder 12*a* has the further effect of causing the self-allotting circuit 206 of the finder 12*a* to divert the supervisory carrier control signal, normally supplied thereto over the conductor 36*a*, to the self-allotting circuit in the finder 13*a* of the next succeeding link 13 over the conductor 36*b* to condition the link 13 to handle the next incoming call. In an entirely similar manner, operation of the +B switching circuit in the finder 13*a* of the link 13 when this link is operatively associated with the next calling line has the effect of diverting the supervisory carrier control signal to the finder of the next succeeding finder-connector link 14 so that as one link is taken into use the seized link automatically allots the next succeeding link in the sequence to handle the next incoming call. After the finder 12*a* has operated to perform the described functions, continued holding of the finder 12*a* is dependent upon continued acceptance and transmission of multplexer pulses 84*b* by the pulse input circuit 200, which of coursse means that the finder will remain associated with the calling line 23 only so long as a calling condition persists on this line. Holding of the finder 12*a* is also dependent upon the conversation timing control circuit 285 in the connector 12*b* as will be described in more detail hereinafter.

As indicated above, when the +B switching circuit 201 of the finder 12*a* operates to apply operating anode potential to the conductor 12*c*, the circuits 210, 211, 212, 215, 216, 218, 219, 264, 265 and 285 of the connector 12*b* are conditioned for operation. The tens digit register 211 in turn supplies a bias potential to the dial tone gate tube of the network 225 and this network then functions to transmit a dial tone signal, derived from the dial tone generator 29*b* over the conductor 47, to the calling line out gate circuit 226 over the conductor 244. This circuit in responding to the dial tone signal and also to the finder gate pulses delivered thereto over the conductor 12*d* and the commutator drive pulses 96*a* delivered thereto over the conductor 35, functions to repeat over the channel conductor 51 to the distributor 15 connector signal pulses modulated in accordance with the dial tone signal in the pulse time position 64*b* assigned to the calling line. The distributor 15 responds to the connector signal pulses thus transmitted thereto by repeating the same through the gate circuit thereof associated with the line circuit 10, reconstructing the dial tone and transmitting the reconstructed dial tone over the conductor 44 to the line circuit 10. In the line circuit 10, the dial tone signal is transmitted over the line 23 to signal the calling subscriber that the dialing operation may be initiated.

Two digits of dial impulses must be dialed into the connector 12*b* in order to effect selection in the connector of the pulse time position 63*c* assigned to the called line 32 and a third successive digit, called a party line digit, must be dialed into the connector 12*b* in order to effect selection on a decimal basis of the particular party line ringing signal assigned to the called substation B′ having the directory number designation "322." More specifically, the directory number digits "3," "2" and "2" must be dialed successively into the connector 12*b* to effect selection of the pulse time position 63*c* and the code #2 party line ringing signal assigned to the called substation B′. During the open circuit period of each dial impulse, the control bias supplied by the line circuit 10 to the gate circuit of the multiplexer 11 which corresponds to the calling line 23 is returned to its on hook value to interrupt the transmission of multiplexer pulses 84*b* over the conductor 50 to the pulse input circuit 200 of the finder 12*a* and to the in gate circuits 223 and 207 of the connector 12*b*.

During the make period of each impulse dialed at the calling substation A, multiplexer signal pulse transmission from the multiplexer 11 to the finder 12*a* and the connector 12*b* in the pulse time position 64*b* is resumed. As controlled by the finder gating pulses delivered to the circuits 207 and 208 from the circuit 202 over the conductor 12*d* the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens, units and party inverter circuits 260, 261 and 262 over the conductor 227.

Pending operation of the tens sequence timing circuit 212, the units inverter circuit 261, which also performs the function of a units digit start gate, and the party inverter circuit 262, which also performs the function of a party digit start gate, are held non-responsive to the three impulses transmitted thereto by the dial impulse integrator circuit 209 during dialing of the first digit "3" at the calling substation. However, the tens register pulser 210 responds to these three impulses repeated thereto by the tens inverter circuit 260 over the conductor 231 by developing three coincident register drive pulses of uniform amplitude and duration which are supplied to the tens digit register circuit 211 and the tens sequence timing circuit 212 over the conductor 230. In responding to the three register drive pulses thus transmitted thereto, the tens digit register 211 is driven to a setting wherein tens pulses appearing on the positive tens pulse conductor 32*c* in the third tens pulse time position 74*a* of each pulse frame may be transmitted through the third tens gate of this register and over the conductor 232 to the connector pulse forming circuit 217. Transmission of the three register drive pulses individually corresponding to the three break periods of the first digit dialed at the calling substation over the conductor 230 to the tens sequence timing circuit 212 has the effect of conditioning this circuit to block the tens register pulser 210 from developing register drive pulses during dialing of the second and third digits and to render the units inverter circuit 261 operative to repeat the pulses delivered thereto by the dial impulse integrator circuit 209 during dialing of the second digit at the calling substation. Immediately the first register drive pulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens register pulser 210 against developing further register drive pulses in response to impulses transmitted thereto through the tens inverter circuit 260 from the dial impulse integrator circuit 209. The above-described control potential is also supplied over the conductor 234 to the units inverter circuit 261 to render this circuit operative to repeat impulses delivered thereto from the dial impulse integrator circuit 209 to the units register pulser 214 and the units sequence timing circuit 216 over the conductor 238.

During dialing of the second digit "2" at the calling substation A, the dial impulse integrator circuit 209 responds by transmitting two impulses to each of the inverter circuits 260, 261 and 262. As noted above, however, the party inverter circuit 262 is still held non-responsive to these impulses and the tens register pulser 210 is now blocked against responding to these impulses. Thus, only the units inverter circuit 261 repeats the two impulses to the units register pulser 214 over the conductor 238 and the latter circuit responds to these impulses by developing corresponding register drive pulses of uniform amplitude and duration which are supplied to the units digit register 215 and the units sequence timing circuit 216 over the conductor 236. As a consequence, the units digit register 215 is operated or driven to open the second units gate circuit therein, thereby to establish a path for the transmission of units pulses appearing in the time positions 63*a*, 63*b*, 63*c*, etc., to the connector pulse forming circuit 217 over the conductor 245. The two pulses repeated to the units sequence timing circuit 216 over the conductor 236 serve to condition this circuit for operation at the end of the second digit.

During the interdigit pause which separates dialing of the second and third digits at the calling substation, the units sequence timing circuit 216 assumes a stable operating condition wherein a controlling potential is impressed upon the conductor 235 to bias the units register pulser 214 against development of register drive pulses in response to further impulses repeated thereto through the units inverter circuit 261 from the dial impulse integrator circuit 209. This controlling potential is also supplied over the conductor 235 to the party inverter circuit 262 to render this circuit operative to repeat impulses delivered thereto from the dial impulse integrator circuit 209 during a third digit to the party register pulser 263 and the party sequence timing circuit 264 over the conductor 237. The potential impressed upon the conductor 235 is also supplied to the tens register advancer 280, the trunk hunting control circuit 283, the busy test circuit 218 and the busy lock circuit 219 to render these circuits operative to perform their respective functions as described below.

The connector pulse forming circuit 217 operates to mix the tens and units pulses respectively transmitted thereto from the registers 211 and 215 over the conductors 232 and 245 to produce a resultant connector pulse which appears on the conductors 239, 239b and 239c. More specifically, the tens pulses 74a appearing on the positive tens pulse conductor 32c and gated by the tens digit register 211 are transmitted to the connector pulse forming circuit 217 over the conductor 232 where they are mixed with the positive units pulses appearing in the time position 63c which are gated by the units register 215 and transmitted to the circuit 217 over the conductor 245. Mixing of these pulses in the circuit 217 results in the production of a connector pulse which occurs during each pulse frame in the pulse time position 63c assigned to the called line. These pulses are transmitted over the conductor 239 to the connector components 222, 223, 224 and 283, and over the conductor 239b to the connector component 220. The connector pulse forming circuit 217 also operates to select one of the commutator drive pulses 96a which occurs in the time position 63c assigned to the called line and the selected narrow commutator drive pulses are transmitted to the busy test circuit 218 over the conductor 239a.

Effectively, the busy test circuit 218 and the busy lock circuit 219 cooperate to perform the busy test operation in the connector 12b. More specifically, if the called line is busy, i.e., occupied with a call, busy pulses are present on the common busy pulse in conductor 52b in the pulse time position 63c assigned to the called line. The manner in which such busy pulses are repeated to the conductor 52b from another link occupied with the call involving the called line 32 will be apparent from the foregoing explanation. These busy pulses are impressed upon the busy test circuit 218 simultaneously with commutator drive pulses 96a appearing in the time position 63c assigned to the called line which, as stated above, are developed by the connector pulse forming circuit 217 and impressed upon the busy test circuit 218 over the conductor 239a. Coincidence between the selected commutator drive pulses and the busy pulses has the effect of preventing the busy test circuit from operating. Thus, the busy condition of the called line is indicated.

In the event the called line is busy, the busy lock circuit 219 as controlled over the conductor 235 from the units sequence timing circuit 216 measures a predetermined time interval, i.e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone generator 29a by way of the conductor 46, the busy gate circuit in the network 225, the conductor 244, the calling line out gate circuit 226, the channel conductor 51, the distributor 15 and the line circuit 10 to the calling line 23. Thus, the calling subscriber is advised of the busy condition of the called line.

Assuming that the called line 32 is idle at the time the pulse time position 63c assigned thereto is selected in the connector in the manner explained above, such busy pulses as may be present on the common busy pulse in conductor 52b do not occur coincidentally with the selected commutator drive pulses generated by the connector pulse forming circuit 217 in the pulse time position 63c assigned to the called line. When coincidence between the selected commutator drive pulses and the busy pulses is lacking, the busy test circuit operates immediately the first commutator drive pulse appearing in the time position 63c is impressed thereon from the connector pulse forming circuit 217 over the conductor 239a. In operating, the circuit 218 impresses a positive potential upon the cut-through conductor 251a which is applied to the busy lock circuit 219 to prevent the latter circuit from operating at the end of the busy test interval. The positive potential applied to the cut-through conductor 251a in the busy test circuit 218 when this circuit operates is also applied to the units register advancer 281 over the conductor 289 to prevent this unit from responding to trunk hunting drive pulses as will be described in more detail hereinafter. When the busy test circuit 218 operates, it also impresses a positive potential upon another cut-through conductor 251 which is applied to the called line out gate circuit 224 to condition the latter circuit to repeat connector signal pulses in the time position 63c to the distributor 15, and is also applied to the busy gate circuit 220 so that connector pulses are released to the common busy pulse out conductor 52a. The positive potential developed on the cut-through conductor 251 is also applied to the called line in gate circuit 223 and the called line reconstructor circuit 222 thereby to condition these circuits to accept signals derived from the calling line. This feature of making operation of the circuits 223 and 222 dependent upon operation of the busy test circuit to indicate that the called line is idle, is necessary in order to prevent the calling subscriber from listening in on a conversation being held on the called line when the called line is busy.

In the event the called line 32 tests busy and the called line is a member of one of the private branch exchange trunk groups discussed generally heretofore, the trunk hunting facilities in the connector 12b operate to hunt for an idle trunk within the remaining lines in the called trunk group. Effectively, the trunk hunting control circuit 283, the tens register advancer 280, and the units register advancer 281 cooperate to perform the trunk hunting operation in the connector 12b. More specifically, if the called line 32 is busy, i.e., occupied with a call, busy pulses are present on the common busy pulse in conductor 52b in the time position 63c assigned to the called line, and these busy pulses are impressed upon the trunk hunting control circuit together with connector pulses which also appear in the time position 63c assigned to the called line, the connector pulses being impressed upon the trunk hunting control circuit 283 over the conductor 239. Simultaneously with the transmission of busy pulses and connector pulses to the trunk hunting control circuit 283, the trunk marking pulses produced in the manner described generally above in connection with Fig. 33 are also impressed upon the trunk hunting control circuit 283 over the conductor 56a. Coincidence of the connector pulses, the busy pulses, and the trunk marking pulses indicates that the called line is busy and is a member of a trunk group. The trunk hunting control circuit 283 responds to the coincidence between the connector pulses, the busy pulses, and the trunk marking pulses by developing a control potential which is transmitted over the conductor 288 to the units register advancer 281 to enable the advancer 281 to respond to trunk hunting drive pulses which are developed by the trunk hunting drive pulse generator 55 in the common equipment 17 and are transmitted to the units register advancer 281 over the conductor 55a. The units register advancer 281, once it is enabled, produces register drive pulses of uniform amplitude and duration in response to each trunk hunting drive pulse transmitted thereto over the conductor 55a, and each register drive pulse is transmitted to the units digit register 215 over the conductor 290. Each register drive pulse produced by the units register advancer 281 operates to advance the setting of the units digit register 215 by one time position so that the time position of the connector pulses produced on the conductor 239 by the connector pulse forming circuit 217 is advanced one units time position for each trunk hunting drive pulse impressed upon the enabled units register advancer 281. Each time the time position of the connector pulses is advanced by the units register advancer in the manner described above, the busy test circuit 218 compares the new time position of the connector pulses with the busy pulses which are impressed upon the busy test circuit 218 over the conductor 52b. If the new position of the connector pulses coincides again with busy pulses impressed upon the conductor 52b, thereby indicating that the next line in a called trunk group is busy, the busy test circuit is prevented from operating and the units register advancer 281 continues to advance the setting of the units digit register under the control of the trunk hunting drive pulses until the connector pulses are shifted to a time position in which they do not coincide with busy pulses impressed on the common busy pulse in conductor 52 or until the time position assigned to the last line in a called trunk group is reached, in which case no trunk marking pulse is present. Under these conditions, coincidence between the connector pulses, the busy pulses, and the trunk marking pulses ceases so that the trunk hunting control circuit 283 removes the control potential from the conductor 288 thus preventing the units register advancer from responding to further trunk hunting drive pulses and terminating further increase in the setting of the units digit register 215. In the event the last line in the called trunk group is busy, the busy lock circuit 219 functions in the manner described above at the end of the busy test interval to feed a bias potential back over the conductor 248 which has the effect of positively blocking the busy test circuit 218 from subsequent operation. However, the busy test interval is of sufficient duration to permit the trunk hunting facilities to advance the time position of the connector pulses in the manner described above through substantially the entire pulse time position frame, if necessary, before the busy lock circuit 219 operates to lock up the connector and advise the calling subscriber of the busy condition of all of the lines of the called trunk group.

In order to provide for trunk hunting through a group of consecutive time positions which are positioned in different tens digit levels, facilities are provided in the units digit register 215 for recycling this register each time the register is driven beyond a setting of 10. Simultaneously therewith there is produced a control pulse in the units digit register 215 which is transmitted over the conductor 286 to the tens register advancer 280. The tens register advancer 280 responds to the pulses impressed thereon over the conductor 286 by advancing the setting of the tens digit register 211 by one tens pulse interval each time the units digit register 215 is recycled.

In order to provide for trunk hunting through a group of lines such as the eighth trunk group illustrated in Fig. 33, i.e., wherein some of the lines occur in the last tens digit level and other succeeding lines occur in the first tens digit level, the tens digit register 211 is also provided with facilities for recycling this register after it has been advanced to a setting of 10.

Considering, for example, the operation of the trunk hunting facilities during the above-described call to the line 32, this line is a member of the trunk group including the lines 32–39, inclusive, 30, 41, and 42. The lines 32–39 and 30 are included in the third tens digit level, whereas the lines 41 and 42 are included in the fourth tens digit level. When the two digits "3" and "2" are successively dialed into the connector 12b, connector pulses are produced in the time position 63c assigned to the line 32 in the manner described above. Trunk marking pulses are produced by the trunk marking pulse generator 56 in this same time position and if busy pulses are also impressed upon the common busy pulse in conductor 52b in the time position 63c, the coincidence of the connector pulses, busy pulses, and trunk marking pulses causes the units register advancer to advance the setting of the units digit register 215 by one time position so that the connector pulses are shifted to the time position 64c, i.e., the time position assigned to the line 33. Since the line 33 is also marked by trunk marking pulses appearing in the time position 64c, the above-described coincidence may still occur if busy pulses are impressed on the conductor 52 in the time position 64c, thus indicating that the line 33 is also busy. Continued coincidence of the connector pulses, busy pulses, and trunk marking pulses permits the units register advancer to respond to successive trunk hunting drive pulses so that the connector pulses are advanced to the time position 71c, i.e., the time position assigned to the line 30. If the line 30 is also busy the coincidence between the trunk marking pulses, connector pulses, and busy pulses continues and the units register advancer continues to respond to trunk hunting drive pulses. The next trunk hunting drive pulse operates to recycle the units digit register 215 and simultaneously therewith the tens digit register 211 is advanced one setting to the tens pulse time position 75a so that the connector pulses are shifted from the thirtieth time position in each pulse frame to the thirty-first time position, i.e., the time position 62d assigned to the line 41. If the line 41 also tests busy, the connector pulses are again shifted to the time position 63d, i.e., the time position assigned to the line 42. However, since the line 42 is not marked by a trunk marking pulse, the units register advancer is prevented from responding to further trunk hunting drive pulses and the connector pulses remain in the time position assigned to the line 42 regardless of the idle or busy condition of this line. If the line 42 is idle, the busy test circuit 218 functions in the manner described above to impress a positive potential upon the cut-through conductors 251, 251a and 289 whereupon the connector continues with the placement of the call. On the other hand, if the line 42 also tests busy, the busy test circuit is prevented from operating and the busy lock circuit 219 operates at the end of the busy test interval to block the busy test circuit 218 against subsequent operation and advise the calling subscriber of the busy condition of all of the lines of the called trunk group.

Assuming that the line 32 is idle when called, when the called line out gate 224 is conditioned for operation through application of the described positive potential to the cut-through conductor 251, it responds to the connector pulses impressed upon the connector pulse conductor 239 by the connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63c assigned to the called line 32, whereby very narrow connector signal pulses are released over the conductor 51 to the distributor 15 which are well within the limits of the pulse time position 63c assigned to the called line. However, it will be understood that until ringing of the called line is effected, the above described connector signal pulses supplied to the distributor 15 in the pulse time position 63c are ineffective to establish talking communication with any of the substations associated with the called line. The positive potential applied to the cut-through conductor 251 is also impressed upon the ring trip circuit 221 to enable this circuit to terminate ringing at the proper time and is applied to the code start circuit 268.

The above described busy test and trunk hunting operations are initiated during the interdigit pause which separates the second and third digits and are performed independently of the selection of a party line ringing signal. During dialing of the third digit "2" at the calling substation A, the dial impulse integrator circuit 209 responds by transmitting two impulses to each of the inverter circuits 260, 261 and 262. As noted above, however, the tens and units register pulsers 210 and 214 are now prevented from responding to these impulses. Thus, only the party inverter circuit 262 repeats the two impulses to the party register pulser 263 over the conductor 237 and the latter circuit responds to these impulses by developing corresponding register drive pulses which are supplied over the conductor 240 to the party digit register 265 and the party sequence timing circuit 264. As a consequence, the party digit register is operated or driven to open the second party gate circuit therein, thereby to establish a path for the transmission of the interrupted ringback tone signal (Fig. 32 (14)) which corresponds to the code #2 party line ringing signal assigned to the called substation B, over the conductor 275 to the ringback tone gate tube to the network 225.

At the end of the third digit dialed into the connector 12*b* the party sequence timing circuit 264 operates to change the potential level on the conductor 242 to a value such that the party register pulser 263 is prevented from responding to further impulses. Concurrently, the change in potential level on the conductor 242 has the effect of rendering the code start circuit 268 operative to develop a control potential in response to the next occurring code start pulse transmitted thereto from the harmonic ringing code forming circuit 99 over the conductor 5, which control potential is impressed upon the ringback tone gate tube of the network 225 by way of the conductor 241. When this control potential is impressed upon the ringback tone gate circuit of the network 225 this circuit is rendered operative to gate the interrupted ringback tone signal corresponding to the code #2 party line ringing signal selected by the party digit register 265 to the calling line out gate circuit 226 over the conductor 244. The interrupted ringback tone signal is modulated on the signal pulses developed by the calling line out gate circuit 226 and thus is transmitted by way of the conductor 51 to the distributor 15 wherein the interrupted ringback tone is reconstructed and supplied to the line circuit 10. In the line circuit 10, the ringback tone signal, which it will be recalled consists of the two short ringing pulses 170 and 171 (Fig. 32 (2)), is transmitted over the calling line 23 to the calling substation A. Thus, the calling subscriber is informed that the called substations A′ and B′, associated with the called line 32 are being rung during the ringing intervals of the code #2 party line ringing signal assigned to the called substation B′. This feature of making operation of the ringback tone gate circuit dependent upon operation of the code start circuit 268 to develop a control potential is necessary in order to prevent the ringback tone gate circuit from opening in the middle of any one ringing period and gating only a portion of a given ringing signal which would result in an erroneous party line ring.

The ringback tone signal which is interrupted or keyed in accordance with the ringing intervals of the code #2 ringing signal assigned to the called substation B′, and which is gated by the ringback tone gate circuit in the manner described above, is concurrently used to control the ringing operation at the line circuit 16 and the transmission of ringing current over the called line 32. Thus, the interrupted ringback tone signal gated by the ringback tone gate circuit is rectified to reproduce the code #2 party line ringing signal originally developed in the harmonic ringing code forming circuit 99 and consisting of two short ringing pulses. These ringing pulses are supplied as positive pulses over the conductor 295 to the called line out gate circuit 224 for the duration of each positive ringing pulse. The called line out gate circuit 224 is thus controlled to release connector signal pulses to the distributor 15 in the pulse time position 63*c* which are approximately 50 percent larger in amplitude than those used to convey intelligence signals to the distributor 15 after the call is answered at the called substation B′. These large amplitude signal pulses are diverted by the distributor 15 to the line circuit 16 and serve to control the ringing control facilities in this line circuit. More specifically, the large amplitude connector signal pulses which appear on the conductor 51 during the ringing intervals of the selected party line ringing signal are detected in the distributor so as to reproduce the ringing pulses, and the ringing pulses are impressed upon a line ringing circuit in the line circuit 16. Opening of the line ringing circuit in the line circuit 16 during each ringng pulse results in the transmission of ringing current over the called line 32 during each short ringing pulse interval. Since the ringing pulses 170 and 171 (Fig. 32 (2)) occur during the first ringing period when a 66⅔ c.p.s. ringing current is impressed upon the common ringing cable 61, the frequency of the ringing current transmitted to the called line 32 during these two short ringing intervals is 66⅔ c.p.s. As discussed generally above, the substations A′ and B′ associated with the called line 32 are both provided with ringing facilities which respond to 66⅔ c.p.s. ringing current so that both ringers at these substations are rung for two short pulses during the first ringing period of each harmonic ringing cycle.

Ringing of both the party line substations A′ and B′ persists until the call is answered at the called party line substation B′ or until the call is abandoned at the calling substation A.

Assuming that the call is answered at the substation B′, the line circuit 16 functions to change the magnitude of the control potential supplied over the conductor 45*b* to the multiplexer 11 with the result that the gate circuit assigned to the line circuit 16 in the multiplexer 11 is opened to permit multiplexer pulses 83*c* occurring in the pulse time position 63*c* of each pulse frame to be transmitted through the multiplexer 11 and over the conductor 50 to the multiplexer input terminals of each of the finders and connectors of the system.

The multiplexer pulses 83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in time coincidence with the connector pulses impressed upon the circuit 223 over the connector pulse conductor 239 from the connector pulse forming circuit 217. As a consequence, the call answering signal carried thereby is gated to the reconstructor circuit 222 where it is detected to produce a potential on the conductor 252 which has the effect of tripping the ring trip circuit 221.

In operating, the ring trip circuit 221 functions to develop a positive potential on the ring trip conductor 253 which has the effect of closing the ringback tone gate circuit in the network 225 with the result that transmission of the interrupted or coded ringback tone signal to the calling substation is arrested. The called line out gate circuit 224 responds to the closure of the ringback tone gate circuit in the network 225 by decreasing by approximately 50 percent the amplitude of the connector signal pulses transmitted over the conductor 51 to the distributor 15. The ringing control facilities of the line circuit 16 respond to this decrease in the amplitude of the connector signal pulses delivered thereto by terminating the transmission of ringing current to the called substation. Thus, the ringing operation is arrested.

The positive potential produced on the ring trip conductor 253 also has the effect of conditioning the conversation timing control circuit 285 for operation at the end of a predetermined conversation timing period. The positive potential on the conductor 253 also has the further effect of supplying anode potential to the conversation timing warning tone gate tube in the conversation timing warning tone circuit 284. This potential also is supplied over the conductor 253 to the party digit register 265 to reset this register to zero, and is further applied to the party register advancer 282 over the conductor 253 to condition this circuit to respond to conversation timing pulses which are developed in the conversation timing pulse generator 57 and supplied over the common conductor 57*a* to the party register advancers 282 in each of the connectors 12*b*, 13*b*, and 14*b*.

Following the described operations in the connector 12*b*, a two-way talking or communication circuit is fully established between the calling substation A and the party line called substation B′. Thus, voice or other signals developed at the substation A and transmitted over the line 23 to the line circuit 10 serve to vary directly the bias voltage impressed upon the gate circuit of the multiplexer 11 over the conductor 53*a* in accordance with the instantaneous amplitude of such signals. As a consequence, the multiplexer pulses 84*b* released by the multiplexer 11 over the conductor 50 to the finders and connectors of the system in the pulse time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy pulse out conductor 52*a* from the circuit 202. In the finder 12*a*, the multiplexer pulses 84*b* maintain the +B switching circuit 201 operated to hold the link 12 associated with the line circuit 10. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in the pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the distributor 15 over the conductor 51 wherein the signal components of the connector signal pulses are detected and released by the distributor 15 to the line circuit 16. In the line circuit 16, the detected signals are transmitted over the line 32 to the called substation B′ where they are audibly reproduced by the receiver of the telephone instrument provided at this substation.

Voice signals developed at the called party line substation B′ and transmitted over the line 32 to the line circuit 16 cause the bias potential delivered over the conductor 45*a* to the gate circuit of the multiplexer 11 which corresponds to the line circuit 16 to vary in exact accordance therewith. As a consequence, the voice signals are modulated upon the multiplexer pulses 83*c* occurring within the pulse time position 63*c* and released through the gate circuit of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy pulse out conductor 52*b* in the time position 63*c* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuit 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are supplied to the distributor 15 over the conductor 51 wherein the signal components thereof are detected and released to the line circuit 10. In the line circuit 10, the detected signals are transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. However, it will be understood that each of the calling and called lines may have several party line substations associated therewith which are connected in parallel thereto so that the two-way talking circuits between the calling and called lines may be shared by a number, up to a maximum of ten, party line subscribers.

As stated generally heretofore, the party register advancer 282 is conditioned to respond to conversation timing pulses impressed upon the conductor 57*a* immediately after tripping of the ring trip circuit 221 when the called party answers. Concurrently with the conditioning of the party register advancer 282, the party digit register 265 is reset to zero since this register is no longer required for the gating of a ringback tone signal after the called party answers and a two-way talking circuit is established in the manners described above. The conversation timing pulses are produced at periodic intervals and the party register advancer responds to each conversation timing pulse by producing a register drive pulse which is supplied to the party digit register 265 over the conductor 291 to advance this register one step for each conversation timing pulse. The conversation timing pulses may occur, for example, at 40 second intervals so that the party digit register is advanced one stage for each 40 second interval of the call. When the ninth counting tube of the party digit register 265 is extinguished by the tenth register drive pulse produced by the party register advancer 282, a positive potential is developed on the conductor 292 which is transmitted to the conversation timing warning tone circuit 284.

The conversation timing warning tone circuit 284 is conditioned to respond to the above-described positive potential developed on the conductor 292 when the ninth counting tube 1029 in the party digit register 265 is extinguished, and transmits therethrough a short pulse of the warning tone signal impressed on the circuit 284 from the warning tone generator 58 over the conductor 58*a*. This short pulse of warning tone is transmitted over the conductor 244 to the calling line out gate circuit 226 wherein it is modulated upon pulses gated by this circuit in the time position 64*b* assigned to the line 23 and these warning tone pulse modulated pulses are transmitted over the conductor 51 to the distributor 15 wherein they are detected and supplied to the line circuit 10 to inform the calling subscriber at the substation A that the call will be terminated shortly. This short pulse of warning tone is also transmitted over the conductor 294 to the called line out gate circuit 224 wherein it is modulated on the connector signal pulses gated by the circuit 224 to the output conductor 51 and these modulated connector signal pulses are transmitted to the distributor 15 wherein they are detected and sent to the line circuit 16 so that the called subscriber at the called substation B' is also informed that the call is about to be terminated.

When the tenth counting tube of the party digit register 265 is extinguished by the eleventh register drive pulse produced by the party register advancer 282, a positive control potential is developed on the conductor 293 which is transmitted to the conversation timing control circuit 285.

The circuit 285 responds to the positive potential produced on the conductor 293 by producing a positive control pulse on the conductor 12e. In one embodiment of the conversation timing facilities the potential pulse on the conductor 12e is transmitted back to the finder 12a and is applied, for example, to the extinguishing tube in the +B switching circuit 201 of the finder 12a. As a result, the positive potential produced on the conductor 12b fires the extinguishing tube in the +B switching circuit 201 so that the +B switching tube in the circuit 201 is extinguished and operating anode potential is removed from the conductor 12c so that the finder connector link 12 is no longer operatively associated with the calling and called lines. Under these conditions, both the calling and called lines call in new linkage and dial tone is returned to both the calling and called lines subscribers so that they are informed that they should hang up.

In the alternative embodiment of the conversation timing facilities, the positive control pulse produced on the conductor 12e is applied to the busy test circuit 218 internally of the connector 12b so that the connector is made busy and returns a busy tone signal to the calling line subscriber. In this embodiment the called line is no longer busied when the connector is made busy at the end of the conversation timing period so that the called line immediately calls in new linkage and receives dial tone to inform the called line subscriber that the call has been automatically terminated by the conversation timing facilities.

In describing the manner in which the system components 10, 11, 12a, 12b, 15, and 16 are partially or wholly released upon termination of the call by either party and independently of the above-described conversation timing facilities, it may be assumed first that the called party at the party line substation B' is the first to hang up. In such case, the bias potential delivered from the line circuit 16 over the conductor 45b to the gating circuit of the multiplexer 11 individually assigned to the line circuit 16 is restored to its normal value when the called line loop circuit is opened, with the result that multiplexer pulses 83c appearing in the pulse time position 63c are no longer transmitted over the conductor 50 to the finders and connectors of the system. Such termination of multiplexer pulse transmission in the time position 63c to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63c assigned to the called line continue to be fed to the busy pulse out conductor 52b from the busy gate circuit 220 of the connector 12b, thereby to prevent substations associated with the called line 32 from originating a call or accepting an incoming call. This, of course, means that if the subscriber at any one of the substations associated with the called line picks up his receiver or hand set before the connection is released at the calling substation A, a two-way talking circuit between the calling and called lines is reestablished.

When the calling line subscriber disconnects by replacing the receiver or hand set at the substation A on its supporting hook or cradle, the loop circuit extending by way of the line 23 to the line circuit 10 is opened, with the result that the bias potential applied over the conductor 53b to that gate circuit of the multiplexer 11 which individually corresponds to the line circuit 10 is restored to its normal value. As a consequence, this gate circuit is biased to terminate the transmission of multiplexer pulses 84b occurring in the pulse time position 64b over the conductor 50 to the various finders and connectors of the system. When the transmission of multiplexer pulses 84b to the pulse input circuit 200 of the finder 12a is thus terminated, this circuit is rendered inactive to repeat pulses to the finder circuits, 201, 203, and 204. After a predetermined time interval, measured by the overall time constant of the +B switching circuit 201, this circuit responds to cessation of multiplexer pulse transmission thereto by removing the operating anode potential from the conductor 12c. As a consequence, the tens and units coincidence tube circuits 203 and 204 of the finder 12a are restored to normal to interrupt the production of finder gate and busy pulses in the pulse time position 64b by the finder pulse forming circuit 205. Thus, the application of pulses to the combining circuit 202 and hence to the busy pulse out conductor 52a in the pulse time position 64b assigned to the calling line 23 is arrested. Removal of the operating anode potential from the conductor 12c has the effect of rendering the self-allotting circuit 206 of the finder 12a operative to reassociate the link 12 with another calling line to handle another call. Cessation of busy pulse transmission to the busy pulse out conductor 52a in the pulse time position 64b has the effect of marking the calling line 23 as idle to permit initiation of a second call on this line or seizure of the line on a call incoming thereto.

Removal of operating anode potential from the conductor 12c also has the effect of restoring the component circuits 209, 211, 212, 215, 216, 218, 219, 264, 265, and 285 of the connector 12b to normal, thereby to condition the connector 12b to handle another call. Concurrently therewith, connector pulse production on the conductor 239 in the pulse time position 63c assigned to the called line 32 is terminated to arrest the application of busy pulses to the common busy pulse out conductor 52a by the busy gate circuit 220 in this pulse time position. Thus, the called line is unguarded to free the same for use in initiating another call or accepting a call incoming thereto. It will be noted that normalizing of the identified circuits of the connector 12b has the effect of restoring all components of this connector to the condition which prevailed at the time the link 12 was taken into use to handle the call just described. It will be noted that if the calling subscriber is the first to release the connection, i.e., hang up, the link 12 is immediately released under the control of the +B switching circuit 201 embodied in the finder 12a. However, in such case, the line circuit 16 associated with the called line 32 immediately assumes a setting indicating that the line 32 is calling, with the result that the link 12 is reassigned to the called line under the control of the self-allotting circuit 206 of the finder 12a and the usual dial tone signal is returned to the called subscriber. This signal has the effect of indicating to the called subscriber that the connection has been released at the calling substation and that he should hang up.

DETAILED DESCRIPTION OF THE SYSTEM

Figure 1:
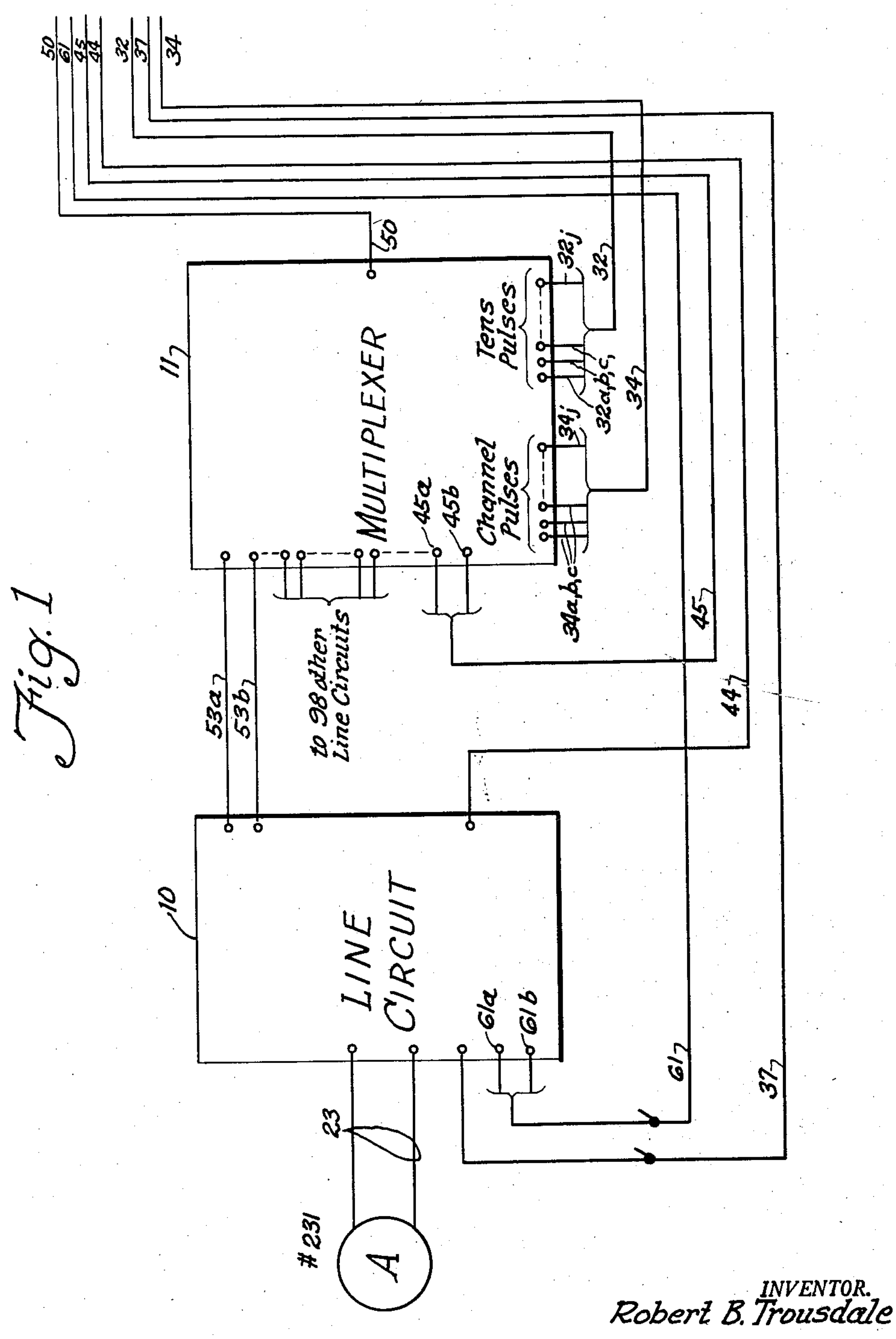

In considering the detailed circuitry of the system components briefly described above, operation of these components will be analyzed insofar as possible in terms of functions which tney perform in establishing the above-described connection between the substation A and the substation B′ in response to the call initiated at the substation A. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51 are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. In is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification the terms electronic and electronic means refer to and are intended to define means comprising electron conducting devices, such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

Also, in order to reduce the complexity of this specification those system components which are substantially identical to the corresponding system components of the copending application of Robert B. Trousdale and Frank A. Morris, Serial No. 134,974, filed December 24, 1949, or the corresponding system components of my copending application Serial No. 257,712, filed on November 23, 1951, will be only briefly described in this specification, reference being had to these copending applications for a complete and detailed description of the particular system components.

*Master oscillator 18*

This circuit is identical to the corresponding system component of the above-identified copending application, Serial No. 134,974, and is designed to provide a stable signal output voltage of approximately three volts at a frequency of one megacycle across the output terminals thereof. Preferably, the oscillator 18 is crystal controlled and is provided with relatively low impedance cathode follower output stages for driving a coaxial cable extending to the phase shift and pulse forming circuit 19.

*Phase shift and pulse forming circuit 19*

This circuit is identical to the corresponding system component described in detail in the copending application, Serial No. 134,974, identified above and is provided for the purpose of generating the extremely narrow pulses 95*a* and 96*a* (Figs. 28 to 31, inclusive) which are used in sampling the intelligence and control signals in the manner generally described above. Also, the circuit 19 performs the function of driving the units pulse ring circuit 20 and the commutator drive circuit 25 and is arranged to operate from the master oscillator 18 as previously explained. The circuit 19 responds to the sine wave signal delivered thereto from the master oscillator 18 by developing two sets of output pulses on the output conductors 40 and 41 which may be phase shifted with respect to each other over a full 360° phase shift range. This permits placement of the signal sampling pulses within the limits of corresponding units pulses of longer duration in the manner generally explained above.

*Commutator drive circuit 25*

This circuit is identical to the corresponding system component of the copending application, Serial No. 134,974, identified above, and is provided for the purpose of amplifying the positive pulses appearing on the commutator drive pulse conductor 41 and to act as an impedance matching network. As previously pointed out, the pulses 96*a* produced at the output terminals of this circuit are delivered over the conductor 35 to the channel pulse commutator 22 and to each of the connectors 12*b*, 13*b*, and 14*b* of the system. The pulse power requirements of these parallel connected components are fairly severe, which in part necessitates provision of the circuit 25 to amplify the pulses on the conductor 41 sufficiently to satisfy the pulse load requirements of the system.

*Ring circuits 20 and 21*

The units pulse ring circuit 20 and the tens pulse ring circuit 21 are substantially identical to the corresponding system components of the copending application, Serial No. 134,974, identified above, with the exception that in the system of the present invention no negative units and tens pulses are required. The units pulse ring circuit 20 is provided for the purpose of converting the ring drive pulses 95*a* developed on the ring drive pulse conductor 40 by the circuit 19 into positive units pulses of a finite and greater width than the channel pulses 96*a*, and of diverting or commutating the positive units pulses thus developed successively to the positive units pulse conductors 31*a*, 31*b*–31*j*. In a similar manner the tens pulse ring circuit 21 is provided for the purpose of producing positive tens pulses successively on the conductors 32*a*, 32*b*–32*j*. However, the driving pulses for the tens pulse ring circuit 21 are derived from the tenth units pulse forming stage of the units pulse ring circuit 20. In the alternative, the driving pulses for the tens pulse ring circuit 21 may be derived from the eighth units pulse forming stage and a phase shift and drive circuit employed to drive the tens pulse ring 21, as described in detail by my copending application, Serial No. 263,264, filed December 26, 1951, and assigned to the same assignee as the present invention.

*Channel pulse commutator 22*

This circuit is identical to the corresponding system component described in detail in the copending application, Serial No. 134,974, identified above, and is provided for the purpose of sequentially commutating the pulses developed on the conductor 35 over the conductors 34*a*, 34*b*–34*j* to the multiplexer 11.

*Busy tone generator 29a*

This generator is identical to the corresponding system component described in detail in the copending application, Serial No. 134,974, identified above and is provided for the purpose of supplying a signal voltage which is utilized in signalling calling subscribers when the lines to which calls are routed are tested and found busy.

*Dial tone generator 29b*

This generator is identical to the corresponding system component described in detail in the copending application, Serial No. 134,974, identified above and is provided for the purpose of producing a signal voltage which is employed to signal calling subscribers that dialing operations may be initiated. The circuitry of this generator is uniquely arranged to produce a wobbly dial tone signal, i.e., a 180 cycle signal modulated at 15 cycles which accurately simulates dial tone signals of similar character commonly in use at the present time.

*Ringback tone generator 29c*

This generator is substantially identical to the corresponding system component described in detail in the copending application, Serial No. 134,974, identified above, and is provided for the purpose of generating a low frequency signal voltage which is used to signal a calling substation that a called substation is being rung. More particularly, this generator is designed to produce a signal voltage having a frequency of approximately 200 cycles per second to which is added a lower frequency component of approximately 20 cycles per second. However, the output of the ringback tone generator 29c of the present invention is supplied over the conductor 27b to the harmonic ringing modulator circuit 100, whereas in the copending application Serial No. 134,974, identified above, the output of the ringback tone generator 29c is supplied to a ringing keying circuit to provide the conventional ringing sequence of one second on and four seconds off. In the system of the present invention the continuous wave output of the ringback tone generator 29c is gated in the modulator circuit 100 in the manner described generally above to provide two different ringback tone signals during each of the five harmonic ringing periods in each ringing cycle, as determined by the harmonic ringing code forming circuit 99.

*Supervisory carrier supply circuit 26*

This circuit is identical in many respects to the corresponding system component described in detail in the copending application, Serial No. 134,974, identified above and is provided to produce a sine wave signal voltage which is in synchronism with the master oscillator 18 and has a frequency of approximately 100 kilocycles which is supplied to the various line circuits of the system over the common conductor 37 for call forwarding operations in the manner described more fully below. However, unlike the corresponding component of the above referred to copending application, Serial No. 134,974, the sine wave signal voltage of the circuit 26 is supplied to the link coupling circuits 24 and repeated therethrough to the finders 12a, 13a, 14a of the system to permit a self-allotment of the finder-connector links of the system.

*Link coupling circuits 24*

This circuit is identical to the corresponding system component described in detail in my copending application, Serial No. 257,712, identified above, and functions to provide low impedance output circuits which may be multipled to all of the finders and connectors of the system. Specifically, the link coupling circuit 24 includes a busy pulse driver channel for repeating busy pulses to the busy pulse in conductor 52b from the busy pulse out conductor 52a and a supervisory carrier driver channel for repeating the 100 kilocycle carrier wave developed by the circuit 26 to the self allotting circuit 206 in the first finder 12a over the conductor 36a.

*Harmonic ringing oscillator 97*

Figure 24:
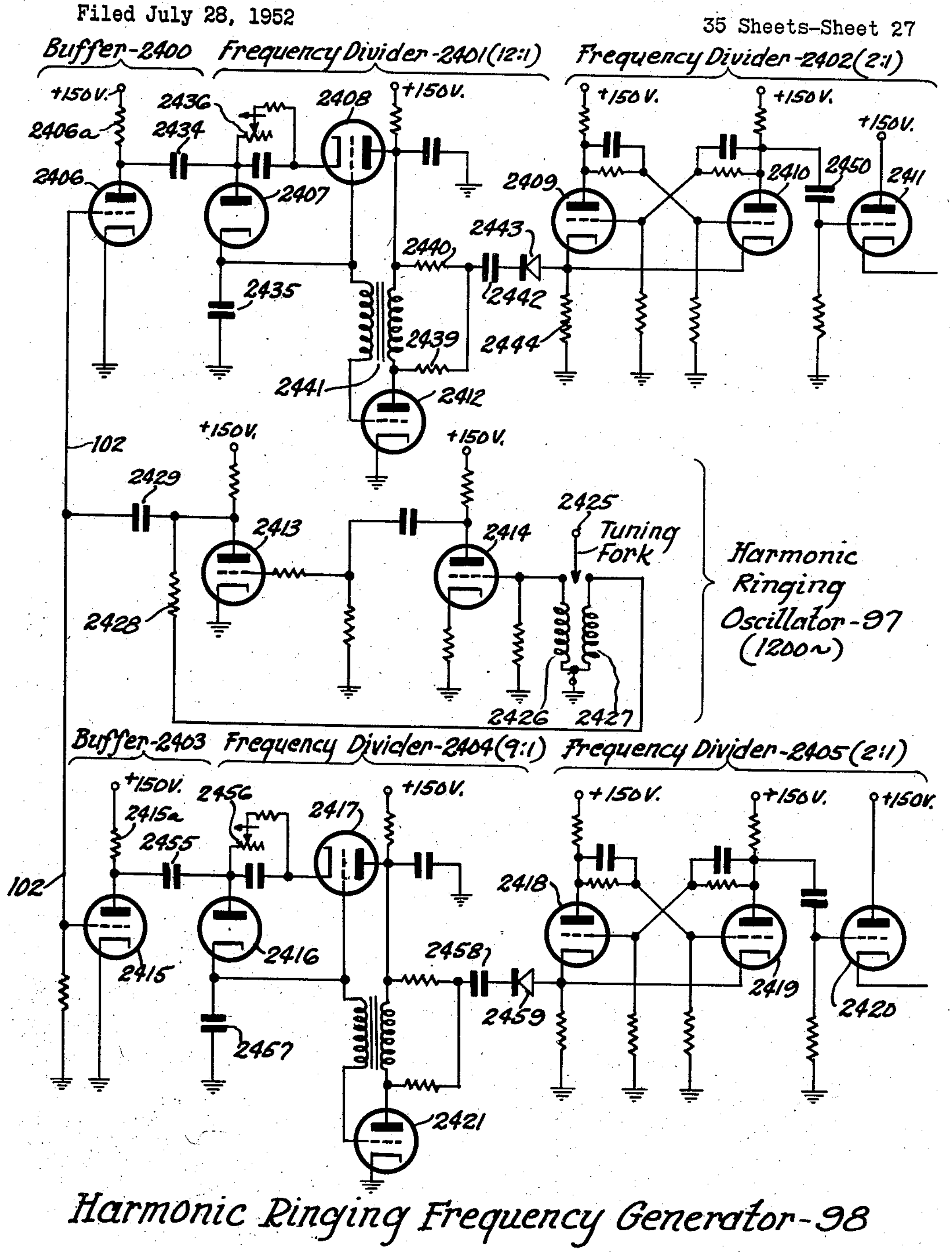

As discussed briefly in connection with the general description of the system, this circuit, which is shown in detail in Fig. 24 of the drawings, is designed to provide a highly accurate and stable reference frequency which may be used as a frequency standard to derive the five different ringing frequencies employed in the harmonic ringing system described generally above. Because of the high mechanical Q of the tuned ringers provided in the substations equipped with harmonic ringing facilities, it is necessary to main the several ringing frequencies within the close frequency tolerance of + or −1 cycle per second. Since the ringing frequencies are of extremely low frequency, the lowest ringing frequency being 16⅔ c.p.s., relatively large circuit values are needed in most circuit oscillators and it would be extremely difficult to design individual oscillators suitable for this service. Furthermore, there would be no easy method of tuning such individual oscillators in the field. While accurate tuning fork oscillators are available at relatively low cost and these oscillators would be suitable for a reference frequency, such oscillators, if operated directly at the low ringing frequencies, would be inordinately large and expensive. However, in accordance with the present invention, a reference frequency is chosen which is within the range of a practical, inexpensive tuning fork oscillator and the reference frequency is chosen so that it is related in a simple mathematical manner to the desired ringing frequencies. While there are several frequencies lying within the range of 1,000 to 4,000 cycles which would be multiples of 16⅔ c.p.s., the common multiple of the other four ringing frequencies, in the illustrated embodiment a reference frequency of 1,200 c.p.s., is employed since this reference frequency may also be used as a reference frequency for the decimonic series of ringing frequencies, namely, the frequencies of 20 c.p.s., 30 c.p.s., 40 c.p.s, 50 c.p.s., and 60 c.p.s. In the synchromonic series of ringing frequencies, namely, the frequencies of 16 c.p.s., 30 c.p.s., 42 c.p.s., 54 c.p.s., and 66 c.p.s., there is no common multiple frequency since the ringing frequencies of this series are deliberately chosen to be non-harmonic. However, the 1,200 cycle reference frequency is also convenient for deriving this series of ringing frequencies.

In order to provide an accurate and stable reference frequency of 1,200 c.p.s., a tuning fork oscillator is provided as shown in detail in Fig. 24 of the drawings. Refering to this figure, the oscillator 97 comprises a modified tuning fork 2425 which is housed in a sealed unit and is constructed of a special alloy. The elastic constant of the fork varies with temperature in such a way as to compensate for the expansion or contraction of the fork and the accuracy of the fork over a range of temperatures of greater than 100° F. is one part in three thousand. The tuning fork 2425 vibrates in a magnetic field set up by the windings 2426 and 2427. The output winding 2426 is coupled to the control grid of a first high gain amplified 2414, preferably of the commercial type *6AQ6*, and the output voltage from the tube 2414 is further amplified in a second high gain amplifier 2413, also preferably of the commercial type *6AQ6*. A feedback connection is provided from the anode of the tube 2413 through the resistor 2428 to the winding 2427 so that this winding acts as a driving winding to provide the necessary energy for keeping the fork in motion and a small direct current flows through the resistor 2428 and the winding 2427 to magnetize the structure of the fork. Since the two windings 2426 and 2427 are coupled to one another magnetically through the fork, the frequency induced in the output winding 2426 will be a function of the tuning fork frequency, i.e., 1200 c.p.s. The output from the second high gain amplifier 2413 is coupled through the condenser 2429 to the conductor 102 over which it is transmitted to the components of the harmonic ringing frequency generator 98.

*Harmonic ringing frequency generator 98*

Figure 25:
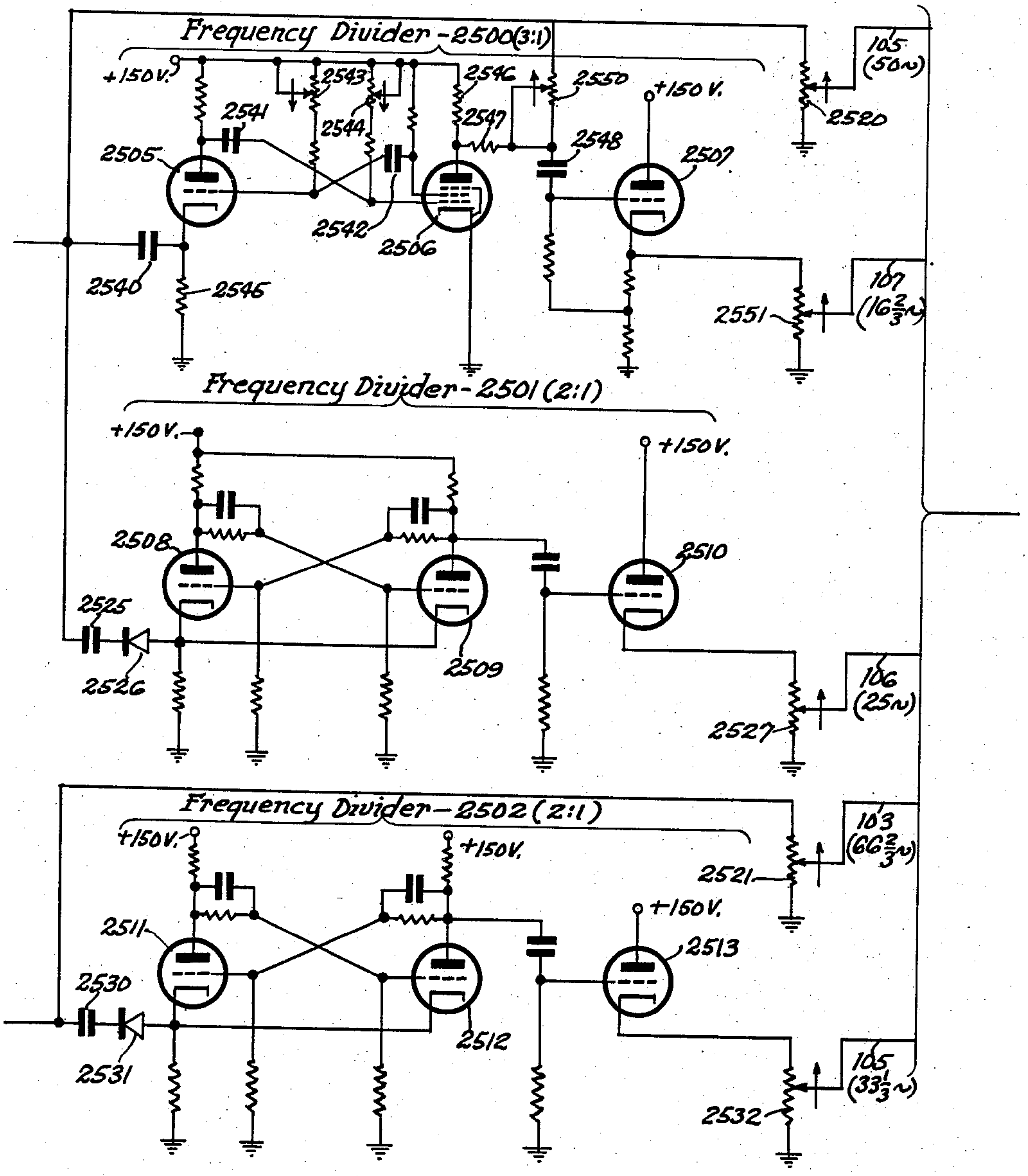

As discussed briefly in connection with the general description of the system, this circuit, which is shown in detail in Figs. 24 and 25 of the drawings, is provided for the purpose of deriving the five ringing frequencies of the harmonic series, namely 16⅔ c.p.s., 25 c.p.s., 33⅓ c.p.s., 50 c.p.s., and 66⅔ c.p.s. from the 1200 cycle reference frequency produced by the harmonic ringing oscillator 97. More specifically, the harmonic ringing frequency generator 98 includes the buffer amplifiers 2400 and 2403, including the tubes 2406 and 2415, a first frequency divider 2401, comprising the tubes 2407, 2408, and 2412, which divides the 1200 c.p.s. reference frequency by twelve to obtain a 100 c.p.s. wave; a second frequency divider 2402, comprising the tubes 2409, 2410, and 2411, which divides the 100 c.p.s. wave by two to provide a 50 c.p.s. ringing frequency which is supplied to the output conductor 104; a third frequency divider 2500, comprising the tubes 2505, 2506, and 2507, which divides the 50 c.p.s. wave by three to obtain a 16⅔ c.p.s. wave which is supplied to the output conductor 107; a fourth frequency divider 2404, comprising the tubes 2416, 2417, and 2421, which divides the reference frequency by nine to obtain a 133⅓ c.p.s. wave; a fifth frequency divider 2405, comprising the tubes 2418, 2419, and 2420, which divides the 133⅓ c.p.s. wave by two to obtain a 66⅔ c.p.s. ringing frequency which is supplied to the output conductor 103; a sixth frequency divider 2502, including the tubes 2511, 2512, and 2513, which divides the 66⅔ c.p.s. wave by two to obtain a 33⅓ c.p.s. ringing frequency which is supplied to the output conductor 105, and a seventh frequency divider 2501, including the tubes 2508, 2509, and 2510 which divides the 50 c.p.s. wave by two to obtain a 25 c.p.s. ringing frequency which is supplied to the output conductor 106. The tubes 2406, 2408–2412, inclusive, 2415, 2417–2421, inclusive, 2505, and 2507–2513, inclusive, are all preferably of the commercial type 6C4, the tube 2506 is preferably of the commercial type 6AK6, and the tubes 2407 and 2416 are preferably of the commercial type 6AL5.

Considering now the operation of the harmonic ringing frequency generator in developing the five different ringing frequencies described above, the 1200 c.p.s. reference frequency produced in the manner described above by the harmonic ringing oscillator 97 is transmitted over the conductor 102 to the buffer amplifiers 2400 and 2403. More specifically, the 1200 c.p.s. reference wave is transmitted over the conductor 102 to the control grid of the buffer amplifier tube 2406 and the control grid of the buffer amplifier tube 2415. The tubes 2406 and 2415 are operated at zero bias and function to limit the positive and negative excursions of the 1200 cycle reference wave so that a 1200 c.p.s. square wave is produced across the anode resistors **2406*a* and 2415*a* of the respective tubes 2406 and 2415. The 1200 c.p.s. reference wave developed in the anode circuit of the tube 2406 is coupled to the frequency divider 2401 and the 1200 cycle reference wave developed in the anode circuit of the tube 2415 is coupled to the frequency divider 2404**.

The frequency dividers 2401 and 2404 are substantially identical except for the fact that the divider 2401 divides the 1200 cycle reference frequency by twelve to provide a 100 c.p.s. wave, and the divider 2404 divides the 1200 cycle reference frequency by nine to provide a 133⅓ c.p.s. wave. Since the dividers 2401 and 2404 are substantially identical, only a description of the divider 2401 is included herein. However, it will be understood that this description applies equally well to the divider 2404. Generally considered, the frequency divider 2401 is of the so-called step divider type which is described in the article "An Improved Counter-Timer for Television," by C. E. Hallmark, Engineering Edition of Radio News for July 1947, pages 8, 9, 22, and 23. While reference may be had to the above article for a complete and detailed description of this frequency divider, for the purposes of the present invention it may be stated that the condensers 2434 and 2435 are charged in series with the diode 2407 from the anode circuit of the buffer amplifier tube 2406. The condensers 2434 and 2435 acquire charge in inverse proportion to their capacitance values and the condenser 2434 is discharged during each step by means of the cathode follower type triode discharge tube 2408. However, the condenser 2435 retains its charge so that a staircase or stepped voltage wave is produced across the condenser 2435. The staircase voltage is applied to the control grid of a blocking oscillator tube 2412 and the tube 2412 will fire when the amplitude of the staircase wave exceeds a certain threshold limit. As a result, an output pulse is produced in the anode circuit of the blocking oscillator 2412 for each twelve steps of voltage produced across the condenser 2435, and a frequency division of 12 to 1 is accomplished. In order to provide a linear charging characteristic for the timing condenser 2435, the discharging tube 2408 is of the cathode follower type and a potentiometer 2436 is provided in the cathode circuit of the discharge tube 2408 to provide an appropriate time constant in the cathode circuit of the tube 2408 commensurate with the frequency of the 1200 cycle reference wave which is impressed upon the condensers 2434 and 2435. While the illustrated arrangement employing a linearized feed-back system including the tube 2408 is preferably to enable accurate division by a factor of 12, it will be understood that other simplified frequency dividers such as the conventional double-diode step divider may be employed if desired.

The wave form developed by the blocking oscillator tube 2412 consists of a negative pulse followed by a positive pulse and appears across the series connected resistors 2440 and 2439 connected across the anode winding of the blocking oscillator transformer 2441. These pulses which recur at a rate of 100 c.p.s. are coupled through the condenser 2442 to the anode of a clipping rectifier 2443 so poled as to block the transmission of the negative portion of the applied waveform. The rectifier 2443 is connected to the frequency divider 2402 and the divider 2402 accomplishes a further frequency division of two. More specifically the divider 2402 includes the tubes 2409 and 2410 which are inter-connected as an Eccles-Jordan trigger circuit of the so-called single security type wherein tubes 2409 and 2410 are triggered on and off by the same signals applied to the common cathode connection of these tubes. More specifically, the cathode of the rectifier 2443 is connected to the cathodes of the tubes 2409 and 2410 and to the common cathode resistor 2444 so that the positive pulses produced by the blocking oscillator tube 2412 and transmitted by the rectifier 2443 in the manner described above function periodically to switch the tubes 2409 and 2410 from a conductive to a non-conductive state. Since two pulses from the blocking oscillator tube 2412 are required to complete one cycle of the Eccles-Jordan trigger circuit, it will be evident that a 50 cycle square wave is produced in the anode circuit of the tube 2410. In this connection it will be understood that the rectifier 2443 isolates the frequency divider 2402 from the frequency divider 2401 for pulses of negative polarity. Thus, the initial negative pulse generated by the blocking oscillator 2412 operates to open the rectifier 2443 and hence is not transmitted to the cathode circuit of the frequency divider 2402. As a result, improper triggering from negative pulses is completely avoided and the frequency divider 2402 is accurately and positively controlled from the previous frequency divider 2401. The 50 cycle square wave produced in the anode circuit of the tube 2410 is coupled through the condenser 2450 to the control grid of a cathode follower tube 2411 and is repeated in like phase across the cathode potentiometer 2520 thereof. A variable portion of the 50 cycle square wave may be selected at the arm of the potentiometer 2520 and is transmitted over the conductor 104 to the harmonic ringing modulator circuit 100.

In a similar manner the frequency divider 2404 produces a frequency division of 9 to 1 so that 133⅓ c.p.s. pulses are produced in the anode circuit of the blocking oscillator tube 2421 thereof. To this end the values of the condensers 2455 and 2457 and the adjustment of the potentiometer 2456 are so chosen that a frequency division of 9 to 1 is achieved. In other respects the frequency divider 2404 is substantially identical to the divider 2401 described in detail above. The positive 133⅓ c.p.s. pulses produced at the anode of the tube 2421 are coupled through the condenser 2458 and the clipping rectifier 2459 to the frequency divider 2405. The divider 2405 is identical with the divider 2402 described in detail above, the rectifier 2459 providing isolation in a manner identical with the rectifier 2443 above, and a 66⅔ c.p.s. output square wave is produced across the cathode potentiometer 2521 of the cathode follower output tube 2420. A variable portion of the 66⅔ c.p.s. wave is selected at the arm of the potentiometer 2521 and transmitted over the conductor 103 to the harmonic ringing modulator circuit 100.

In order to provide a ringing frequency of 25 c.p.s., the 50 c.p.s. output wave from the cathode follower 2411 is coupled through the condenser 2525 and the isolating rectifier 2526 to the frequency divider 2501 wherein a frequency division of two to one is produced. The frequency divider 2501 is identical with the frequency divider 2402 described in detail above, and a 25 cycle square wave is produced across the cathode potentiometer 2527 of the cathode follower output tube 2510 thereof. A variable portion of the 25 cycle square wave is produced at the arm of the potentiometer 2527 and transmitted over the conductor 106 to the harmonic ringing modulator circuit 100.

In order to provide a 33⅓ c.p.s. ringing frequency, the 66⅔ c.p.s. output from the cathode follower 2420 is coupled through the condenser 2530 and the isolating rectifier 2531 to the frequency divider 2502 wherein a frequency division of two to one is obtained. The divider 2502 is identical with the divider 2402 described in detail above and a 33⅓ c.p.s. square wave is produced across the cathode potentiometer 2532 in the cathode circuit of the cathode follower output tube 2513 thereof. A variable portion of the 33⅓ c.p.s. square wave is produced at the arm of the potentiometer 2532 and transmitted over the conductor 105 to the modulator circuit 100.

In order to provide a 16⅔ c.p.s. output wave of the frequency divider 2402, which constitutes a 50 c.p.s. square wave, is divided by three in the frequency divider 2500. More specifically, the frequency divider 2500 includes the tubes 2505 and 2506 which are interconnected to form a conventional multivibrator circuit. Thus, the anode of the tube 2505 is coupled through the condenser 2541 to the first control grid of the tube 2506 and the screen grid of the tube 2506 is coupled through the condenser 2542 to the control grid of the tube 2505. The frequency of the multivibrator may be adjusted by means of the potentiometers 2543 and 2544 in the respective first control grid circuits of the tubes 2505 and 2506. The cathode of the tube 2411 in the frequency divider 2402 is connected through the condenser 2540 to the cathode resistor 2545 of the tube 2505 so as to synchronize the multivibrator with the 50 c.p.s. wave produced at the cathode of the tube 2411. The frequency of the multivibrator is adjusted by means of the potentiometers 2543 and 2544 to be exactly 16⅔ c.p.s., and the condenser 2540 and resistor 2545 constitute a differentiation circuit so as to provide triggering pulses occurring at the rate of 50 c.p.s. which synchronize and control the frequency of the multivibrator. In order to isolate the output circuit of the multivibrator from the control grid circuits thereof, the anode of the tube 2506 is used as an output electrode, and a 16⅔ c.p.s. square wave is produced across the anode resistor 2546 thereof. This 16⅔ c.p.s. square wave is coupled through the resistor 2547 and the coupling condenser 2548 to the control grid of a cathode follower output tube 2507.

As described immediately above, each of the ringing frequencies produced on the conductors 103–107, inclusive, comprises a square wave which is symmetrical, i.e., equal on and off periods, so that each ringing frequency contains only the fundamental and the odd harmonics thereof. Thus, for example, the 66⅔ c.p.s. square wave produced on the conductor 103 includes only the frequency components of the fundamental frequency, 66⅔ c.p.s., the third harmonic frequency, 200 c.p.s., etc. Of these five ringing frequencies only the 16⅔ c.p.s. square wave contains a third harmonic which would fall within the range of the other ringing frequencies and hence interfere with the tuned bell ringers at the individual substations associated with the called line. This will be readily apparent when it is realized that the third harmonic of the 16⅔ c.p.s. square wave is 50 cycles so that if any appreciable amount of third harmonic is present in the 16⅔ c.p.s. wave, the ringing facilities responsive to 50 c.p.s. current would be rung at the same time as the desired 16⅔ c.p.s. ringing facilities.

In order to eliminate the third harmonic from the 16⅔ c.p.s. wave produced on the conductor 107, a portion of the 50 c.p.s. square wave is superimposed upon the 16⅔ c.p.s. square wave in the correct phase and amplitude exactly to cancel the third harmonic of the 16⅔ c.p.s. square wave. To this end a potentiometer 2550 is connected from the cathode of the tube 2411 to the junction point of the condenser 2548 and the resistor 2547, thereby injecting a predetermined amount of 50 c.p.s. square wave into the cathode follower output stage 2507. Since the third harmonic of the 16⅔ c.p.s. square wave is approximately 30 percent of the fundamental, a substantial amount of 50 c.p.s. square wave is introduced to cancel the undesired third harmonic and the amount of injected 50 c.p.s. square wave may be adjusted by means of the potentiometer 2550. As stated above, the output circuit of the tube 2506 is isolated from the frequency determining elements of the multivibrator so that the injected 50 c.p.s. does not interfere with the proper operation of the multivibrator. Accordingly, there is produced on the output conductor 107 a 16⅔ c.p.s. square wave in which the third harmonic is eliminated. The fifth harmonic of 16⅔ c.p.s. is 83⅓ c.p.s. which is well above the highest ringing frequency so that this harmonic does not interfere with the harmonic ringing facilities at any of the substations.

As discussed generally heretofore, the harmonic ringing frequency generator 98 may be readily adapted to provide the five ringing frequencies of the decimonic frequency series, i.e., 20 c.p.s., 30 c.p.s., 40 c.p.s., 50 c.p.s., and 60 c.p.s. To this end the frequency divider 2401 is modified to divide the 1200 cycle reference wave by ten instead of twelve so that the output from the divider 2401 comprises 120 c.p.s. pulses. These pulses drive the frequency divider 2402 which develops a 60 c.p.s. square wave which is impressed upon the output potentiometer 2520. The divider 2402 again drives the frequency divider 2501 so as to provide across the output potentiometer 2527 a 30 c.p.s. square wave. Also, the divider 2402 drives the divider 2500 and a portion of the 60 c.p.s. square wave is added to the divider 2500 in the manner described above so as to provide across the output potentiometer 2551 a 20 c.p.s. square wave which is devoid of any third harmonic frequency. To provide a 50 c.p.s. square wave the frequency divider 2404 is modified to divide the 1200 c.p.s. reference wave by twelve so that 100 c.p.s. pulses are produced in the output of the divider 2404 and these 100 c.p.s. pulses drive the frequency divider 2505 so that there is produced across the output potentiometer 2521 a 50 c.p.s. square wave. In order to provide a 40 c.p.s. square wave another frequency divider which can be substantially identical to the dividers 2401 and 2404 is provided and is designed to divide the 1200 c.p.s. reference wave by fifteen to develop 80 c.p.s. pulses which are used to drive the frequency divider 2502 so that there is produced across the output potentiometer 2532 a 40 c.p.s. square wave. It will thus be evident from the foregoing description that the harmonic ringing frequency generator 98 may be adapted for the decimonic series of ringing frequencies by merely employing another frequency divider and adjusting the counting rates as described above.

*Harmonic ringing code forming circuit 99*

Figure 22:
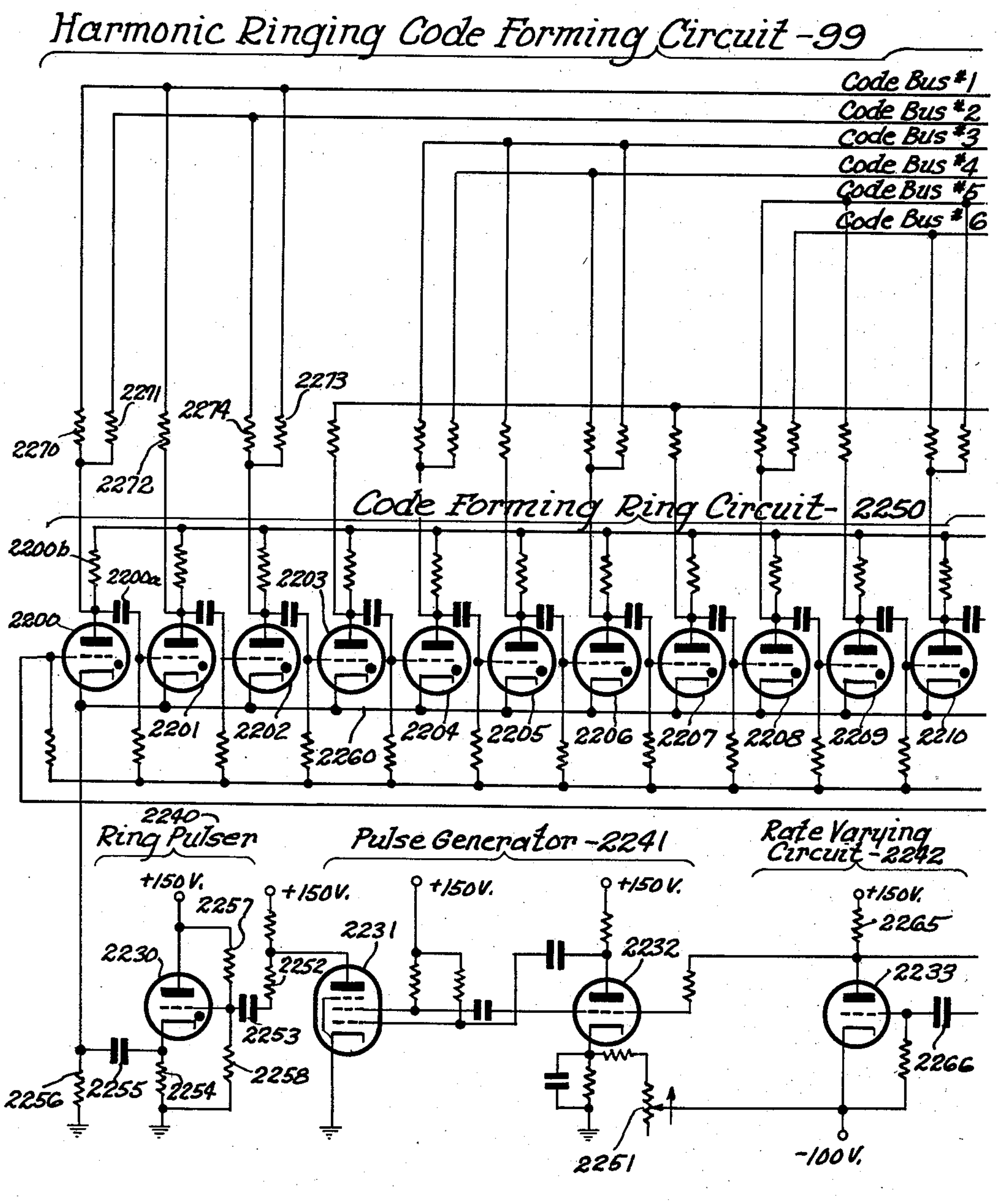
Figure 23:
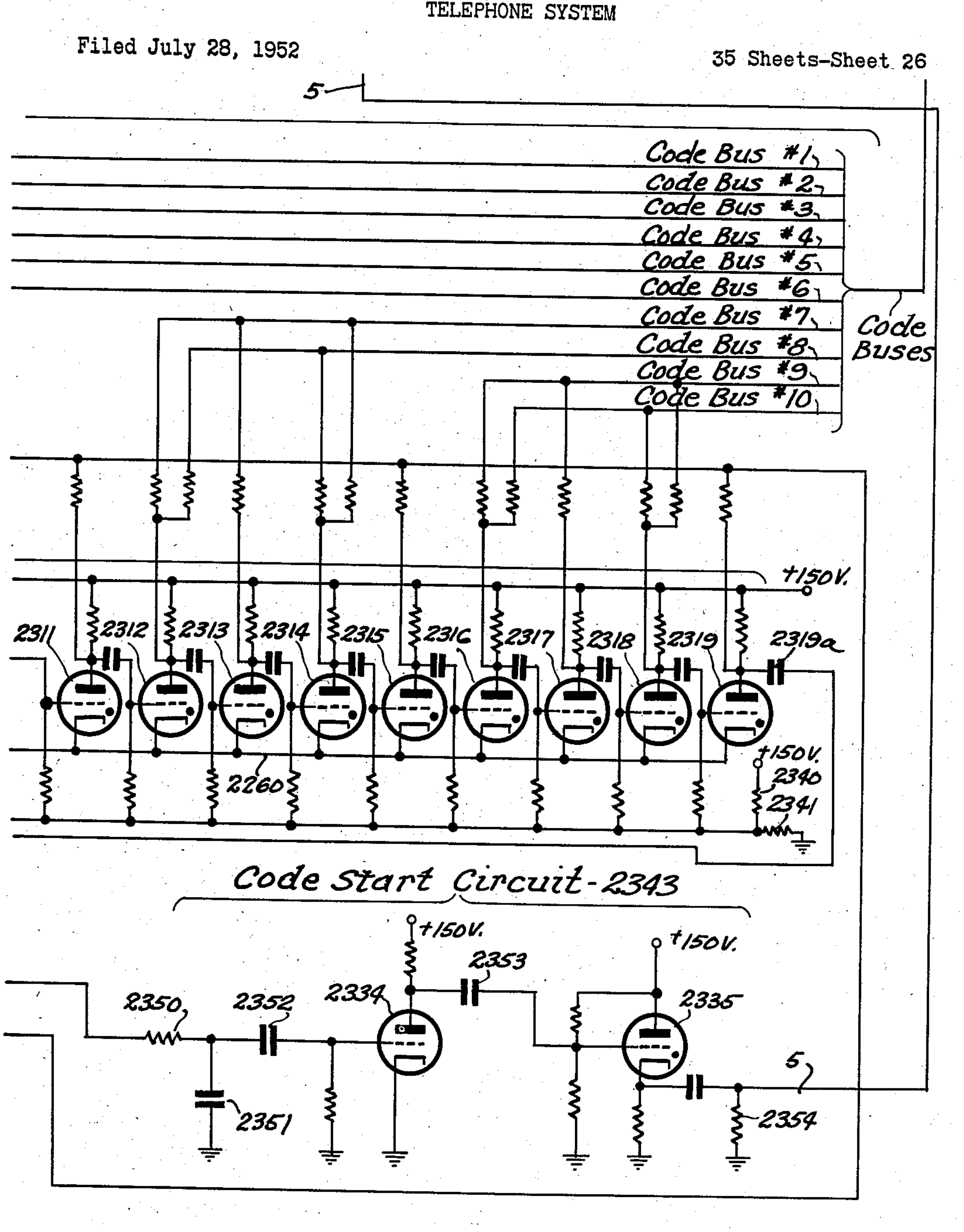

As discussed briefly in the general description of the system, this circuit, the details of which are illustrated in Figs. 22 and 23 of the drawings, is provided for the general purpose of establishing a series of five successive ringing periods of approximately 1½ seconds' duration each, which recur in repetitive ringing cycles, each ringing period being separated by a short guard interval of approximately one-tenth of a second. During each ringing period the circuit 99 functions simultaneously to develop two differently coded ringing signals so that a total of ten ringing signals are produced during each ringing cycle. To this end each ringing period is divided into three code unit intervals of one-half second duration each and a long ringing pulse is produced during each ringing period by combining three successive code unit intervals. In addition, two short ringing pulses are produced during each ringing period by utilizing the first and third code unit intervals in each ringing period so that two short ringing pulses of one-half second duration separated by one-half second of silence are also produced during each ringing period.

As described generally heretofore, the coded ringing pulses produced by the circuit 99 are employed to modulate or key the continuous wave ringback tone signal produced by the ringback tone generator 29*c* and the interrupted ringback tone signals thus formed on ten different tone buses are supplied to all of the connectors of the system over the multiple conductor tone bus cable 48. The particular interrupted ringback tone signal corresponding to the party line ringing signal assigned to the called party line substation is selected in the connector associated with the call and is used to control the intervals during which the called substations are rung. If, for example, the selected ringback tone signal occurs during the first ringing period, the ringing control facilities in the line circuit associated with the called line will release 66⅔ c.p.s. ringing current to the called line for the duration of the ringing pulses corresponding to the selected ringback tone signal.

Considering now in more detail the harmonic ringing code forming circuit 99, this circuit comprises a pulse generator 2241, a rate varying circuit 2242, a ring pulser 2240, a code forming ring circuit 2250, and a code start circuit 2343. The pulse generator 2241 is provided for the purpose of producing pulses at a predetermined low frequency rate, preferably in the order of two cycles per second, and includes a pentode tube 2231, preferably of the commercial type 6AK5, and a triode tube 2232, preferably of the commercial type 6C4. The tubes 2231 and 2232 are interconnected as a free running multivibrator and the frequency of the generator 2241 may be varied by means of the potentiometer 2251.

In order to provide relatively sharp drive pulses suitable for driving the code forming ring circuit 2250 from the pulse generator 2241, the output of the generator 2241 is supplied to a ring pulser 2240. Thus, the multivibrator pulses produced at the anode of the tube 2231 are coupled through the resistor 2252 and the condenser 2253 to the control grid of a cold cathode gaseous discharge tube 2230, preferably of the commercial type 5823. The cathode of the tube 2230 is connected through the resistor 2254 to ground and is also connected through the series combination of a condenser 2255 and a resistor 2256 to ground, the anode of the tube 2230 being connected to a positive source of potential. Normally, the control grid of the tube 2230 is biased somewhat positively by means of the voltage divider network including the resistors 2257 and 2258. However, the positive bias thus applied to the control grid of the tube 2230 is not sufficient to cause this tube to fire. When a positive multivibrator pulse is coupled through the condenser 2253 to the control grid of the tube 2230, this tube fires so as to produce a flow of current through the resistors 2254 and 2256 included in the cathode circuit thereof. Initially, the condenser 2255 is uncharged so that relatively large pulses of uniform magnitude are produced across the resistor 2256 in response to each multivibrator pulse produced by the generator 2241. However, after each drive pulse the condenser 2255 charges up so that the anode-cathode potential of the tube 2230 is reduced below the value at which conduction can be supported and the tube 2230 is extinguished. The resistor 2254 is also sufficiently large that the tube 2230 will not remain conductive after the condenser 2255 becomes charged. The pulser 2240 thus provides ring drive pulses of uniform amplitude and duration in response to each of the pulses generated by the generator 2241. The ring drive pulses produced by the pulser 2240 are connected directly to the common cathode ring drive conductor 2260 in the code forming ring circuit 2250.

The code forming ring circuit 2250 comprises a string of twenty pulse forming tubes 2200–2210, inclusive, and 2311–2319, inclusive, which are preferably of the cold cathode gaseous discharge commercial type 5823 and are connected in an endless series to provide a ring circuit in which only one tube of the ring is ignited at any given instant. To this end the cathodes of all of the pulse forming tubes are connected to the common ring drive conductor 2260 so that the cathodes of these tubes are all simultaneously pulsed positively to render all of the tubes non-conductive for the duration of each ring drive pulse. The anode circuit of each of the pulse forming tubes is coupled to the control grid of the next succeeding tube in the ring so that these tubes are successively switched from a non-conductive state to a conductive state and back to a non-conductive state in accordance with the ring drive pulses supplied to the ring drive conductor 2260. Thus, the anode of the first pulse forming tube 2200 is coupled through the condenser 2200*a* to the control grid of the next succeeding tube 2201. In a similar manner, the anode of each pulse forming tube is coupled to the control grid of the next succeeding tube in the ring, the last tube 2319 being coupled through the condenser 2319*a* to the control grid of the first tube 2200.

The control grids of all of the pulse forming tubes are connected to a common positive potential established by the voltage divider network including the resistors 2340 and 2341. Each of the pulse forming tubes is provided with an anode resistor connected to a common positive potential source, and there is produced at the anode of each tube a negative pulse during the intervals when the tube is conducting. For example, there is provided the anode resistor 2200*b* connected between the anode of the tube 2200 and the positive potential source so as to provide a negative pulse at the anode of the tube 2200 during the periods when this tube is rendered conductive.

Figure 32:
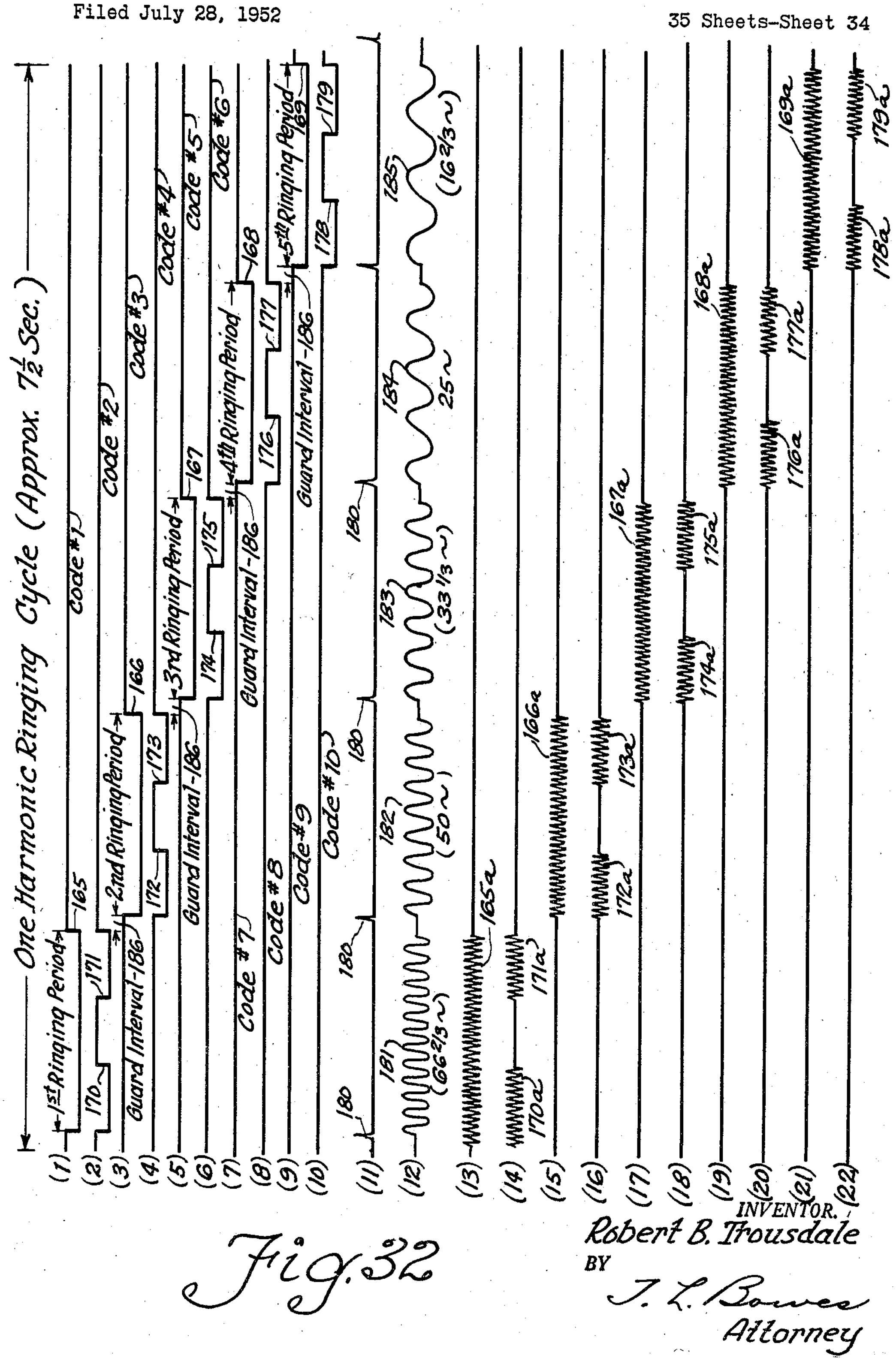

As discussed generally heretofore in connection with Fig. 32 of the drawings, each ringing period is separated by a relatively short guard interval so that the fourth, eighth, twelfth, sixteenth, and twentieth stages of the ring circuit 2250 are provided for the sole purpose of establishing guard intervals between successive groups of three pulse forming tubes. However, since it is not necessary to provide a guard interval of one-half second duration, the repetition rate of the pulse generator 2241 is increased when the ring is advanced to the fourth, eighth, twelfth, sixteenth, and twentieth stages thereof. Thus, the anodes of the tubes 2203, 2207, 2311, 2315, and 2319 are connected through isolating resistors to the rate varying circuit 2242 which latter circuit functions to vary the grid bias potential of the tube 2232 in the generator 2241. The rate varying circuit 2242 includes the tube 2233 which is preferably of the commercial type 6C4. The cathode of the tube 2233 is connected to a negative source of potential, the anode of the tube 2233 is connected through the resistor 2265 to a positive source of potential, and the tube 2233 is operated at zero bias so that the anode of this tube is normally operated at a somewhat negative potential with respect to ground due to the voltage drop through the resistor 2265. When one of the tubes 2203, 2207, 2311, 2315 or 2319 is fired during the normal operation of the ring circuit 2250, there is produced in the anode circuit thereof a negative pulse which is coupled through the condenser 2266 to the control grid of the tube 2233 to bias this tube beyond cutoff. As a result, the anode potential of the tube 2233 increases positively so as to increase in a positive sense the grid bias potential on the tube 2232. The repetition rate of the multivibrator comprising the tubes 2231 and 2232, is controlled in part by the grid bias potential supplied to the tube 2232, as will be readily apparent to those skilled in the art, so that when the tube 2233 is cut off the repetition rate of the multivibrator is substantially increased. As a result, the generator 2241 produces its next pulse approximately one-tenth of a second after any one of the guard interval tubes 2203, 2207, 2311, 2315, and 2319 is fired so that the ring is advanced to the next succeeding stage after a short guard interval of one-tenth of a second. As soon as the ring is advanced to the next stage the guard interval tube becomes non-conductive so that the tube 2233 is again rendered conductive and the grid bias potential on the tube 2232 is brought back to normal. Accordingly, for the next three cycles the generator 2241 again has a repetition rate of approximately two cycles per second.

The outputs of the pulse forming tubes other than the guard interval tubes mentioned above are connected in predetermined combinations to the code buses numbered 1–10, inclusive. Thus, the output of the first pulse forming tube 2200 is connected through the isolating resistor 2270 to the code bus #1 and through the isolating resistor 2271 to the code bus #2. The second pulse forming tube 2201 is connected through the isolating resistor 2272 to only the code bus #1. The third pulse forming tube 2202 is connected through the isolating resistor 2272 to the code bus #1 and through the isolating resistor 2274 to the code bus #2. It is thus seen that the outputs of the three successive tubes 2200, 2201, and 2202 are connected to the code bus #1 so that the long ringing pulse 165 (Fig. 32 (1)), of negative polarity is produced on the code bus #1. Also, the outputs of the tubes 2200 and 2202 are connected to the code bus #2 so as to produce the two short ringing pulses 170 and 171 (Fig. 32 (2)), which are also of negative polarity. There is thus produced during the first ringing period a long ringing pulse on the code bus #1, and two short ringing pulses on the code bus #2. In a similar manner, the outputs of the remaining pulse forming tubes, other than the guard interval tubes, are connected through appropriate isolating resistors to the code buses 3–10, inclusive, to provide ringing pulses substantially as shown in Figs. 32 (3)–(10), inclusive.

In order to produce a code start pulse at the end of each guard interval which is supplied to the connectors of the system to control the initiation of the party line ringing operation, there is provided a code start pulse circuit 2343 comprising the tube 2334, which is preferably of the commercial type 6C4, and the tube 2335, which is preferably of the cold cathode gaseous discharge commerical type 5823. In the anode circuit of the rate varying tube 2233 a negative pulse is produced at the end of each guard interval and this pulse is integrated in the network including the resistor 2350 and condenser 2351 and coupled through the condenser 2352 to the control grid of the inverter tube 2334. This pulse appears as a positive pulse at the anode of the tube 2234 and is coupled through the condenser 2353 to the control grid of the gas tube 2335. The tube 2335 is connected as a pulser and is substantially identical to the ring pulser tube 2230 described in detail above so that there is produced across the output resistor 2354 thereof positive code start pulses of uniform amplitude and duration at the end of each guard interval which are supplied over the conductor 5 to all of the connectors of the system.

Considering now the operation of the code forming circuit 99, the pulse generator 2241 and ring pulser 2240 operate to produce relatively large positive ring drive pulses ring drive pulses on the conductor 2260 at a normal repetition rate of two cycles per second. For the duration of each ring drive pulse all of the pulse forming tubes 2200–2210, inclusive, and 2311–2319, inclusive, are extinguished. When a conducting one of the pulse forming tubes is extinguished the positive pulse produced in the anode circuit thereof is coupled to the next succeeding pulse forming tube to turn on this tube immediately after the ring drive pulse disappears so that the pulse forming tubes are fired in endless succession at the rate of one tube for each ring drive pulse. When the fourth, eighth, twelfth, sixteenth, and twentieth tubes are fired a negative pulse is produced at the anodes of these tubes so that the rate varying tube 2233 is cut off and the repetition rate of the generator 2241 correspondingly increased. Each time the rate varying tube 2233 is rendered conductive at the end of the guard interval a code start pulse is produced by the circuit 2343 and these code start pulses are transmitted over the conductor 5 to the connectors of the system.

*Harmonic ringing modulator circuit 100*

Figure 19:
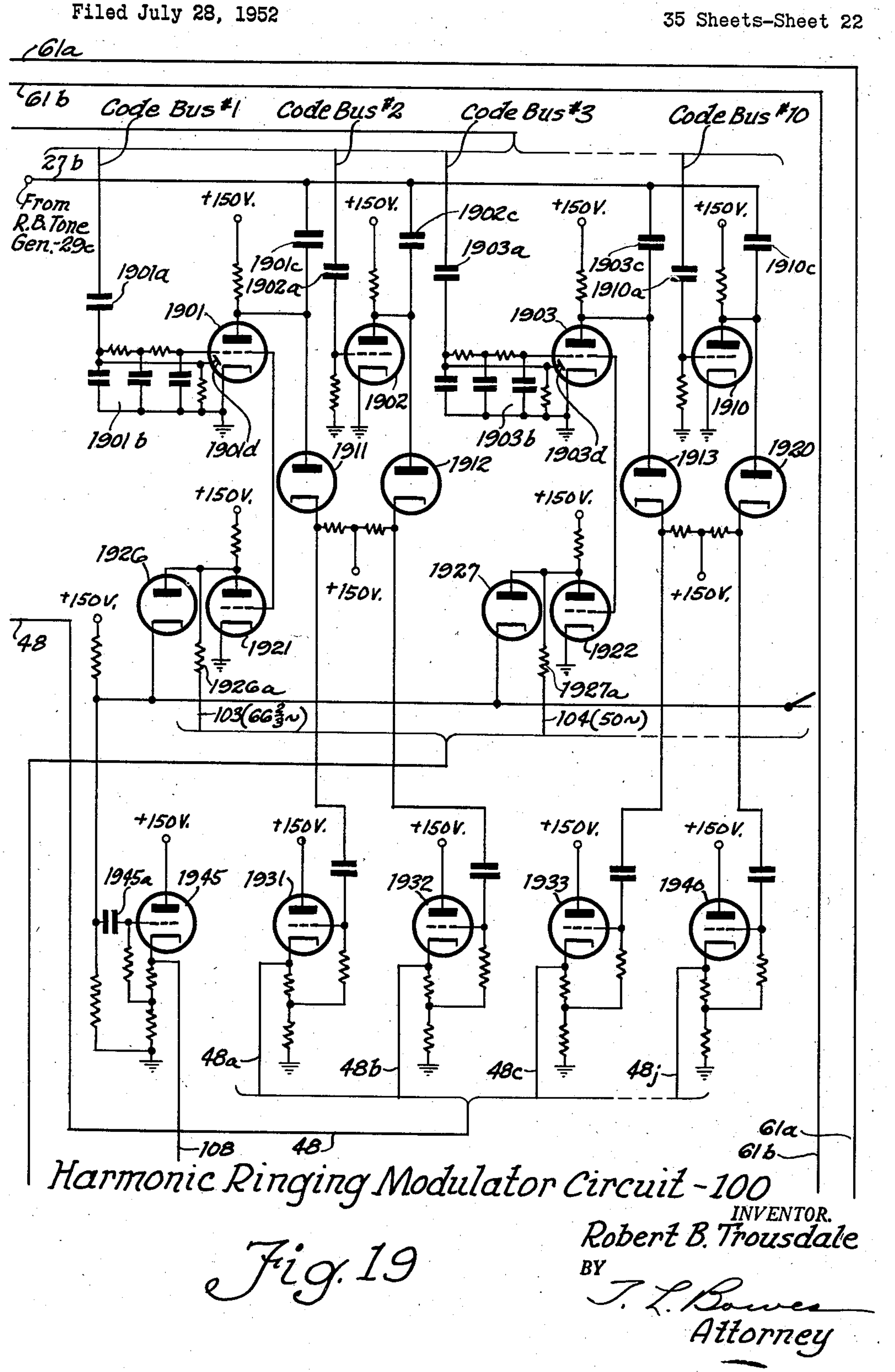

As discussed briefly in connection with the general description of the system, this circuit, which is shown in detail in Fig. 19 of the drawings, is provided for the purpose of producing interrupted ringback tone signals which individually correspond to the code numbers 1–10, inclusive, developed by the harmonic ringing code forming circuit 99 and illustrated in Figs. 32 (13)–(22), inclusive, of the drawings. The harmonic ringing modulator circuit 100 also performs the function of sequentially impressing the five different ringing frequencies upon the common output conductor 108 during the five different ringing periods of each harmonic ringing cycle.

Referring to this figure, the ringback tone signal section of the modulator circuit 100 includes a horizontal string of ten limiter and inverter tubes of which the first three tubes 1901, 1902, 1903, and the last tube 1910 are shown, a corresponding horizontal string of ten ringback tone gate tubes of which the first three tubes 1911, 1912, 1913, and the last tube 1920 are shown, and a corresponding horizontal string of ten cathode follower output tubes of which the first three tubes 1931, 1932, 1933, and the last tube 1940 are shown. The ringing frequency multiplexer section of the modulator circuit 100 includes a horizontal string of five limiter and inverter tubes of which the first two tubes 1921 and 1922 are shown, a corresponding horizontal string of five ringing frequency gate tubes of which the first two tubes 1926 and 1927 are shown, and a common cathode follower output tube 1945. The ten tubes 1901–1910, inclusive, and the five tubes 1921–1925, inclusive, are preferably of the commercial type 6AQ6, the ten tone gate tubes 1911–1920, inclusive, and the five ringing frequency gate tubes 1926–1930, inclusive, are preferably of the commercial type 6AL5, and the cathode follower tubes 1931–1940, inclusive, and 1945 are preferably of the commercial type 6C4.

Considering now the operation of the harmonic ringing modulator circuit 100 in performing the above-described functions, the continuous wave ringback tone signal is supplied from the ringback tone generator 29c over the conductor 27b to the ten limiter and inverter tubes 1901–1910, inclusive, through the illustrated coupling condensers 1901c, 1902c, 1903c–1910c. The long ringing pulses 165–169, inclusive (Figs. 32 (1), 32 (3), 32 (5), 32 (7) and 32 (9)) which are supplied to the odd numbered ones of the limiter and inverter tubes 1901–1910, inclusive, are also used to control the ringing frequency limiter and inverter tubes 1921–1925, inclusive. Thus, the first ringing pulse 165, which defines the first ringing period, is transmitted over the code bus #1, through the coupling condenser 1901*a*, and through a low pass filter network 1901*b* to the control grids of both of the tubes 1901 and 1921. In a similar manner the ringing pulse 166, which defines the second ringing period in each harmonic ringing cycle, is transmitted over the code bus #3, through the condenser 1903*a*, and a low pass filter network 1903*b* to the control grids of both of the tubes 1903 and 1922. In this connection it will be understood that the remaining ringing pulses 167, 168, and 169 are supplied to the corresponding odd numbered limiter and inverter tubes 1905, 1907, and 1909 and the corresponding limiter and inverter tubes 1923, 1924, and 1925, although these tubes are not shown in the drawings. The base lines of the negative ringing pulses 165–169, inclusive, are clamped to ground potential by means of diode rectifiers associated with each of the odd numbered limiter and inverter tubes 1901–1910, inclusive. Thus, the base line of the ringing pulse 165 is clamped to ground potential by means of a diode rectifier including the diode anode 1901*d* and the cathode of the tube 1901. Similarly, the base line of the ringing pulse 166 is clamped to ground by a circuit which includes the diode anode 1903*d* and the cathode of the tube 1903.

All of the limiter and inverter tubes 1901–1910, inclusive, and 1921–1925, inclusive, are operated at zero bias so that these tubes are normally fully conductive and the anode potential thereof is normally at a relatively low level. However, the negative ringing pulses which are impressed upon the respective code buses #1–10, inclusive, are of sufficient amplitude to bias the limiter and inverter tubes well beyond cutoff, and for the interval of these ringing pulses the anode potential of each limiter and inverter tube rises to substantially the anode supply potential of 150 volts. When a particular limiter and inverter tube is rendered non-conductive by the ringing pulses impressed upon the control grid thereof, the continuous wave ringback tone signal is gated through the associated tone gate tube and the interrupted ringback tone signal thus produced is repeated through the corresponding cathode follower stage to one of the ringback tone signal conductors 48*a*–48*j*, inclusive. Thus, considering the first limiter and inverter tube 1901, the single long ringing pulse 165, which constitutes the code #1 signal, cuts off the tube 1901 so that the anode potential thereof increases positively and causes the diode tone gate tube 1911 connected thereto to conduct. When the tube 1911 is conducting, the ringback tone signal impressed upon the anode thereof through the condenser 1901*c* is transmitted through the tube 1911 to the control grid of the cathode follower tube 1931 and is repeated therethrough. There is thus produced on the output conductor 48*a* connected to the cathode of the tube 1931 the interrupted ringback tone signal 165*a* (Fig. 32 (13)), which consists of a 200 cycle tone modulated at 20 c.p.s. and persisting for the duration of the first ringing period, i.e., the duration of the pulse 165. In a similar manner, when the two short ringing pulses 170 and 171 which constitute the code #2 signal, are impressed upon the control grid of the limiter tube 1902, this tube is cut off and the anode potential thereof increases positively so as to open the tone gate tube 1912. When the tube 1912 is conducting the ringback tone signal impressed upon the anode thereof through the condenser 1902*c* is transmitted through the tube 1912 to the control grid of the cathode follower 1932 and is repeated therethrough to the conductor 48*b* so as to produce on this conductor the interrupted ringback tone signal consisting of the ringback tone signal pulses 170*a* and 171*a* shown in Fig. 32 (14). In an entirely similar manner the remaining codes #3–10, inclusive, are employed to develop corresponding interrupted tone signals which are impressed upon the output conductors 48*c*–48*j*, inclusive, and which are transmitted to all of the connectors 12*b*, 13*b*, and 14*b* of the system.

It will be recalled that the long ringing pulses 165 to 169, inclusive, are developed in the code forming circuit 99 by combining three consecutive output pulses from the code forming ring circuit thereof. In combining three consecutive pulses, switching transients are produced in the transition period from one stage of the ring to the next, and if these switching transients are permitted to exist in the ringing pulse they would interfere with the proper operation of the tone gate and ringing frequency gate tubes. In order to remove these switching transients, the low pass filters 1901*b*, 1903*b*, etc., are provided and these filters reduce the amplitude of the intermediate switching transients in each long ringing pulse so that these transients do not affect the corresponding limiter and inverter tubes 1901, 1903, etc. As a result, the tubes 1901, 1903, etc., remain completely cut off for the duration of the respective ringing pulse supplied to the control grids thereof. Since the short ringing pulses which constitute the even nuumbered codes do not contain switching transients, no low pass filter is required in the input circuit of the corresponding limiter and inverter tubes 1902, 1904, etc.

In order to multiplex the five different ringing frequencies upon the common output conductor 108 during the five different ringing periods of each harmonic ringing cycle, the limiter and inverter tubes 1921–1925, inclusive, and the ringing current gate tubes 1926–1930, inclusive, are employed. More specifically, the first long ringing pulse 165 is impressed upon the control grid of the limiter and inverter tube 1921 so as to render this tube non-conductive for the duration of the pulse 165. During this interval the anode potential of the tube 1921 is increased positively so as to open the corresponding ringing current gate tube 1926. The five different ringing currents, which are impressed upon the conductors 103–107, inclusive, are respectively supplied to the anodes of the ringing current gate tubes 126, 127–130, inclusive, through the respective isolating resistors 1926*a*, 1927*a*, etc. Accordingly, when the gate tube 1926 is opened for the duration of the ringing pulse 165, the 66⅔ c.p.s. ringing current transmitted over the conductor 103 and through the resistor 1926*a* to the anode of the tube 1926 is coupled through this tube to the control grid of the common output tube 1945 through the condenser 1945*a*. When the ringing pulse 165 ceases, the tube 1921 is again rendered conductive so as to close the ringing current gate tube 1926 and terminate the transmission of 66⅔ c.p.s. ringing current to the common output tube 1945. A short guard interval 186 exists between the ringing pulse 165 and the next ringing pulse 166 and during this guard interval no ringing current is supplied to the common output tube 1945. However, during the second ringing period the ringing pulse 166 renders the tube 1922 non-conductive so as to open the corresponding ringing current gate tube 1927 and gate a 50 c.p.s. ringing current to the common output tube 1945 for the duration of the second ringing period. In an entirely similar manner ringing frequencies of 33⅓ c.p.s., 25 c.p.s., and 16⅔ c.p.s. are successively impressed upon the control grid of the common output tube 1945 during the third, fourth, and fifth ringing periods. The multiplexed ringing currents which are impressed upon the control grid of the tube 1945 are repeated through this tube and transmitted over the common conductor 108 to the harmonic ringing amplifier and supply circuit 101.

*Harmonic ringing amplifier and supply circuit 101*

Figure 26:
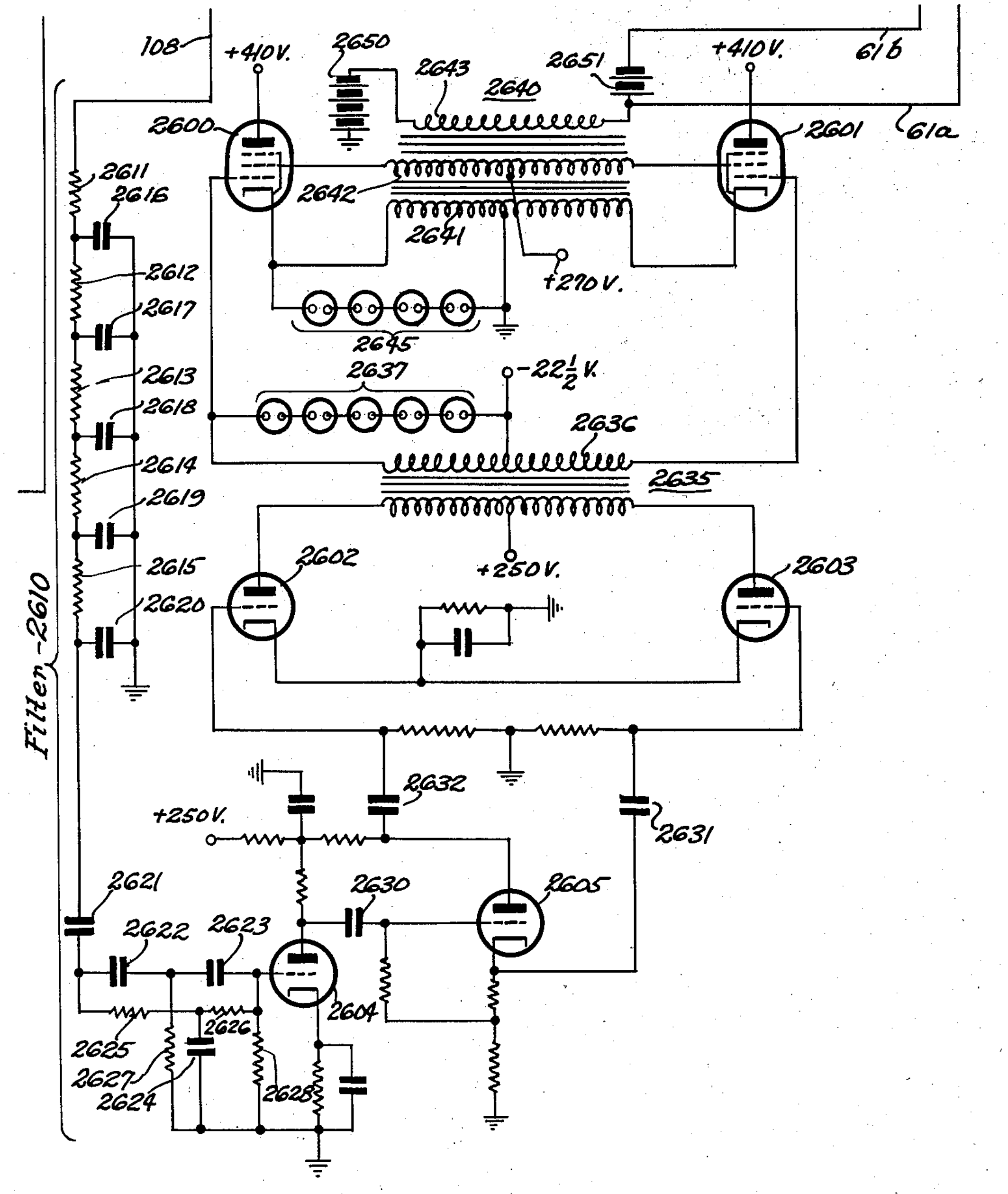
Figure 28:
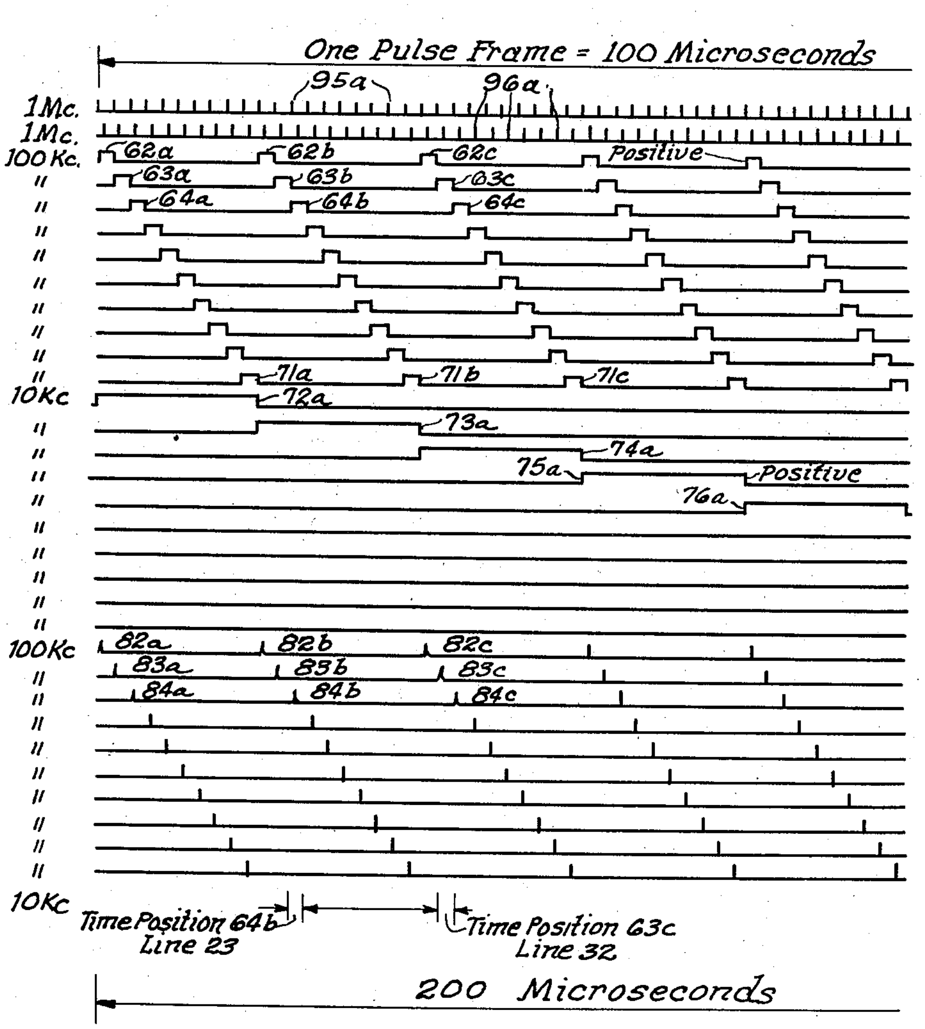
Figure 29:
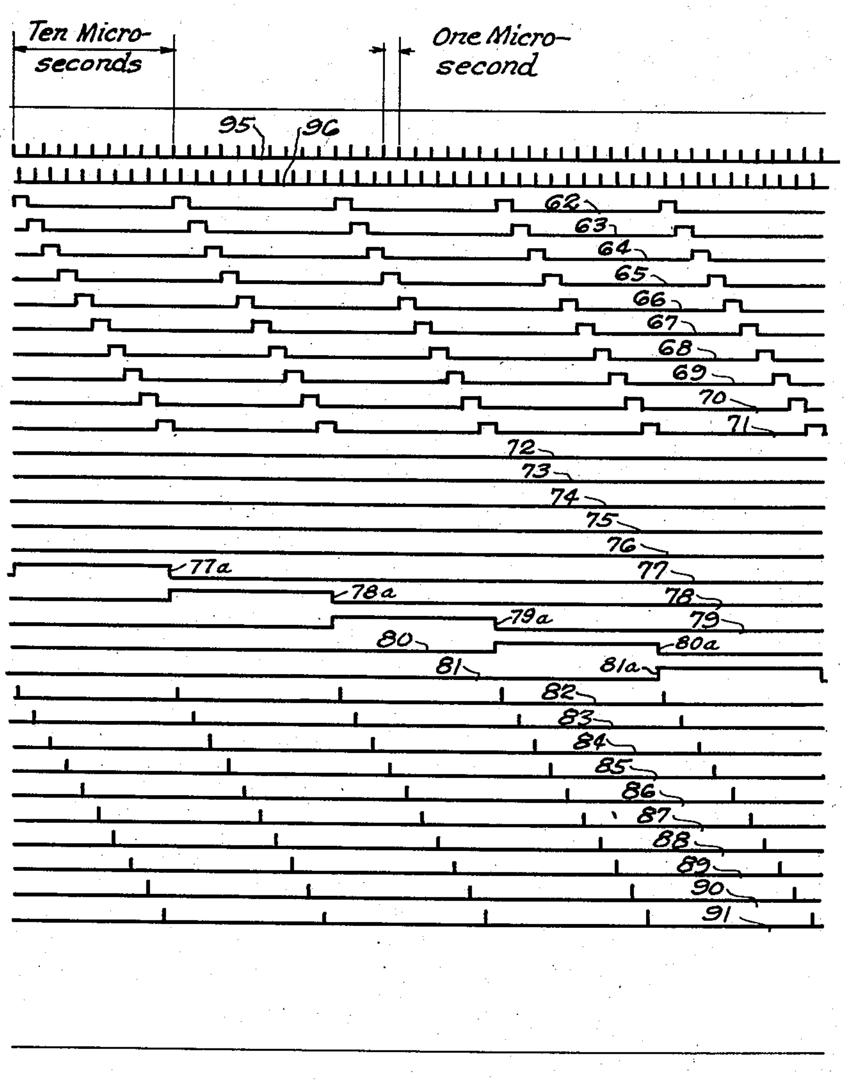
Figure 30:
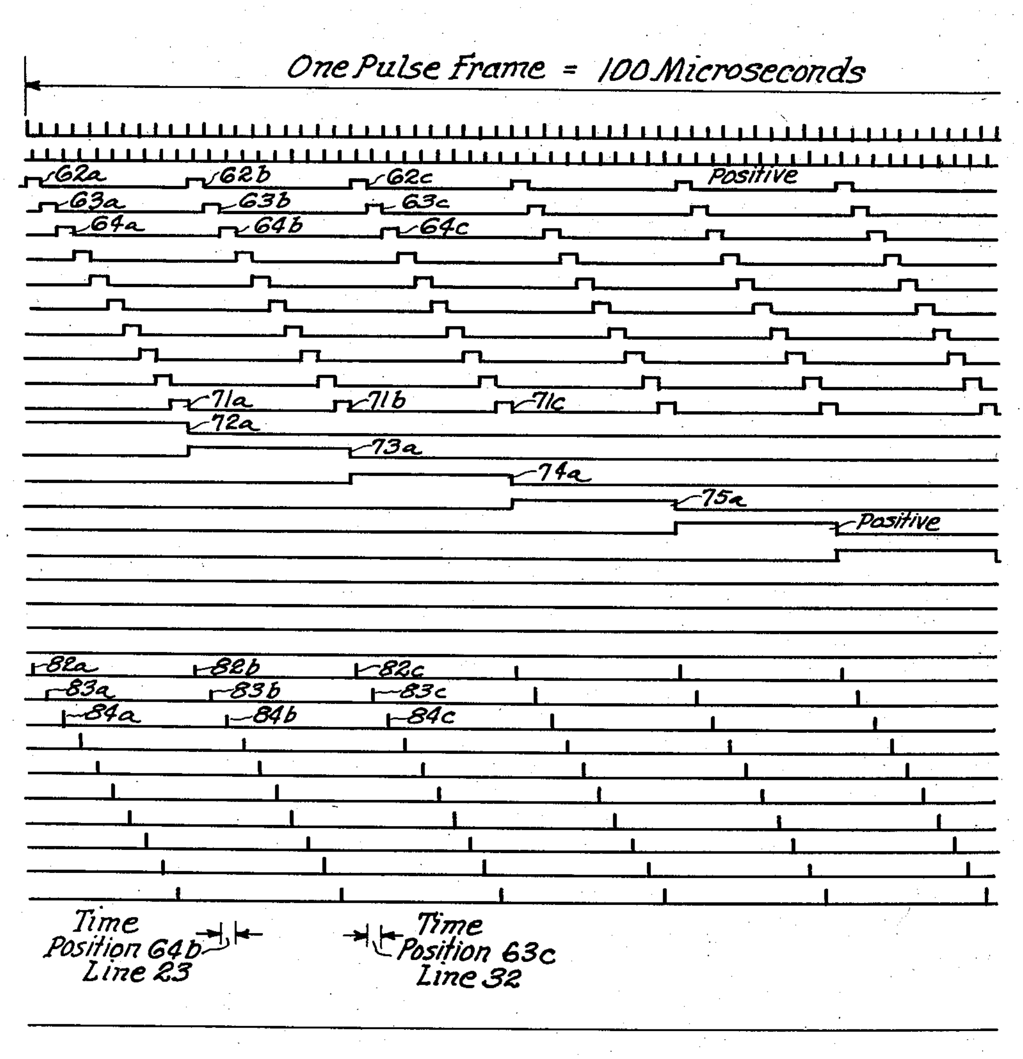
Figure 31:
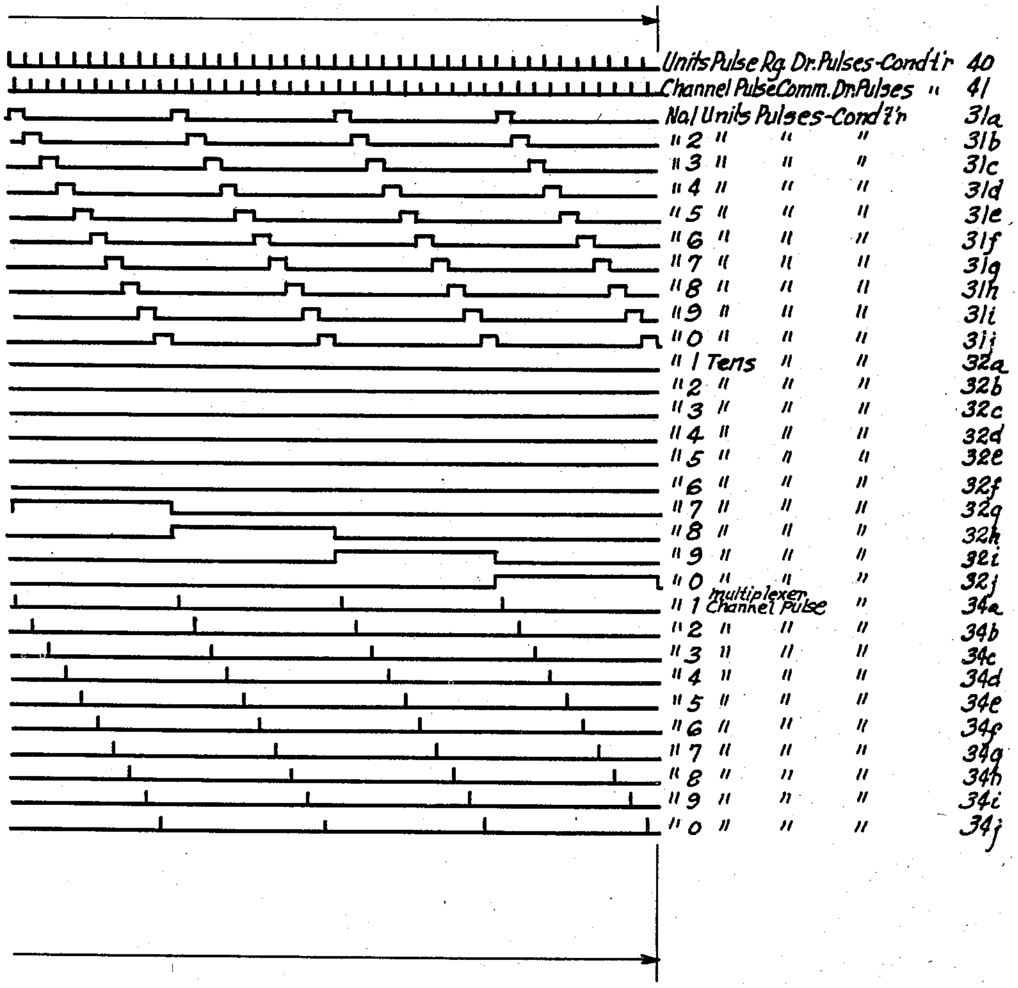

As discussed generally in connection with the general description of the system, this circuit, which is shown in detail in Fig. 26 of the drawings, performs the functions of amplifying the commutated or multiplexed ringing frequencies to a sufficient power and voltage level to operate the tuned bell ringers in the subscribers' subsets, filtering the square waves from the ringing frequency sources to obtain a multiplexed wave form suitable for ringing purposes, and eliminating the transient disturbances resulting from abrupt switching from one ringing frequency to another. More specifically, the harmonic ringing amplifier and supply circuit 101 includes a filter indicated generally at 2610, a first amplifier stage including the tube 2604, a phase inverter stage including the tube 2605, a push-pull driver stage including the tubes 2602 and 2603 and a push-pull power output stage including the tubes 2600 and 2601. The tubes 2602 to 2605, inclusive, are preferably of the commercial type 6C4, and the tubes 2600 and 2601 are preferably of the commercial type 6L6.

Considering now the operation of the ringing amplifier and supply circuit 101, it will be recalled that each of the ringing frequencies commutated to the conductor 108 by the modulator circuit 100 comprises a symmetrical rectangular square wave which contains a fundamental frequency and odd harmonics thereof. The higher harmonics of the ringing frequency square waves fall within the audio frequency range of the telephone system and hence must be eliminated since the ear is quite sensitive in the lower audio frequency range, i.e., 1,000 to 2,000 cycles, and the amplitude of the ringing frequencies is approximately 100 volts R.M.S. for the fundamental. It will be evident that ringing cross-talk in the earphones of the subscribers' subsets will be present from other lines of the system unless the harmonics are eliminated before transmission to the various line circuits of the system. Even though twisted pair cables are employed to reduce coupling between the lines of the system, ringing cross-talk is produced unless these harmonics are eliminated or very substantially attenuated. Furthermore, the ringing frequency square waves are not of a suitable form to excite the tuned harmonic ringing facilities at the substations, a sinusoidal wave being preferred for this purpose.

In order to convert the ringing frequency square waves successively commutated to the output conductor 108 in the modulator circuit 100 into sinusoidal waves without substantial harmonic distortion, there is provided in the ringing amplifier and supply circuit 101 the filter 2610. The filter 2610 includes a low pass five-section RC network including the series resistors 2611, 2612, 2613, 2614, and 2615, and the shunt condensers 2616, 2617, 2618, 2619, and 2620. The output from the low pass RC filter is coupled through the condenser 2621 to a parallel-T filter network including the condensers 2622, 2623, and 2624, and the resistors 2625, 2626, and 2627. The parallel-T filter network provides sharp cutoff and has a null point at approximately 350 c.p.s. The over-all frequency characteristic of the filter 2610 is such that only 2½ db variation is experienced in the frequency range from the 16⅔ c.p.s. fundamental frequency to the 66⅔ c.p.s. fundamental frequency, while a 23 db loss is produced at 200 cycles, and a maximum of 40.5 db loss is achieved at 350 c.p.s. As a result, the filter 2610 removes the higher frequency harmonics of the ringing frequencies and particularly the higher harmonics of the 50 and 66⅔ c.p.s. ringing frequencies. Accordingly, ringing cross-talk between the lines of the system is avoided. It will be noted that with the above-described system wherein the third harmonic of the 16⅔ c.p.s ringing frequency is cancelled before this ringing frequency is multiplexed to the common output conductor 108, the single low pass filter 2610 is employed to remove the higher harmonics from all of the ringing frequencies. There is thus produced across the output resistor 2628 of the filter 2610 the multiplexed ringing frequency wave substantially as shown in Fig. 32 (12). In this connection it will be understood that the guard intervals 186 separating the ringing periods is provided to permit change from one ringing frequency to another without affecting the ringing operation on the called line. The multiplexed ringing frequency wave produced across the resistor 2628 is impressed upon the control grid of the amplifier 2604 and is amplified therein and coupled through the condenser 2630 to the control grid of the phase inverter tube 2605. The phase inverter tube 2605 provides push-pull signals at the cathode and anode thereof which are coupled through the condensers 2631 and 2632 to the control grids of the driver tubes 2603 and 2602. The push-pull gain and driver stage, including the tubes 2602 and 2603, is required since the power output stage has substantially no voltage gain and a relatively high output voltage is required on the output conductor *61a* for operating the ringing facilities at the substations.

In order to produce the required output voltage a step-up transformer indicated generally at 2635 is provided, the primary of which is connected to the anodes of the tubes 2602 and 2603, and the secondary 2636 of which is connected to the control grids of the output tubes 2600 and 2601. Since the transformer 2635 is required to pass 16⅔ c.p.s. waves without appreciable loss and distortion, a push-pull type of transformer is employed to eliminate the effects of unidirectional magnetic flux in the core and to eliminate the use of very large coupling condensers and shunt feeding arrangements. The primary and secondary windings of the transformer 2635 are bifilar wound to provide very close coupling between these windings. Because of the danger of insulation failure between the two windings which operate at a substantial difference in potential on both a D.C. and an A.C. basis, a protective network 2637 consisting of four ¼ watt neon lamps in series is placed across one-half of the secondary winding 2636. With this arrangement any excessive A.C. signal or D.C. potential is suppressed by the ignition of these lamps which also provide a visual indication of the overload condition.

The power output stage, including the tubes 2600 and 2601, is so arranged that these tubes are operated as cathode followers and an output signal is derived from the cathodes of these tubes. Thus, an output transformer, indicated generally at 2640, is provided with a primary winding 2641 connected between the cathodes of the tubes 2600 and 2601, an auxiliary winding 2642 which is connected between the screen grids of the tubes 2600 and 2601, and a secondary or output winding 2643 across which is produced the multiplex ringing frequency wave which is used to energize the ringing facilities at all of the substations of the system. In order to provide for proper operation of the beam power output tubes 2600 and 2601 it is necessary to maintain the screen potential substantially constant with respect to the cathode potential of each of the tubes 2600 and 2601. Accordingly, the auxiliary winding 2642, which is connected to the screen grids of the tubes 2600 and 2601, is tightly coupled to the cathode winding 2641 so that substantially a 1:1 transformer ratio is provided and the screen potential rises and falls in exactly the same proportion as does the cathode potential of each of the tubes 2600 and 2601. With this arrangement these tubes operate as true beam power amplifiers although a cathode follower type of operation is provided. In order to keep the phase relationship between the cathode and screen potentials as nearly perfect as possible, both halves of the screen windings 2641 and 2642 are wound bifilarly, that is, all four conductors are wound parallel to one another on the core of the transformer. With this arrangement both halves of the push-pull output stage are tightly coupled and if necessary the output stage may be run in a Class AB2 or Class B service for greater output. However, in the illustrated embodiment a bias potential of —22½ volts is provided and these tubes are operated Class A.

In order to protect the windings of the output transformer 2640 there is provided a protective network 2645 consisting of four ¼ watt neon lamps in series which is placed across one-half of the cathode winding 2641. With this arrangement insulation breakdown in the event of excessive signals is prevented by the ignition of these neon lamps.

Although the output impedance of the tubes 2600 and 2601, when operated as cathode followers, is relatively low, the output transformer 2640 is designed to match the expected load of approximately 500 ohms represented by ten harmonic ringers in parallel to the conventional plate load for the tubes 2600 and 2601. With this arrangement the source impedance is made to appear extremely low and the combined regulation of both the output tubes 2600 and 2601 and the transformer 2640 is better than 10 percent between no load and full load at any frequency. Due to the fact that all feedback in the ringing amplifier is in the form of degeneration, the feedback networks are extremely simple. Also, due to the fact that the windings of the driver transformer 2635 and the output transformer are very tightly coupled, the ringing amplifier is virtually free from transient disturbances arising from the abrupt switching of input frequencies when different ringing frequencies are multiplexed to the common conductor 108. As a result, the ringing amplifier provides a substantially transient-free output wave.

The output winding 2643 of the transformer 2640 is connected in series with a unidirectional source of potential 2650 to the ringing current conductor 61*a* which is multipled to all of the line circuits of the system. Also, a bias potential source 2651 is connected between the ringing current conductor 61*a* and the conductor 61*b* to provide a bias potential for the ringing control tubes in each of the line circuits of the system as explained more fully hereinafter.

*Trunk marking pulse generator 56*

Figure 20:
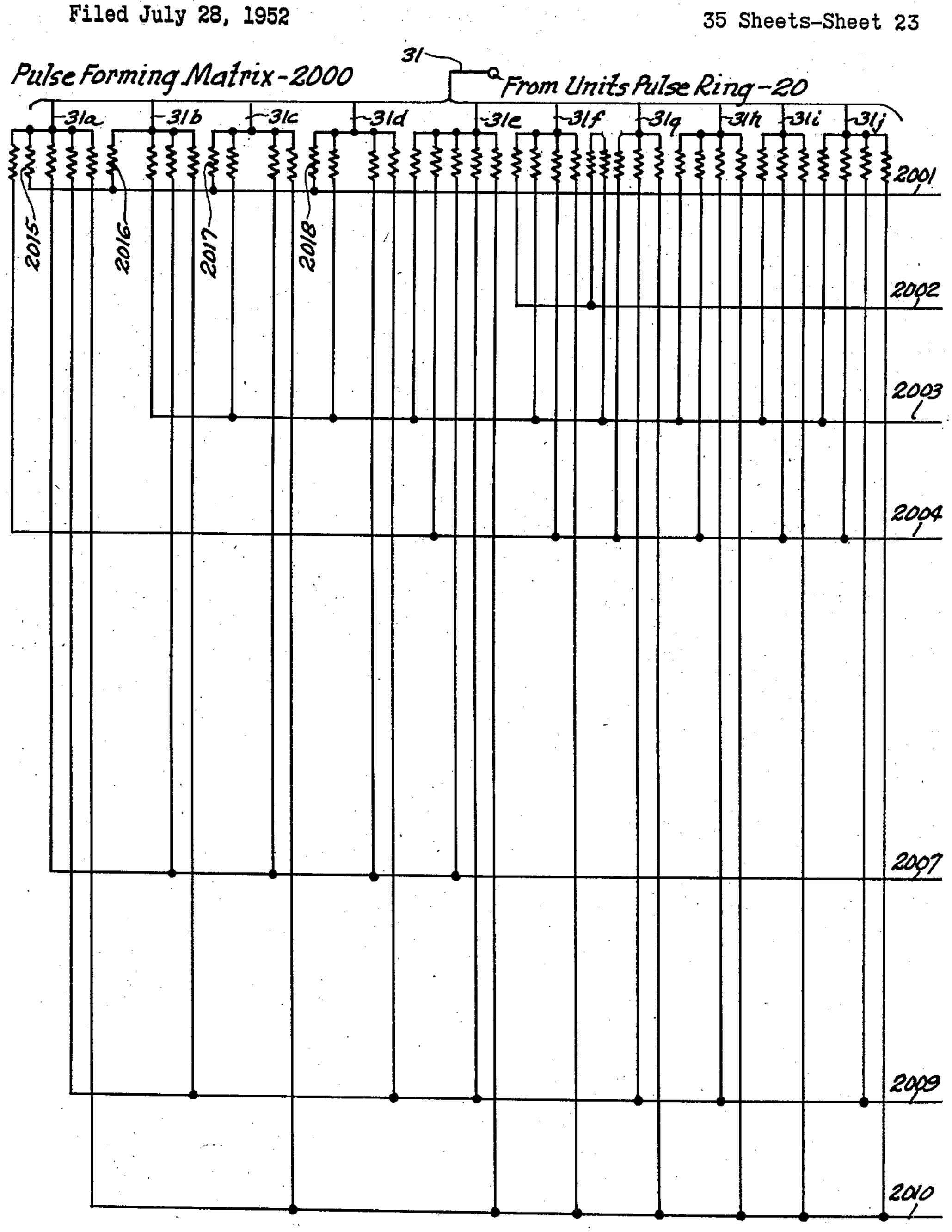
Figure 21:
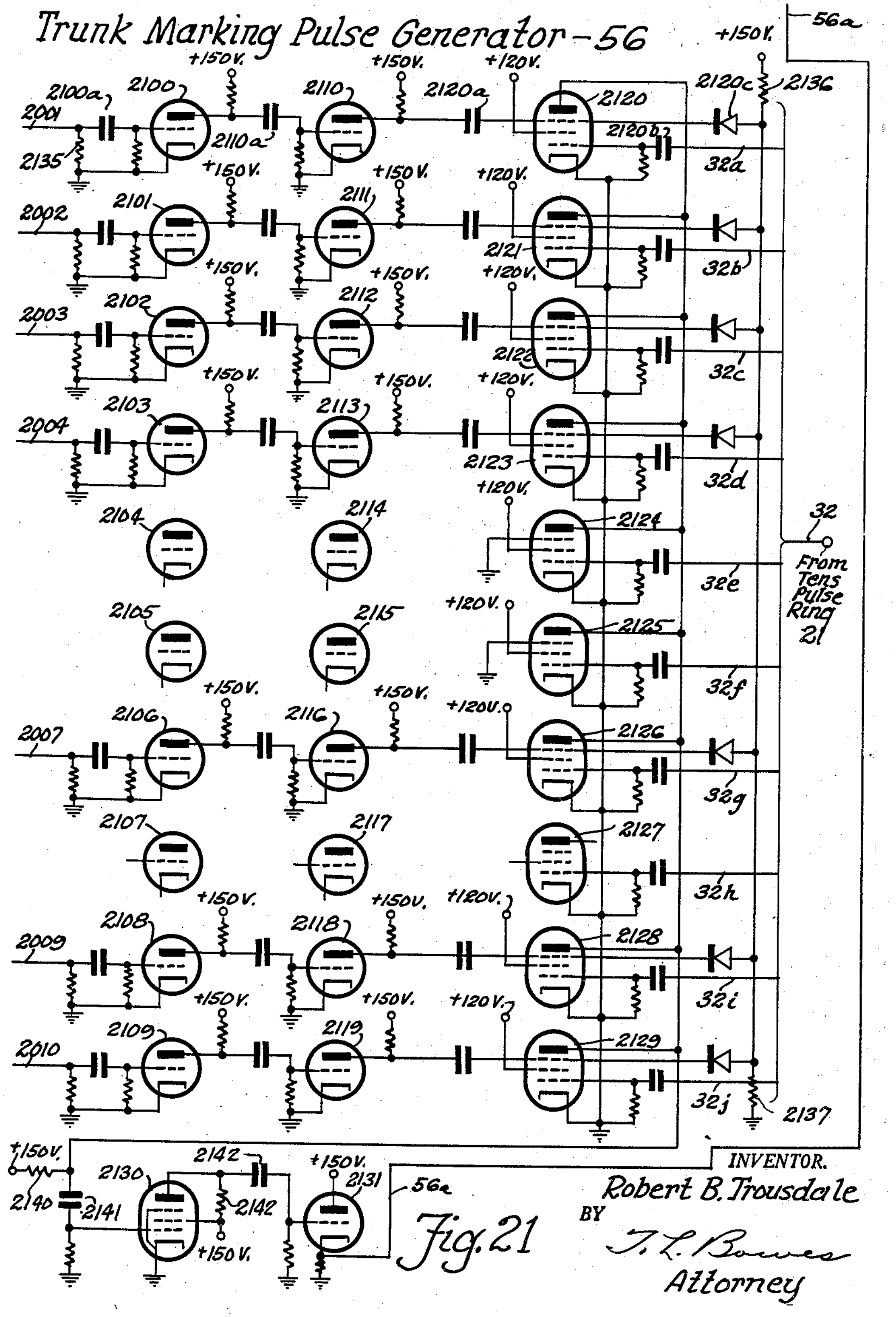

As described generally in the general description of the system, this circuit, which is shown in detail in Figs. 20 and 21 of the drawings, is provided for the purpose of generating trunk marking pulses to indicate to the connectors of the system which lines have been marked as private branch exchange trunks. In this connection it will be recalled that any group of lines having assigned thereto consecutive time positions in each time position frame may be designated as private branch exchange trunks, and trunk marking pulses are produced in the time position assigned to each line in a given trunk group except the last line in the group. These trunk marking pulses are supplied to all of the connectors of the system so that the trunk hunting facilities thereof will hunt through the called trunk group until an idle line is found. However, the last line in each trunk group is not identified by a trunk marking pulse so that the trunk hunting facilities of the connector will not step beyond the called trunk group but instead will return a busy tone to the calling subscriber in the event the last line in the trunk group is busy.

Referring now to Figs. 20 and 21, the trunk marking pulse generator 56 includes a pulse forming matrix 2000 (Fig. 20), a vertical string of ten amplifier tubes 2100–2109, inclusive (Fig. 21), a second vertical string of ten amplifier tubes 2110–2119, inclusive, a vertical string of ten tens gate tubes 2120–2129, inclusive, a common amplifier tube 2130, and a cathode follower output tube 2131. The tubes 2100–2119, inclusive, and 2131 are preferably of the commercial type 6C4, the tubes 2120–2129, inclusive, are preferably of the commercial type 6AS6, and the tube 2130 is preferably of the commercial type 6AU6.

Considering now the operation of the trunk marking pulse generator 56, the pulse forming matrix 2000 is employed to select certain ones of the units pulses produced on the conductors 31*a*, 31*b*, 31*c*–31*j*, inclusive, by the units pulse ring 20. The selected units pulses are amplified and are further segregated on a tens digit basis by means of the gate tubes 2120–2129, inclusive, which are excited by the tens pulses produced on the conductors 32*a*, 32*b*, 32*c*–32*j*, inclusive, by the tens pulse ring 21. The pulse forming matrix 2000 comprises a plurality of horizontal mixing buses 2001–2010, inclusive, to which isolating resistors are strapped from the units pulse conductors 31*a*–31*j*, inclusive, in accordance with any desired trunking arrangement.

Figure 33:
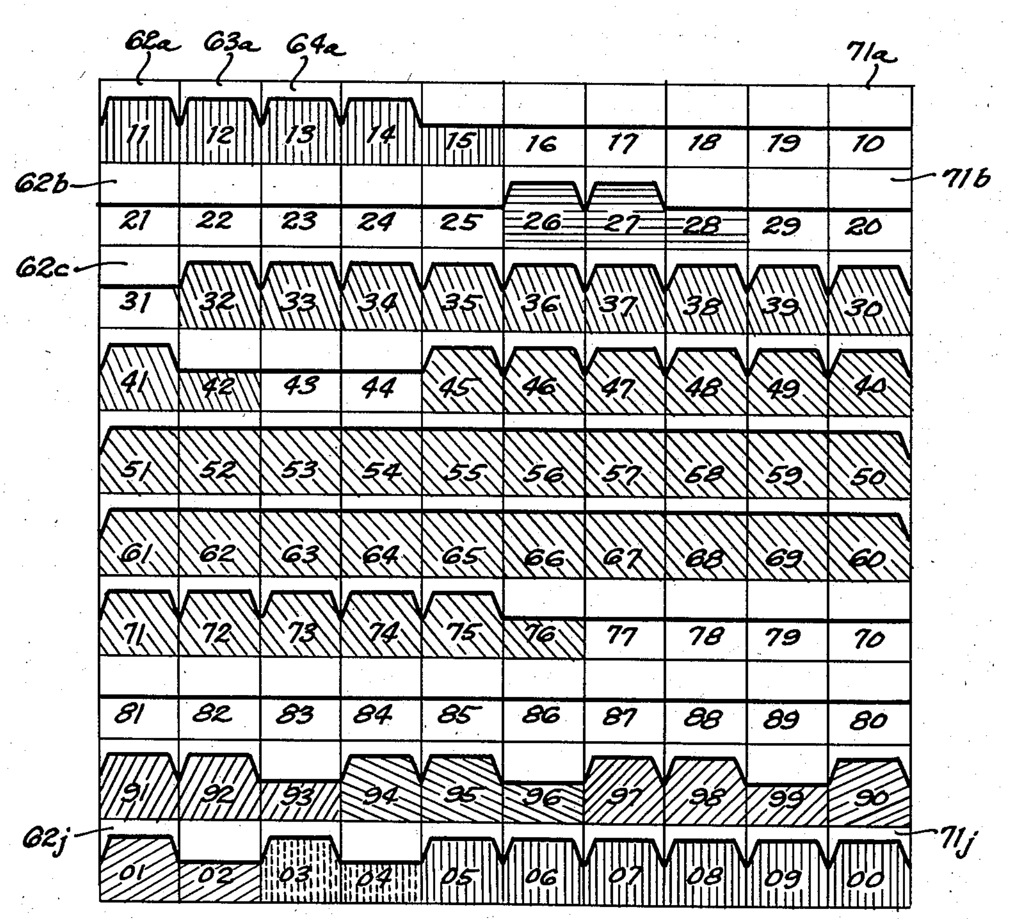

In the illustrated embodiment, certain ones of the one hundred lines of the system have been identified as private branch exchange trunks as described heretofore in connection with Fig. 33 of the drawings, and the resistor strapping arrangement of the pulse forming matrix 2000 shown in Fig. 20 corresponds to the trunking arrangement shown in Fig. 33. Thus, in the first tens digit level the lines 11, 12, 13, and 14 are to be marked as private branch exchange trunks. The first mixing bus 2001 is connected to the first units pulse conductor 31*a* through the resistor 2015, to the second units pulse conductor 31*b* through the resistor 2016, to the third units pulse conductor 31*c* through the resistor 2017, and to the fourth units pulse conductor 31*d* to the resistor 3118. Accordingly, the units pulses 62*a*–62*j*, inclusive, 63*a*–63*j*, inclusive, 64*a*–64*j*, inclusive, and 65*a*–65*j*, inclusive, are impressed on the mixing bus 2001 and are coupled through the condenser 2100*a* to the control grid of the tube 2100. The indicated units pulses are amplified in the tube 2100 and are coupled from the anode thereof through the condenser 2110*a* to the control grid of the next succeeding amplifier tube 2110 wherein they are further amplified and are coupled through the condenser 2120*a* to the suppressor grid of the tens gate tube 2120. The first control grid of the gate tube 2120 is operated at zero bias and the positive tens pulses appearing on the conductor 32*a* are impressed upon this control grid through the coupling condenser 2120*b*. The tens pulses impressed upon the conductor 32*a* by the tens pulse ring 21 consist of the pulses 72*a* (Figs. 28–31, inclusive) and the gate tube 2120 is rendered conductive only for the duration of the pulses 72*a*. In this connection it will be understood that the coupling condenser 2120*b* charges negatively during the tens pulses impressed upon the conductor 32*a* so as to provide a bias potential sufficient to cut off the tube 2120 for the interval between the tens pulses 72*a*. Since the tens pulses 72*a* occur only once during each pulse frame, only the units pulses 62*a*, 63*a*, 64*a*, and 65*a* are passed by the tube 2120 and appear across the anode resistor 2140 which is common to all of the tens gate tubes 2120–2129, inclusive.

In the pulse forming matrix 2000 the mixing resistors such as the resistors 2015–2018, inclusive, which are used to strap the units pulses to different ones of the mixing buses 2001–2010, inclusive, may vary in resistance value over relatively wide limits and mixing resistor tolerances cause considerable variation in the height of the units pulses impressed upon the mixing buses. While the amplifiers associated with each mixing bus, such as the amplifiers 2100 and 2110 associated with the mixing bus 2001, provide a substantial clipping action so as to standardize the pulse heights considerably, it has been found necessary to provide a further limiting arrangement to insure that the amplitude of all of the units pulses is the same. Accordingly, the suppressor grid of each tens gate tube is biased so that it operates as a limiter and thus provides a further limiting action to render the units pulses uniform in amplitude. Thus, the suppressor grid of the tube 2120 is connected to the anode of a clamping rectifier 2120*c* and the cathode of the rectifier 2120*c* is connected to a positive potential of approximately 16 volts above ground as determined by the voltage divider comprising the resistors 2136 and 2137. Since the cathode of the gate tube 2120 is connected to ground, the tops of the units pulses which are coupled through the condenser 2120*a* are clamped by means of the rectifier 2120*c* to a positive potential of 16 volts with respect to the cathode potential of this tube. When the suppressor grid of the tube 2120, which is of the commercial type 6AS6, is operated in the region of +16 volts with respect to the cathode, it acts as a good limiter and the units pulses are all limited to the same amplitude. In this connection it will be understood that if the baseline of the units pulses is clamped to ground potential the average value of the units pulse wave form would vary depending upon the number of units pulse conductors connected thereto so that the peak voltage on the suppressor grid would vary depending upon the number of units pulses strapped to the mixing bus 2001. However, with the described arrangement wherein the peaks of the units pulses are clamped to a positive potential of approximately 16 volts, the amplitude of the units pulses gated by all of the tens gate tubes 2120–2129 is uniform.

In considering the trunking arrangement shown in Fig. 33, it will be evident that the trunk group which comprises the lines 45 to 76, inclusive, includes lines having consecutive time positions assigned thereto which correspond to all of the units pulses occurring in the fifth and sixth tens digit levels. Accordingly, for this particular trunk group or a similar trunking arrangement, a simplified system may be employed wherein no mixing bus is required for the tens digit levels which are completely full. This is readily apparent when it is realized that the tens pulse 76*a* is equivalent to all ten of the units pulses 62*e*, 63*e*, 64*e*–71*e*, so that the tens pulse 76*a* may be used by itself and it is unnecessary to strap all of the enumerated units pulses to a mixing bus. Accordingly, in the fifth and sixth tens digit levels in the trunking arrangement illustrated in Figs. 20, 21, and 33, the corresponding mixing buses 2005 and 2006 are eliminated and the corresponding amplifier tubes 2104, 2105, 2114, and 2115 are not required. With this arrangement the suppressor grids of the tens gate tubes 2124 and 2125 are connected directly to ground potential so that the tens pulses 76*a* and 77*a*, which are respectively applied to the control grids of the tubes 2124 and 2125 are transmitted directly through these tubes and appear across the common anode resistor 2140. With this arrangement the tens gate tubes 2124 and 2125 act as a simple amplifier for the tens pulses impressed upon the control grids thereof from the conductors 32*e* and 32*f* respectively. It will also be understood that with the illustrated trunking arrangement no trunk marking pulses are required in the eighth tens digit level so that no corresponding mixing bus is required, and the amplifier tubes 2107 and 2117 and the tens gate tube 2127 are also not required, although in the drawing these tubes are shown although not connected into the circuit.

The units pulses which are connected to the mixing buses 2001–2010, inclusive, and are selectively gated in the tens gate tubes 2120–2129, inclusive, are all produced across the common anode resistor 2140 and serve as trunk marking pulses which are suitable for controlling, together with busy pulses and connector pulses, the trunk hunting facilities in each of the connectors of the system. The trunk marking pulses produced across the resistor 2140 are coupled through the condenser 2141 to the control grid of a pentode amplifier tube 2130 and are repeated through this tube to appear as positive pulses across the anode load resistor 2142 thereof. The positive trunk marking pulses are then coupled through the condenser 2142 and through the cathode follower tube 2131 to appear at the cathode of this tube as positive trunk marking pulses which are transmitted over the common conductor 56*a* to all of the connectors 12*b*, 13*b*, and 14*b* of the system.

*Trunk hunting drive pulse generator 55*

Figure 11:
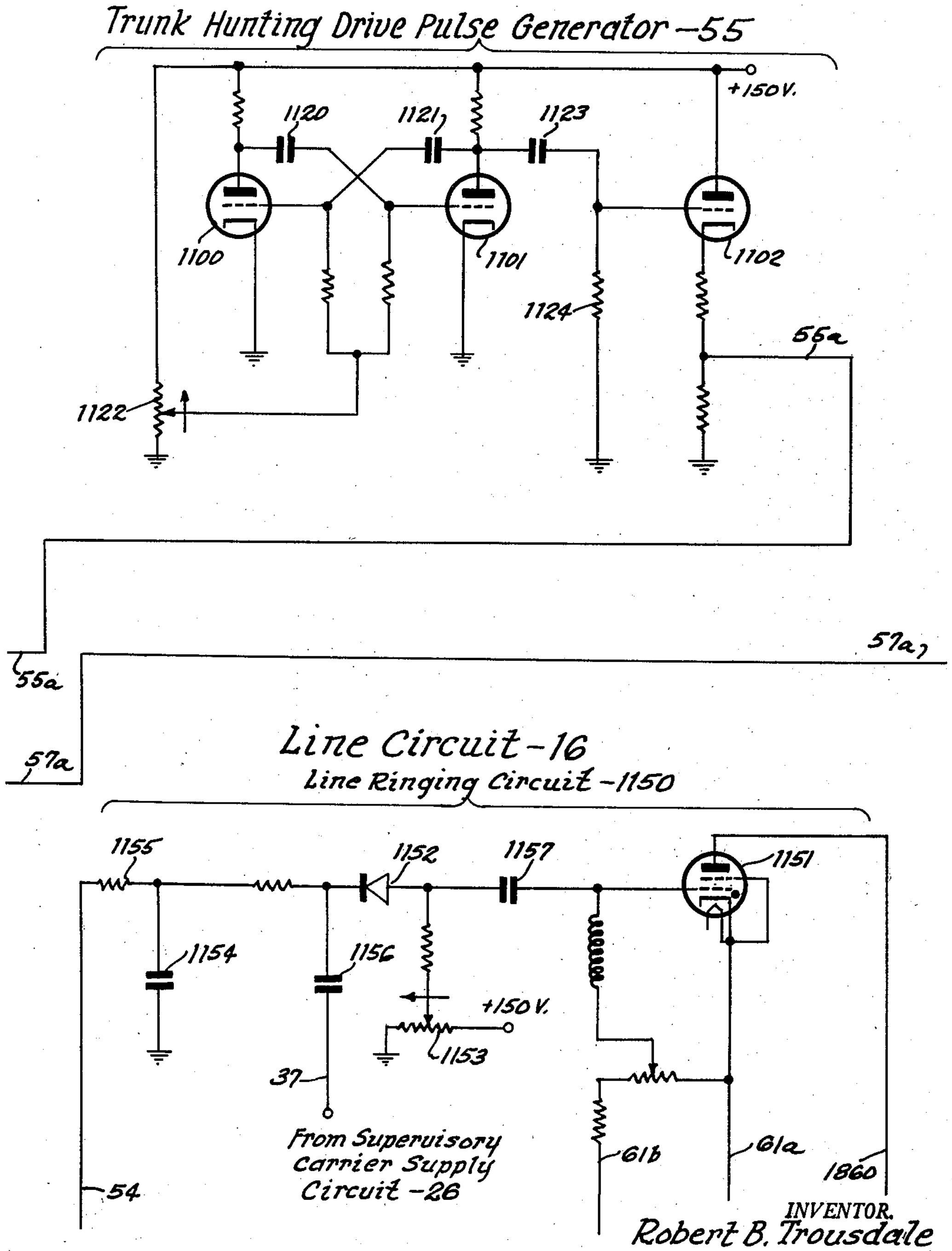

As discussed briefly in connection with the general description of the system, this generator, which is shown in detail in Fig. 11 of the drawings, functions to provide trunk hunting drive pulses which are supplied to the trunk hunting facilities of all of the connectors 12*b*, 13*b*, and 14*b* of the system and determine the rate at which the connector hunts through a called trunk group to find an idle line therein. Preferably, the pulse rate of the trunk hunting drive pulses is in the order of 100 pulses per second although this rate may be increased if desired to increase the trunk hunting rate in the connectors. More specifically, the trunk hunting drive pulse generator 55 includes the tubes 1100 and 1101 which are interconnected to operate as a conventional multivibrator, and a cathode follower output tube 1102. All of the tubes 1100–1102, inclusive, are preferably of the commercial type 6C4.

Considering the operation of the trunk hunting drive pulse generator, the tubes 1100 and 1101 are cross connected through the condensers 1120 and 1121 so as to provide a conventional free running multivibrator action in which these tubes are repeatedly switched from a conductive to a non-conductive state in accordance with the time constants of the grid control circuits thereof. The control grids of both of the tubes 1100 and 1101 are returned to a positive potential present at the arm of a potentiometer 1122 which is connected from the positive potential source to ground, and the frequency of the multivibrator may be adjusted by adjustment of the arm of the potentiometer 1122. Preferably, the frequency of the multivibrator is adjusted so that a 100 c.p.s. square wave is produced at the anode of the tube 1101. This square wave is differentiated in the circuit including the coupling condenser 1123 and the grid resistor 1124 and the differentiated wave is applied to the control grid of the cathode follower tube 1102. The cathode follower passes the positive differentiated pulse and clips the negative differentiated pulse so that a positive pulse having a repetition rate of approximately 100 pulses per second is produced at the cathode of the tube 1102 and is transmitted over the conductor 55*a* to all of the connectors 12*b*, 13*b*, and 14*b* of the system.

*Conversation timing pulse generator 57*

Figure 12:
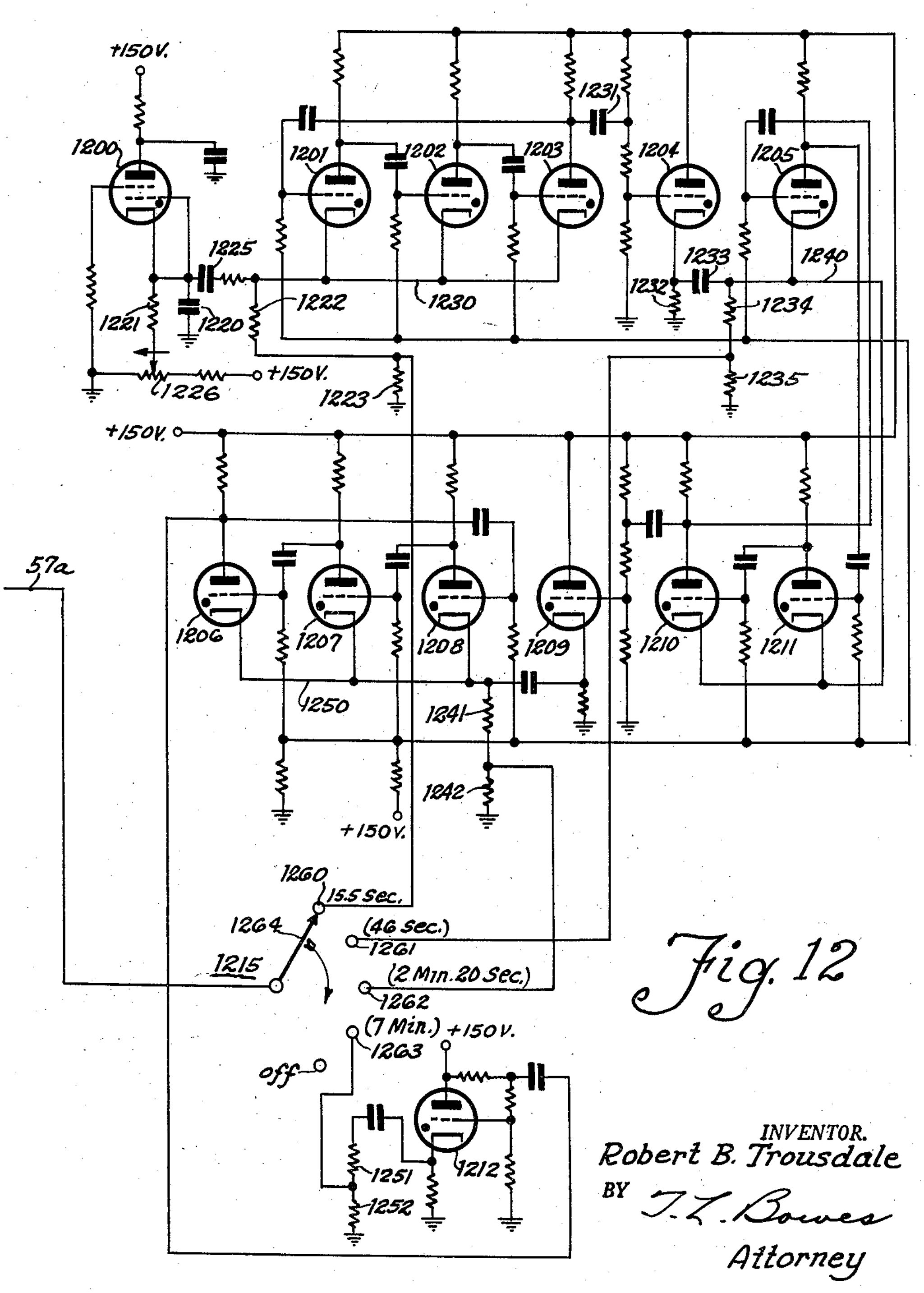

As discussed briefly in connection with the general description of the system, this generator, which is shown in detail in Fig. 12 of the drawings, performs the function of developing conversation timing pulses which are supplied to all of the connectors of the system to actuate the conversation timing facilities therein. From the general description of the system it will be recalled that the length of the conversation is timed by counting off eleven of the conversation timing pulses in the connector operatively associated with the calling and called lines, starting at the instant the ring trip circuit is fired when the called subscriber answers. For a conversation of approximately seven minutes duration the conversation timing pulses should have a repetition rate of approximately one pulse every forty seconds. It will be evident to those skilled in the art that a generator designed to supply pulses at the very low frequency of one pulse every forty seconds would require extremely long time constants and considerable difficulty would be experienced in maintaining the oscillator accurately stabilized. However, in accordance with the present invention, a base oscillator frequency of reasonable magnitude is used and a plurality of dividing circuits are controlled from the base oscillator frequency to provide output pulses having an output frequency of .025 c.p.s., i.e., one pulse every forty seconds. More specifically, the conversation timing pulse generator 57 includes a base frequency oscillator including the tube 1200 which produces output pulses having a frequency of .675 c.p.s. The base frequency pulses are supplied to a first ring circuit including the tubes 1201, 1202, and 1203 wherein the pulses are divided by three and a pulser tube 1204 is employed to develop pulses at one-third of the base frequency. These pulses are then supplied to a second ring circuit including the tubes 1205, 1211, and 1210 wherein a second frequency division of three is provided and the output of this ring circuit is supplied to a pulser tube 1209 which produces pulses at one-ninth the base frequency. The output of the pulser tube 1209 is then supplied to a third ring circuit including the tubes 1206, 1207, and 1208, and the output of the third ring circuit is supplied to a pulser tube 1212 which produces pulses at one-twenty-seventh of the base frequency, or one pulse every forty seconds. In the illustrated embodiment a selector switch 1215 is provided to select the output of any one of the ring circuits or the base frequency oscillator so that a plurality of different timing pulse rates may be employed. However, it will be understood that in actual practice a seven minute conversation timing cycle is preferably employed. The tube 1200 is preferably of the hot cathode gaseous discharge commercial type 5696, and the tubes 1201–1212, inclusive, are preferably of the cold cathode gaseous discharge commercial type 5823.

Considering now the operation of the conversation timing pulse generator 57 in developing conversation timing pulses at the above-described rate, the base frequency oscillator tube 1200 is operated at a cathode connected relaxation type of thyratron oscillator wherein the condenser 1220 and the resistor 1221 constitute the time constant of the oscillator circuit and determine the frequency at which pulses are produced across the output resistors 1222 and 1223. When the tube 1200 fires, the condensers 1220 and 1225 are charged positively until the cathode-anode potential of the tube 1200 is insufficient to maintain conduction through this tube, at which time the tube is extinguished. The resistor 1221 is also of sufficient magnitude to prevent conduction through the tube 1200. A vernier adjustment of the oscillator frequency is obtained by means of the potentiometer 1226 which may be adjusted to control the cathode bias on the tube 1200. The saw-tooth wave form produced across the condenser 1220 is differentiated in the circuit including the condenser 1225 and is applied to the common cathode bus 1230 of the first ring circuit in the form of short positive pulses occurring at the rate of .675 c.p.s. The three cold cathode gas tubes 1201–1203, inclusive, which comprise the first ring circuit are connected in an endless series and the circuit constants are such that normally one of these tubes is conducting. When a drive pulse is applied to the common conductor 1230, the conducting tube is extinguished and the corresponding rise in anode potential thereof is coupled to the next succeeding tube thereby increasing the grid potential of the next succeeding tube so that upon the termination of the drive pulse the next succeeding tube is favored over the other two tubes of the circuit and is, therefore, ionized. At each successive drive pulse the ring is thus stepped to the next tube in the ring and since there are three tubes in the ring circuit, it is evident that a pulse taken from the anode of the tube 1203, for example, will have a repetition rate of one-third that of the driving pulses produced by the oscillator tube 1200. The output from the ring tube 1203 is coupled through a differentiating network including the condenser 1231 to the control grid of the pulser tube 1204, and the positive differentiated pulse fires this tube. When the tube 1204 fires, the tube current flows through the cathode resistor 1232 thereof and the series connected condenser 1233 and resistors 1234 and 1235 thereof to produce a positive pulse across the resistors 1234 and 1235. The condenser 1233 then charges positively to a point at which the anode-cathode potential of the tube 1204 is insufficient to sustain conduction, at which point this tube is extinguished. In this connection it will be understood that the resistor 1232 is also of sufficient magnitude to prevent continuous conduction of the tube 1204. As a result, a relatively narrow positive pulse is produced across the resistors 1234 and 1235 at a rate of one-third that of the base frequency of the oscillator 1200. These positive pulses are connected to the common cathode conductor 1240 of the second ring circuit and control this ring circuit in a manner identical to that described above in connection with the first ring circuit. The output wave form produced at the anode of the ring tube 1210 in the second ring circuit is coupled to a pulser tube 1209, which is identical with the pulser tube 1204, and there is produced across the output resistors 1241 and 1242 thereof relatively narrow positive pulses which occur at the rate of one-ninth that of the base oscillator frequency. These positive pulses are then applied to the common cathode conductor 1250 of the third ring circuit and control this ring circuit in a manner identical to that described above in detail in connection with the first ring circuit. From the anode of the ring tube 1206 of the third ring circuit a wave form is coupled to a pulser tube 1212, which is identical with the pulser tubes 1204 and 1209, and output pulses occurring at the pulse rate of one pulse every forty seconds are produced across the resistors 1251 and 1252 thereof. The pulses produced across the respective output resistors 1223, 1235, 1242, and 1252 are respectively connected to the contacts 1260, 1261, 1262, and 1263 of the selector switch 1215, and the movable arm 1264 of this switch may be selectively connected to any one of the fixed contacts thereof. When the arm 1264 is connected to the contact 1263, conversation timing pulses occurring at the rate of one pulse for every forty seconds are transmitted over the conductor **57*a* to all of the connectors 12*b*, 13*b*, and 14*b* of the system. In this connection it will be understood that the conversation timing pulses are preferably of relatively small amplitude so that the conversation timing facilities in the connector will not be stepped several stages for one conversation timing pulse. Thus, for example, the output pulses from the pulser tube 1212 are reduced in the ratio of the resistors 1251 and 1252 so that the conversation timing pulses have an amplitude of approximately one-half of the total amplitude produced by the pulser tube 1212**.

*Conversation timing warning tone generator 58*

Figure 17:
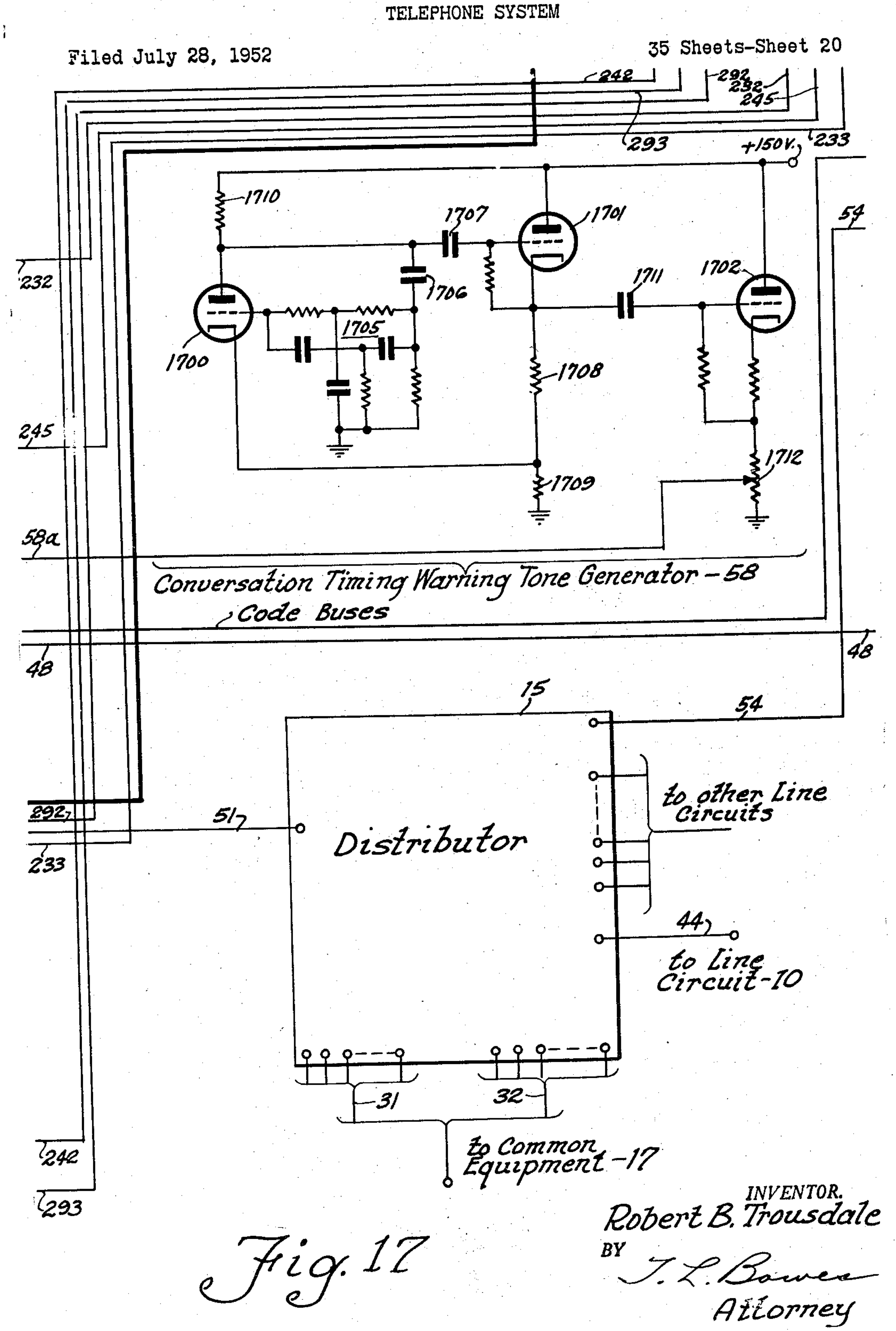

As described briefly in connection with the general description of the system, this circuit, which is shown in Fig. 17 of the drawings, is provided for the purpose of developing a 400 cycle warning tone which is supplied to all of the connectors of the system and is released by the connectors to the calling and called lines operatively associated therewith a short period before the end of the conversation timing period to inform the subscribers that the call is about to be terminated. More specifically, the conversation timing warning tone generator includes a parallel-T oscillator circuit comprising the tubes 1700 and 1701 and a cathode follower output tube 1702. The tubes 1700–1702, inclusive, are preferably of the commercial type 6C4.

Considering the operation of the conversation timing warning tone generator 58, the first oscillator tube 1700 is provided with a parallel-T filter network, indicated generally at 1705, which is connected through the coupling condenser 1706 from the anode of the tube 1700 to the control grid thereof. The parallel-T filter network 1705 thus constitutes a negative feedback circuit which has a maximum attenuation at the null frequency of the filter T network. The null frequency of the filter network is chosen at 400 cycles so that the gain of the stage 1700 is a maximum at 400 cycles. The anode of the tube 1700 is coupled through the condenser 1707 to the control grid of a cathode follower tube 1701 in the cathode circuit in which there is included the series resistors 1708 and 1709. A second feedback path is provided from the junction point of the resistors 1708 and 1709 to the cathode of the tube 1700 to provide sufficient positive feedback to sustain oscillations. The correct amount of feedback is provided by choosing appropriate values of the resistors 1708 and 1709. If too much feedback is employed the amplifier stage 1700 may be over-driven and thus cause distortion of the wave form from a pure sinusoid. However, the cathode resistors of the cathode follower tube 1701 are chosen of relatively large magnitude so that the cathode follower will provide some amplitude limiting and the output of the oscillator will be proportionately stabilized. With a large cathode resistor the gain of the cathode follower tube 1701 decreases gradually with increasing amplitude so that the oscillations build up until the over-all gain of the oscillator is unity at which time stability is reached and the output is held at a constant value. Preferably, the resistor 1708 has a value of 68,000 ohms, the resistor 1709 has a value of 1,000 ohms, and the anode resistor 1710 of the tube 1700 has a value of 470,000 ohms. Since the output impedance of the cathode follower tube 1701 is relatively large due to the large cathode resistors employed therein, a second cathode follower 1702 is connected to the cathode of the tube 1701 through the coupling condensers 1711, and there is produced across the cathode potentiometer 1712 thereof a 400 cycle sinusoidal wave which is used as a conversation timing warning tone and is supplied from the arm of the potentiometer 1712 over the conductor 58*a* to all of the connectors 12*b*, 13*b*, and 14*b* of the system.

*Substations A and A′–J′, inclusive*

Figure 18:
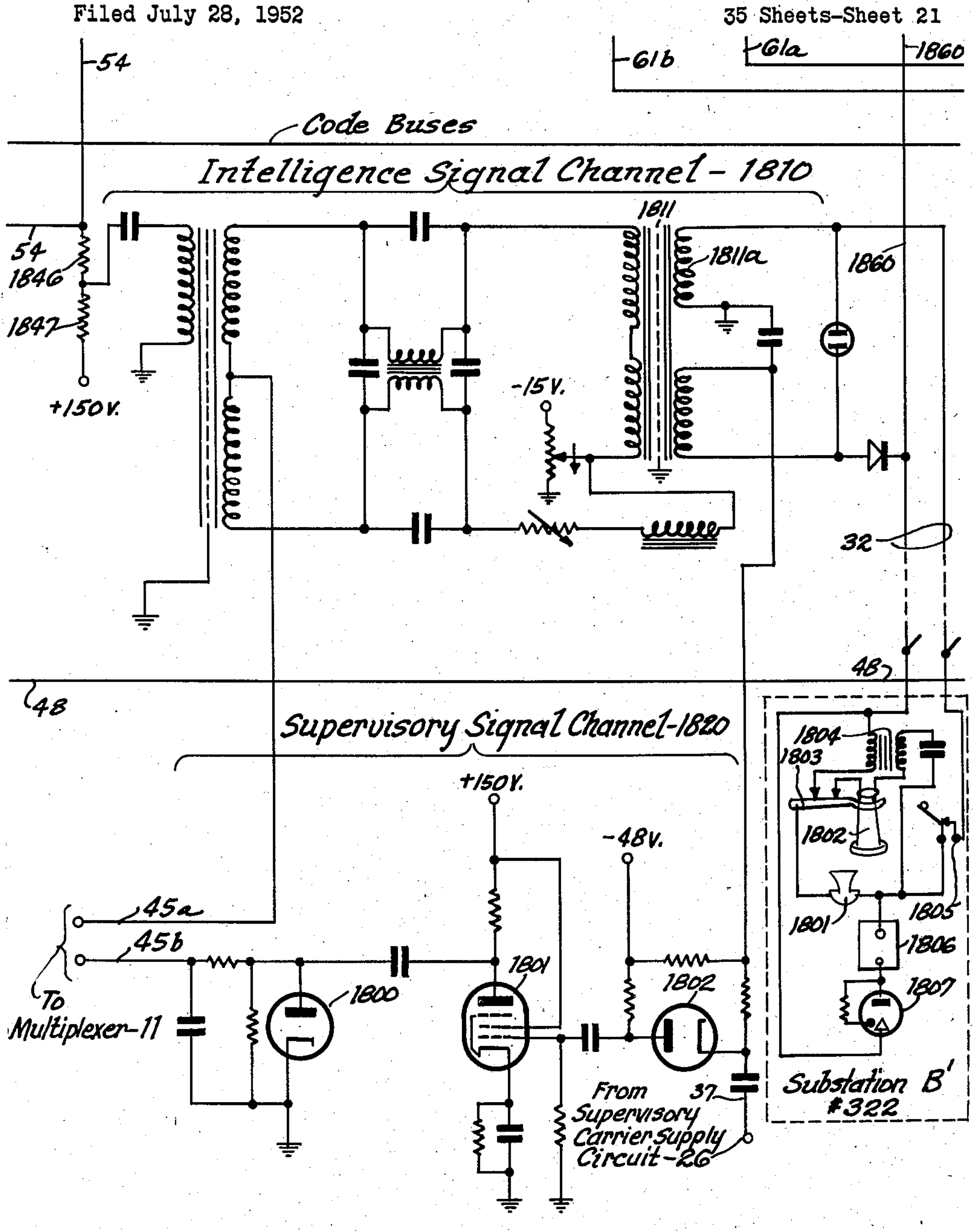

The substations respectively terminating the lines of the system may be identical. Accordingly, only the details of the party line substation B′ connected to the line 32 have been illustrated in Fig. 18 of the drawings. Any desired substation arrangement adapted for use in conventional automatic telephone systems may be employed in the present invention but with slight modification. The illustrated circuit of the substation B′ comprises the usual transmitter 1801, receiver 1802, hook or cradle switch 1803, coupling transformer 1804, calling or impulsing device 1805, and a harmonic ringer 1806, all of these elements being interconnected to form a conventional substation circuit. In addition, the circuit is equipped with a neon or other gas filled tube 1807 which is employed to bridge the ringer 1806 across the conductors of the line 32 in series with the impulsing contacts of the calling device 1805. This tube has a voltage breakdown of approximately 70 volts.

Figure 3:
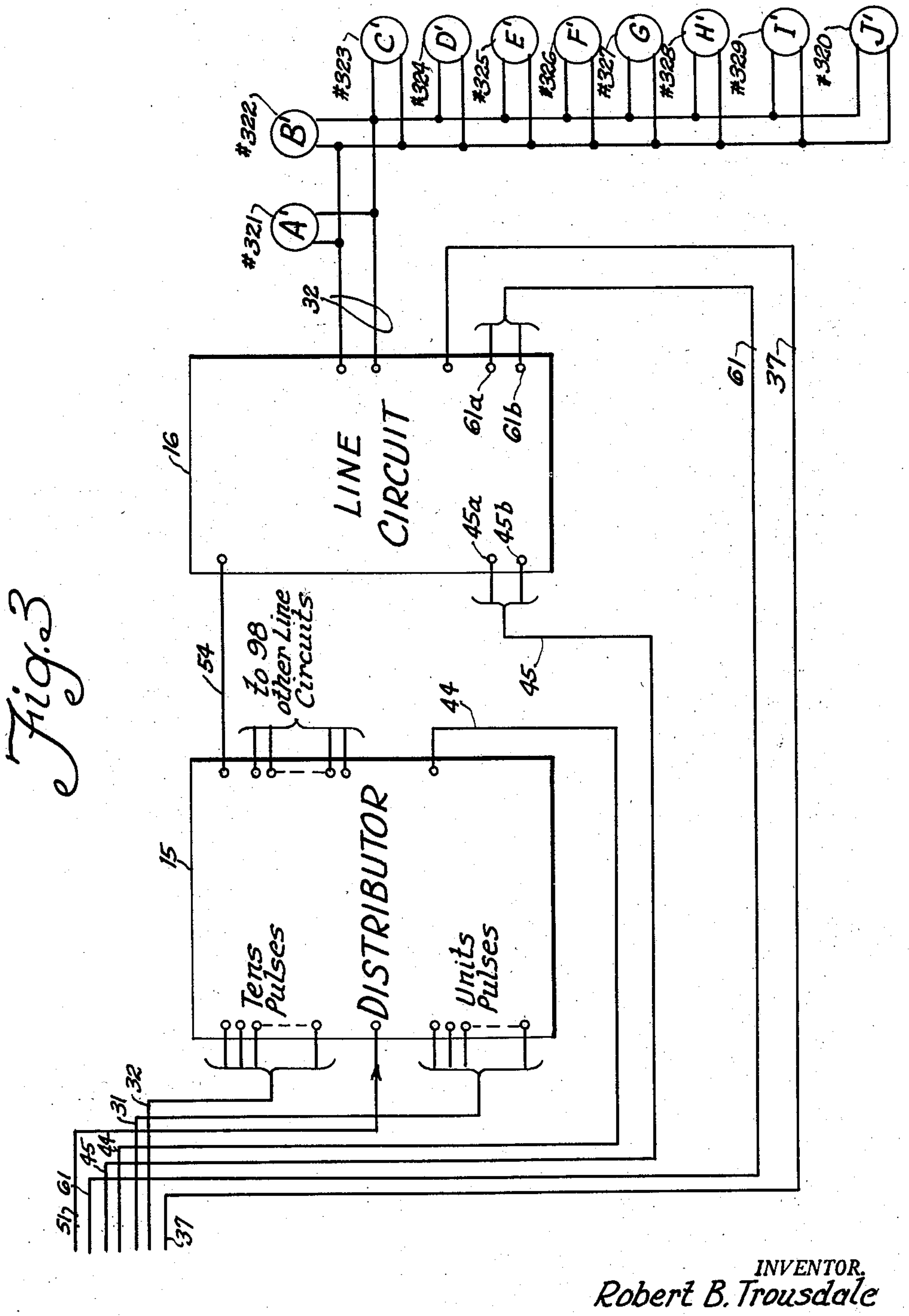
Figure 4:
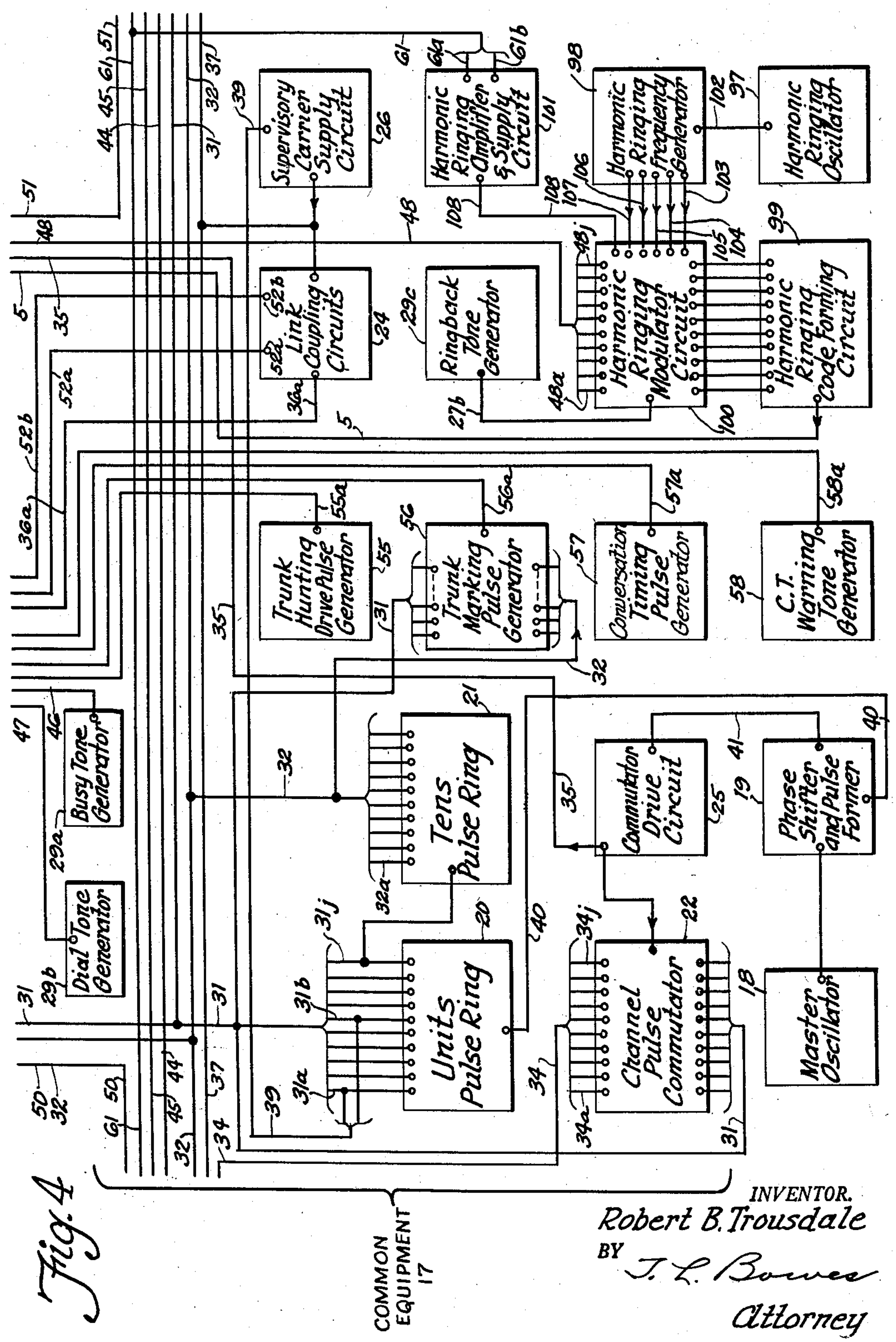
Figure 5:
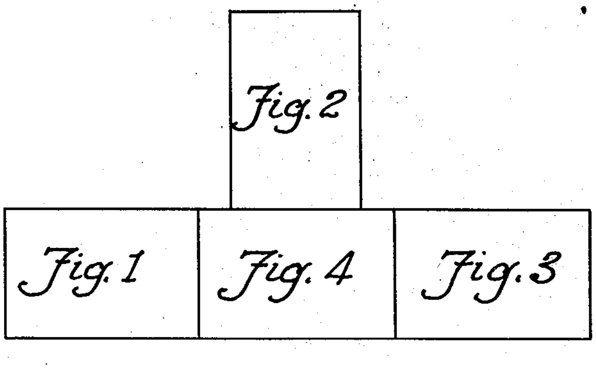
Figure 27:
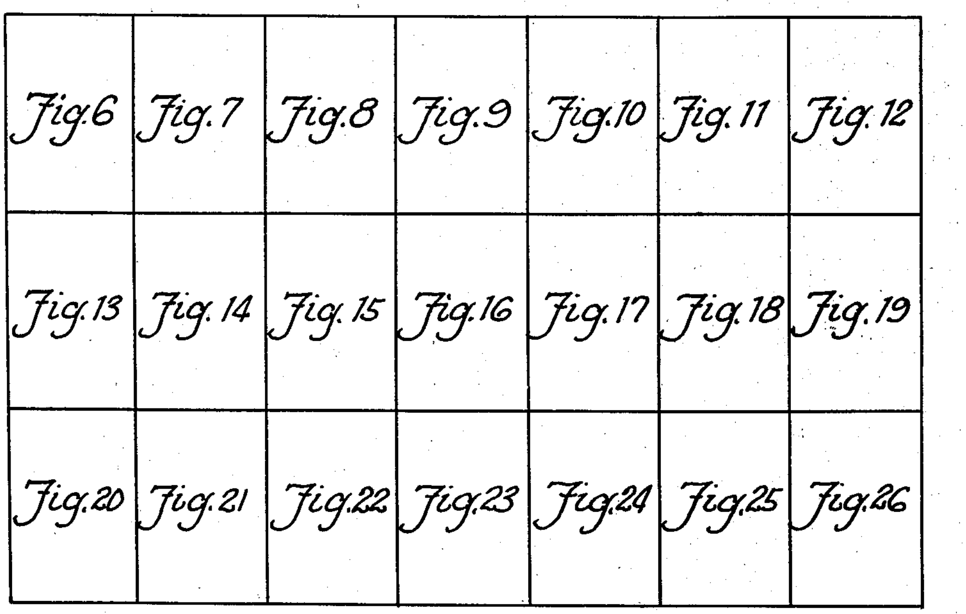

In the illustrated embodiment wherein ten party line substations are connected to the line 32 (Fig. 3), different pairs of substations are provided with harmonic ringers which are tuned to the same ringing frequency. Thus, the substation A′ and the substation B′ are provided with harmonic ringers 1806 wherein the bell clappers are part of a highly resonant mechanical system and are suspended on tuned reeds so that they are resonant to and will respond only to a ringing current of 66⅔ c.p.s. In the same manner the harmonic ringers associated with the substations C′ and D′ are tuned to 50 c.p.s. ringing current, etc. The substations associated with private lines of the system are provided with harmonic ringers tuned to the frequency represented by a party selection digit of "1," as for example, 66⅔ c.p.s.

Operation of the substation equipment as provided at the substation B′ is entirely conventional and will be readily apparent to those skilled in the art. Accordingly, a detailed description thereof is not included herein. However, insofar as is required to explain the mode of operation of the line circuit 16 terminating the line 32, the operation of the substation B′ is explained below in the following description of the line circuit 16.

*Line circuits 10 and 16*

As previously indicated, the two identified line circuits 10 and 16 are respectively utilized to terminate the private line 23 and the party line 32 at the exchange end of the system. These two line circuits, as well as the circuits terminating the other lines of the system, are identical in circuitry and mode of operation and accordingly only the line circuit 16 is shown in detail in Figs. 11 and 18 of the drawings.

The line circuits of the system, such as the line circuits 10 and 16, may be identical to the corresponding system components described in any one of the copending applications, Serial Nos. 134,974 and 205,641, referred to above, as well as the corresponding system component disclosed in my copending application, Serial No. 257,712, filed on November 23, 1951, and assigned to the same assignee as the present invention. However, in the illustrated embodiment a line circuit such as disclosed in my copending application, Serial No. 257,712, is disclosed since such a line circuit is of universal application as described in detail in this copending application. While reference may be had to the above-identified copending applications for a detailed description of suitable line circuits, for the purposes of the present invention it may be stated that the line circuit 16 shown in Figs. 11 and 18 of the drawings includes an intelligence signal channel 1810, a supervisory signal channel 1820, and a line ringing circuit 1150. The intelligence signal channel 1810 and the supervisory signal channel 1820 are substantially identical with the corresponding system components shown and described in detail in my copending application, Serial No. 257,712, referred to above. The line ringing circuit 1150, shown in Fig. 11 of the drawings, is identical with the corresponding system component shown and described in my copending application, Serial No. 257,712, referred to above, wherein the corresponding line ringing circuit is given the reference character 2750.

Briefly considered, the intelligence signal channel 1810 is utilized in transmitting intelligence signals which are produced at the substation B′ and supplied over the line 32 to the line circuit 16 to the corresponding gate circuit of the multiplexer 11 over the conductor 45*a* in such manner that these signals are not coupled to the distributor 15. Furthermore, the intelligence signal channel 1810 is utilized in transmitting intelligence signals from the distributor 15 to the line 32 and over this line to the substation B′ in such manner that the signals are not revertively transmitted back to the multiplexer 11.

The supervisory signal channel 1820, which includes the diodes 1800 and 1802 and the pentode control amplifier 1801, functions to convert the 100 kilocycle supervisory carrier voltage developed by the supply circuit 26 into a bias voltage of constant amplitude which is supplied over the conductor 45*b* to the multiplexer 11 and is utilized normally to bias to a non-conductive state that particular gate tube of the multiplexer 11 which individually corresponds to the line 32. Control signals, such as dialing impulses developed at the substation B′ and transmitted to the line circuit 16 over the line 32, are impressed upon the supervisory signal channel 1820 and this channel functions to remove and reapply the above-described bias potential on the conductor 45*b* in accordance with these control signals.

The line ringing circuit 1150 (Fig. 11) is provided for the purpose of controlling the application of ringing current to the harmonic ringers provided at the substations A′–J′, inclusive, on calls incoming to the line 32. The circuit 1150 includes a four electrode ringing control tube 1151, which is preferably of the gas filled commercial type 2D21, and is effective, when conducting, to transmit ringing current derived from the conductor 61*a* over the conductor 1860 and over the line 32 to activate the ringers provided at the substations A′–J′, inclusive.

From the foregoing general description of the system it will be recalled that one of the interrupted ringback tone signals shown in Figs. 32 (13)–(22), inclusive, corresponding to the harmonic ringing signal assigned to the called party line substation B′, is selected in the party digit register of the connector 12b and is used to control the ringing operation at the called line. In the illustrated call from the substation A to the substation B', the substation B' has assigned thereto the interrupted ringback tone signal shown in Fig. 32 (14), which consists of two short pulses 170a and 171a of ringback tone which occur during the first ringing period of each harmonic ringing cycle. In this connection it will be recalled that during the first ringing period a 66⅔ c.p.s. ringing current is multiplexed to the conductor 61a which is connected to the cathode of the ringing control tube 1151. Accordingly, for the duration of each of the ringing pulses 170a and 171a (Fig. 32 (14)), the connector 12b releases connector signal pulses to the distributor 15 which are approximately 50 percent greater in amplitude than the normal connector signal pulse height. In the distributor 15 the large amplitude connector signal pulses are rectified and are produced across the anode resistors 1846 and 1847 of the corresponding amplifier associated with the distributor gate tube assigned to the line circuit 16. Accordingly, for the duration of each of the pulses 170a and 171a, the potential on the conductor 54 is increased positively from its normal or quiescent value. These positive pulses are coupled through the network including the resistor 1155 and the condenser 1154 to the anode of a gating rectifier 1152. Normally the rectifier 1152 is biased against current conduction by connecting the cathode of this rectifier to a positive point on the potentiometer 1153, and the 100 kilocycle supervisory carrier voltage impressed upon the conductor 37 and coupled through the condenser 1156 to the anode of the rectifier 1152 is normally blocked by this rectifier so as to prevent the transmission of 100 kilocycle voltage to the control grid of the ringing control tube 1110. However, when the above-described positive ringing pulses are produced on the conductor 54 during the first ringing period, the condenser 1154 is charged to a higher voltage through the series resistor 1155 and the increase in voltage across the condenser 1154 results in a polarity reversal of the voltage across the rectifier 1152 so that this rectifier is rendered conductive and the 100 kilocycle supervisory carrier voltage is impressed upon the control grid of the tube 1151 over a path which includes the condenser 1156, the rectifier 1152, and the condenser 1157. During alternate half cycles of the supervisory carrier control voltage passed by the rectifier 1152, the tube 1151 is fired and ringing current transmission to the substations connected to the called line 32 is initiated immediately the tube 1151 is fired. As previously pointed out in connection with the harmonic ringing amplifier and supply circuit 101, the ringing current wave form actually comprises the multiplexed ringing frequencies developed across the secondary winding of the transformer 2640 (Fig. 26), as superimposed upon the voltage of the direct current source 2650. This source has a voltage of approximately 80 volts.

The circuit traversed by the ringing current extends from the right-hand terminal of the secondary winding 2643 by way of the conductor 61a, the ionized space current path through the tube 1151, the conductor 1860, the lower conductor of the line 32, the gas filled tube 1807, the windings of the harmonic ringer 1806, the impulsing contacts of the calling device 1805, the upper conductor of the line 32, and the winding 1811a of the transformer 1811 to the grounded terminal of the current source 2650 (Fig. 26). The neon tube 1807 is instantaneously fired by the ringing voltage impressed upon the line 32 in response to firing of the ringing control tube 1151, and a voltage drop is produced across this tube of approximately 60 volts. The balance of the available voltage, which varries from zero to approximately 170 volts, appears across the remaining components of the circuit traversed by the ringing current. It will thus be apparent that most of the available 80 volts of the direct current source 2650 is dissipated across the tube 1807. As a consequence the cathode of the tube 1151 is driven positive relative to the anode of this tube during a portion of each alternate half cycle of the ringing voltage appearing across the secondary winding of the transformer 2640. Hence, but for the continued excitation of the grid 1151 by the 100 kilocycle carrier voltage in the manner described above, this tube would be extinguished at some point during one-half of each cycle of the ringing voltage. As described above, during the intervals of the ringing pulses 170a and 171a, the ringing voltage on the conductor 61a has a frequency of 66⅔ c.p.s. so that the ringing current transmitted over the line 32 in the manner described above excites the harmonic ringer 1807 and this ringer is rung for the duration of the short ringing pulses 170a and 171a which constitute the coded harmonic ringing signal assigned to the substation B'. In this connection it will be understood that the harmonic ringer associated with the substation A' will also be rung during the pulse intervals 170a and 171a since this ringer is also tuned to 66⅔ c.p.s. However, the subscriber at the substation A' will recognize that his ring, which is one long ringing pulse, is not being rung.

During the silent period of each ringing cycle, i.e., during the period between the pulses 170a and 171a, the connector signal pulses are reduced to normal amplitude and the voltage across the condenser 1154 is correspondingly reduced so that the rectifier 1152 blocks the 100 kilocycle supervisory carrier voltage from being applied to the control grid of the ringing control tube 1151, and the tube 1151 is de-ionized during the first cycle of the ringing voltage next following interruption of the 100 kilocycle supervisory carrier voltage when the cathode of the tube 1151 is driven positive relative to the tube anode. In this connection it will be understood that the harmonic ringers associated with the other substations C'–J', inclusive, are tuned to harmonic ringing frequencies other than 66⅔ c.p.s., and hence are not excited by the above-described application of ringing current to the line 32.

If, for example, the substation C' is called, the ringing control tube 1151 will be ionized for the duration of the long ringing pulse 166 (Fig. 32 (3)) which occurs during the second ringing period. The harmonic ringer associated with the substation C' is tuned to 50 c.p.s. and during the second ringing period a 50 c.p.s. ringing voltage appears across the secondary winding of the output transformer 2640 and is transmitted over the conductor 61 to the cathode of the ringing control tube. Accordingly, for the duration of the long ringing pulse 166, 50 c.p.s. ringing current is transmitted over the line 32 and the harmonic ringers associated with the substations C' and D' are both rung in unison for the duration of the ringing pulse 166. In a similar manner any one of the other six substations may be rung in accordance with the particular gated harmonic ringing signal assigned thereto.

*Multiplexer 11*

As pointed out in the general description of the system, this circuit is provided for the general purpose of sampling control and intelligence signals developed on calling and called lines of the system in the time positions of each pulse frame individually assigned to the lines from which the signals are respectively derived and for transmitting multiplexer pulses modulated with the sampled control or intelligence signals over the multiplexer output conductor 50 to the finder-connector links 12, 13, and 14 of the system. The multiplexer circuit is capable of sampling signals appearing on each of the 100 lines of the system at a sampling repetition rate of 10 kilocycles.

The multiplexer 11 may be identical to the corresponding system component described in any one of the copending applications, Serial Nos. 134,974 and 205,641, referred to above. However, it will be understood that a given type of multiplexer is designed to operate with the intelligence and supervisory signal channels of a given type of line circuit. Thus, the type of line circuit disclosed in copending application, Serial No. 134,974, is adapted to supply the intelligence and control signals over the same conductor to the corresponding gate tube of the multiplexer 11, whereas in the copending application, Serial No. 205,641, the intelligence and control signals are supplied over separate paths to separate control grids of the corresponding gate tube in the multiplexer 11. Since the intelligence and supervisory signal channels of the line circuit 16 shown in Fig. 18 of the present invention are of the latter type, it will be understood that a multiplexer of the type shown in copending application, Serial No. 205,641, is to be used with this line circuit. However, it will be understood that either type of line circuit and multiplexer combination may be employed insofar as the harmonic ringing system of the present invention is concerned.

*Finder 12a*

Figure 2:
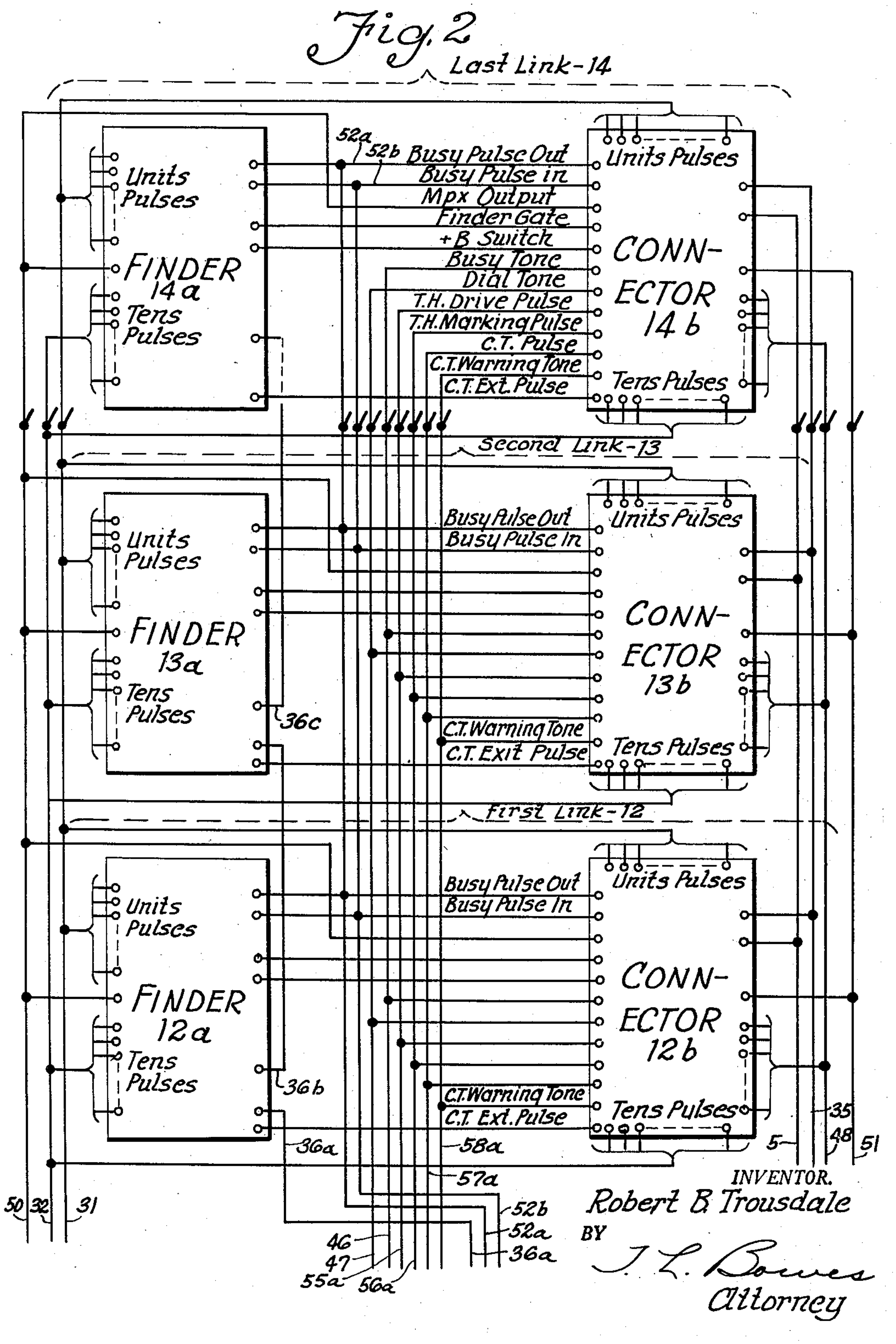
Figure 2A:
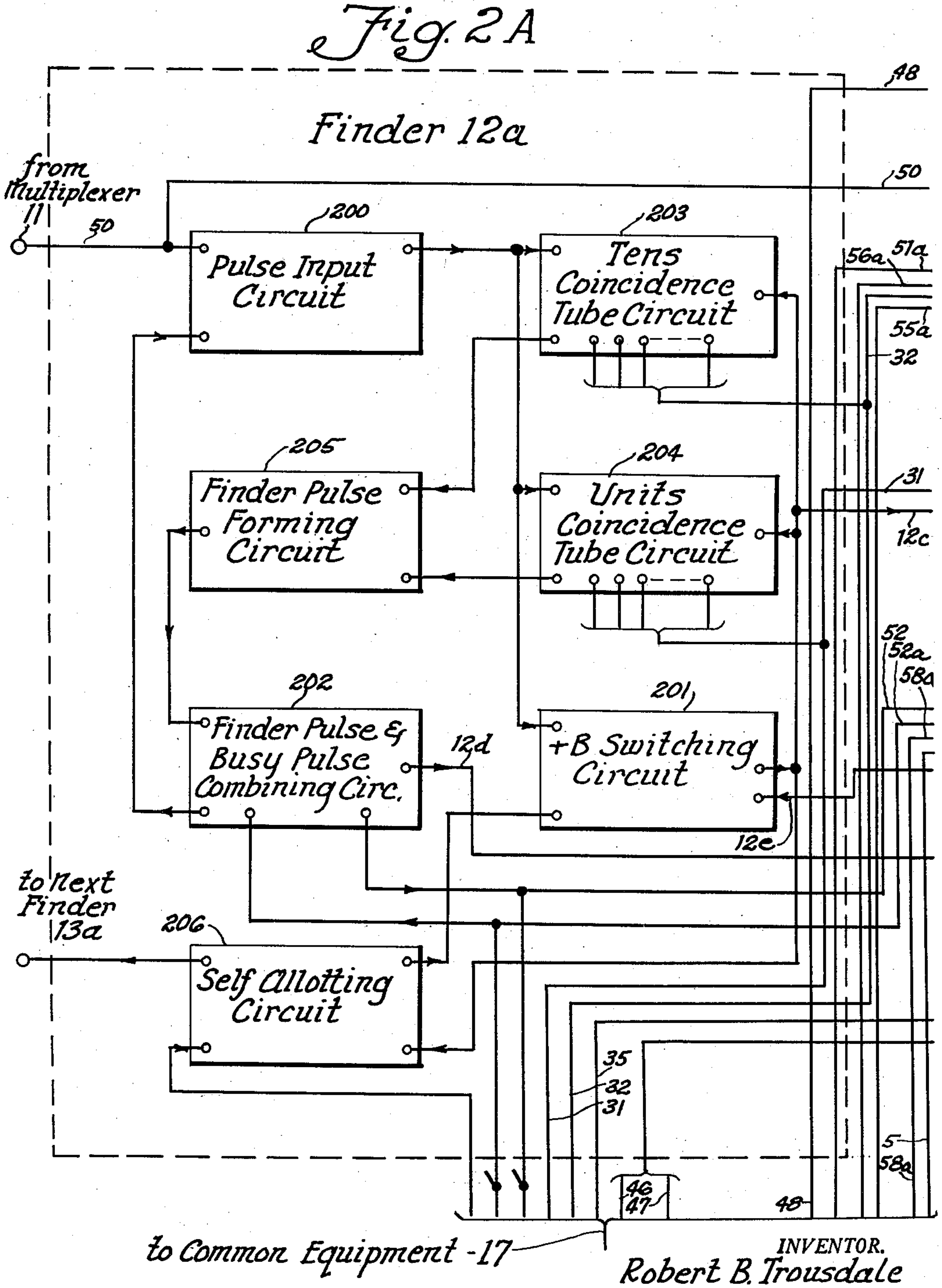

As previously explained in connection with Fig. 2A of the drawings, this finder comprises a pulse input circuit 200, a +B switching circuit 201, a finder pulse and busy pulse combining circuit 202, a tens coincidence tube circuit 203, a units coincidence tube circuit 204, a finder pulse forming circuit 205, and a self-allotting circuit 206. The functions performed by this circuit and the identified components thereof are also generally explained above with reference to the same figure of the drawings.

The pulse input circuit 200, the +B switching circuit 201, the finder pulse and busy pulse combining circuit 202, and the finder pulse forming circuit 205 may be substantially identical to the corresponding system components shown in any one of the copending applications, Serial No. 134,974, Serial No. 205,641, and Serial No. 257,712 referred to above, and accordingly a detailed description of these component circuits of the finder **12*a* is considered unnecessary herein. With regard to the self-allotting circuit 206**, this circuit may be identical with the corresponding circuit element shown in the copending application, Serial No. 257,712, or in the alternative a link allotter circuit such as shown in copending applications, Serial No. 134,974 and Serial No. 205,641 may be employed and reference may be had to these copending applications for a detailed description of the operation of these allotting circuits.

In the illustrated embodiment of the present invention the finder **12*a* is shown as controlled by positive tens and units pulses which are supplied to the tens coincidence tube circuit 203 and the units coincidence tube circuit 204. Accordingly, in the illustrated embodiment of the present invention the tens coincidence tube circuit 203 and the units coincidence tube circuit 204 of the finder 12*a* are of the improved type shown in my copending application, Serial No. 292,676 which was filed on June 10, 1952, and is assigned to the same assignee as the present invention and reference may be had to this copending application for a detailed description of these improved coincidence tube circuits. However, it will be understood that coincidence tube circuits such as shown in copending applications, Serial No. 134,974, Serial No. 205,641, and Serial No. 257,712 may be employed, in which case negative tens and units pulses are supplied from the tens and units pulse rings 21 and 20** to the respective coincidence tube circuits.

*Connector 12b*

Figure 2B:
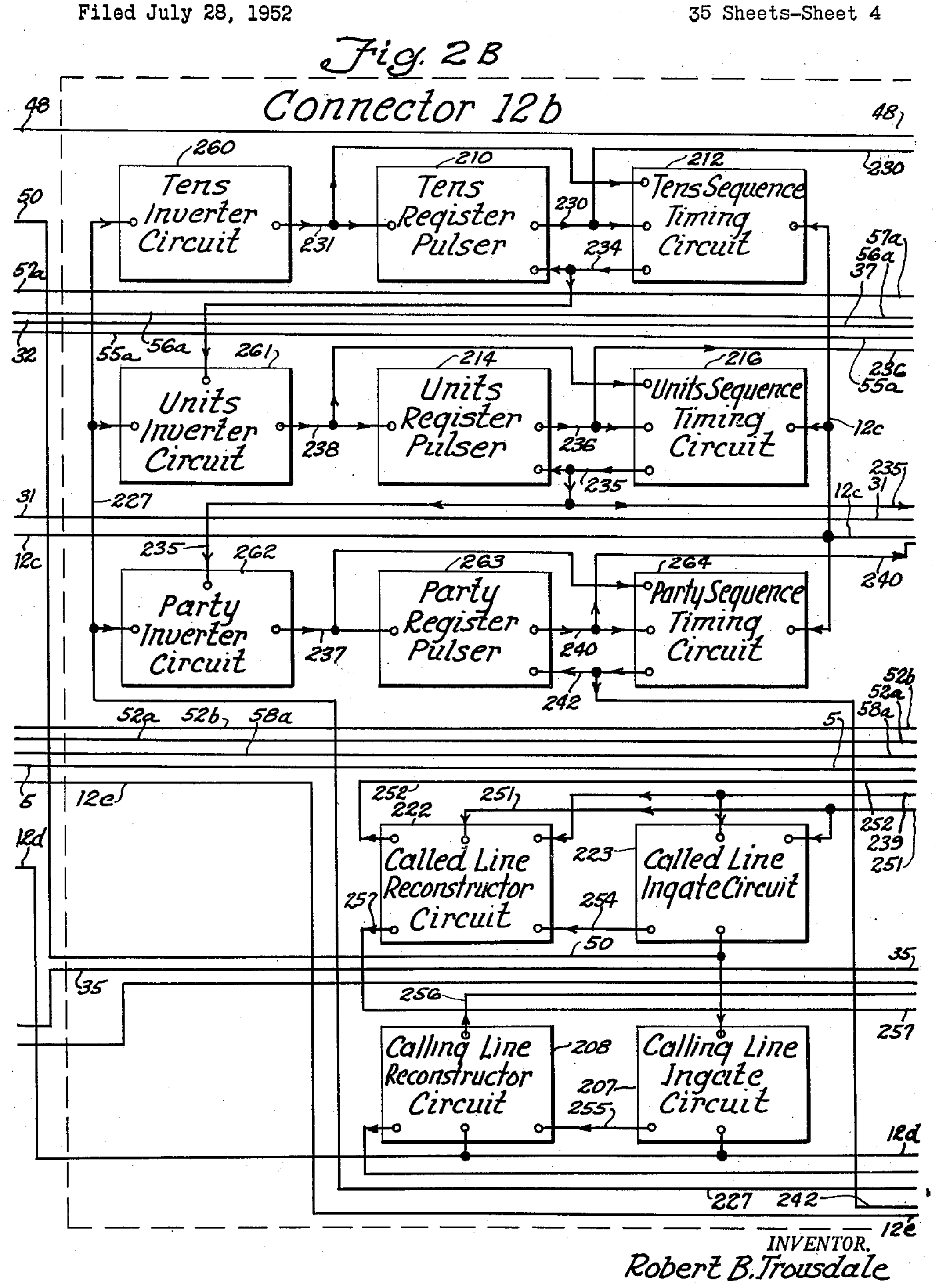
Figure 2C:
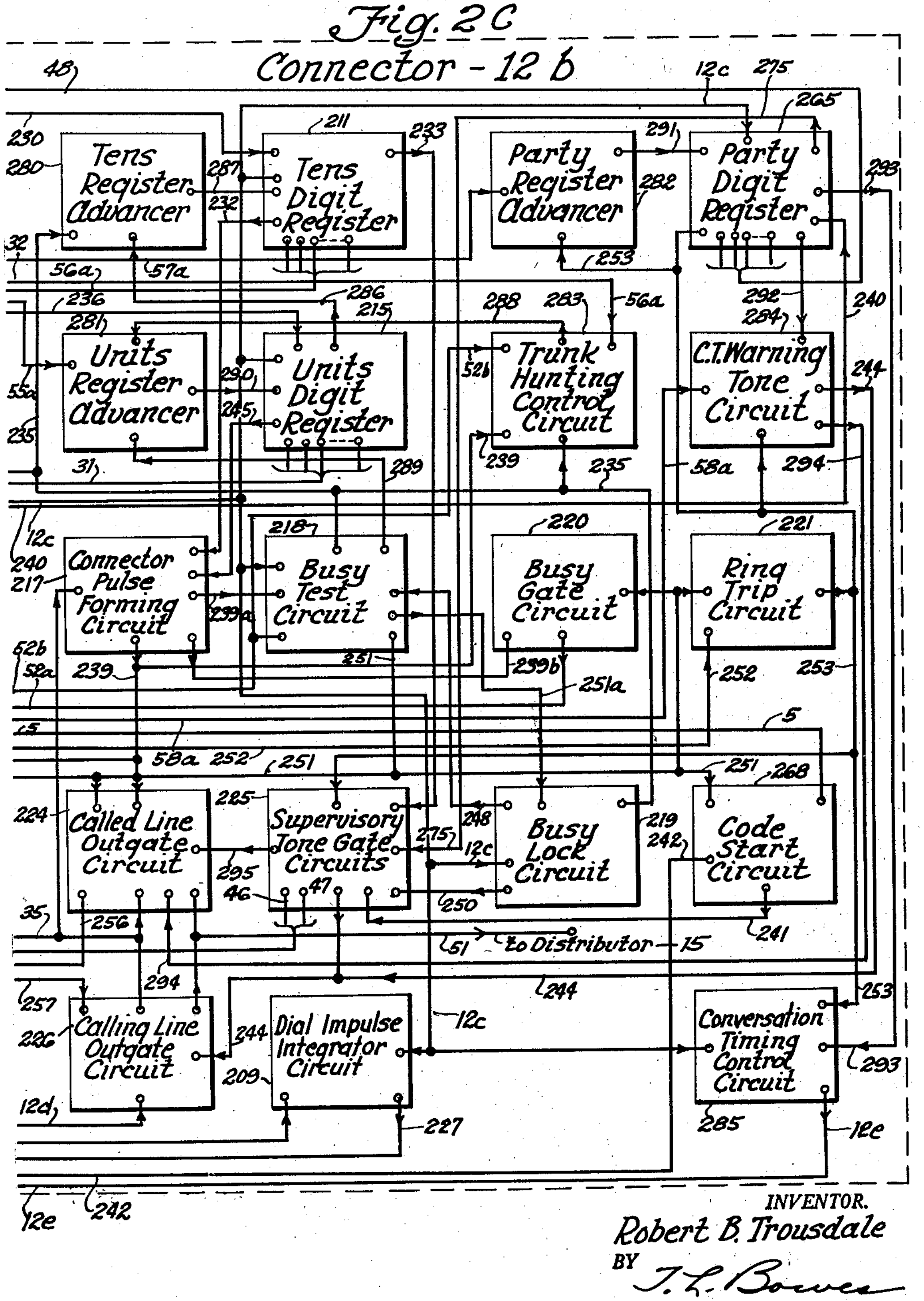

As explained generally in connection with Figs. 2B and 2C of the drawings, this connector generally comprises calling and called line in gate circuits 207 and 223, calling and called line out gate circuits 226 and 224, a dial impulse integrator circuit 209, tens, units, and party register pulsers 210, 214 and 263, tens, units and party inverter circuits 260, 261, and 262, tens, units and party sequence timing circuits 212, 216 and 264, and tens, units, and party digit registers 211, 215, and 265. The connector **12*b* is also diagrammatically illustrated in Figs. 2B and 2C of the drawings as comprising tens, units, and party register advancers 280, 281, and 282, a connector pulse forming circuit 217, a busy test circuit 218, a busy lock circuit 219, a busy gate circuit 220, a ring trip circuit 221, a trunk hunting control circuit 283, a conversation timing warning tone circuit 284, a code start circuit 268, supervisory tone gate circuits 225 and a conversation timing control circuit 285**. The functions performed by the connector and the above-identified components thereof are also generally described above with reference to Figs. 2B and 2C of the drawings.

Figure 6:
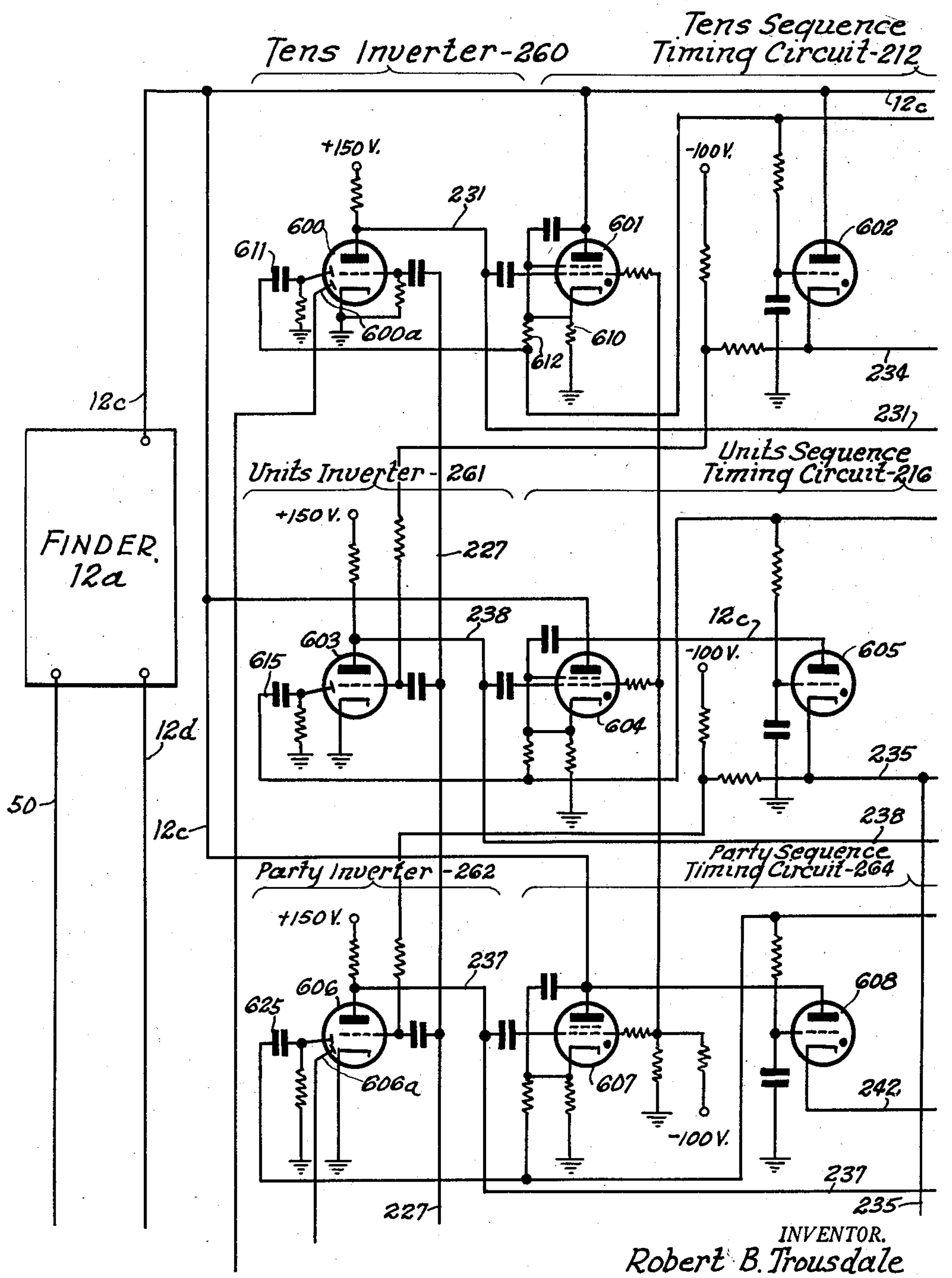
Figure 7:
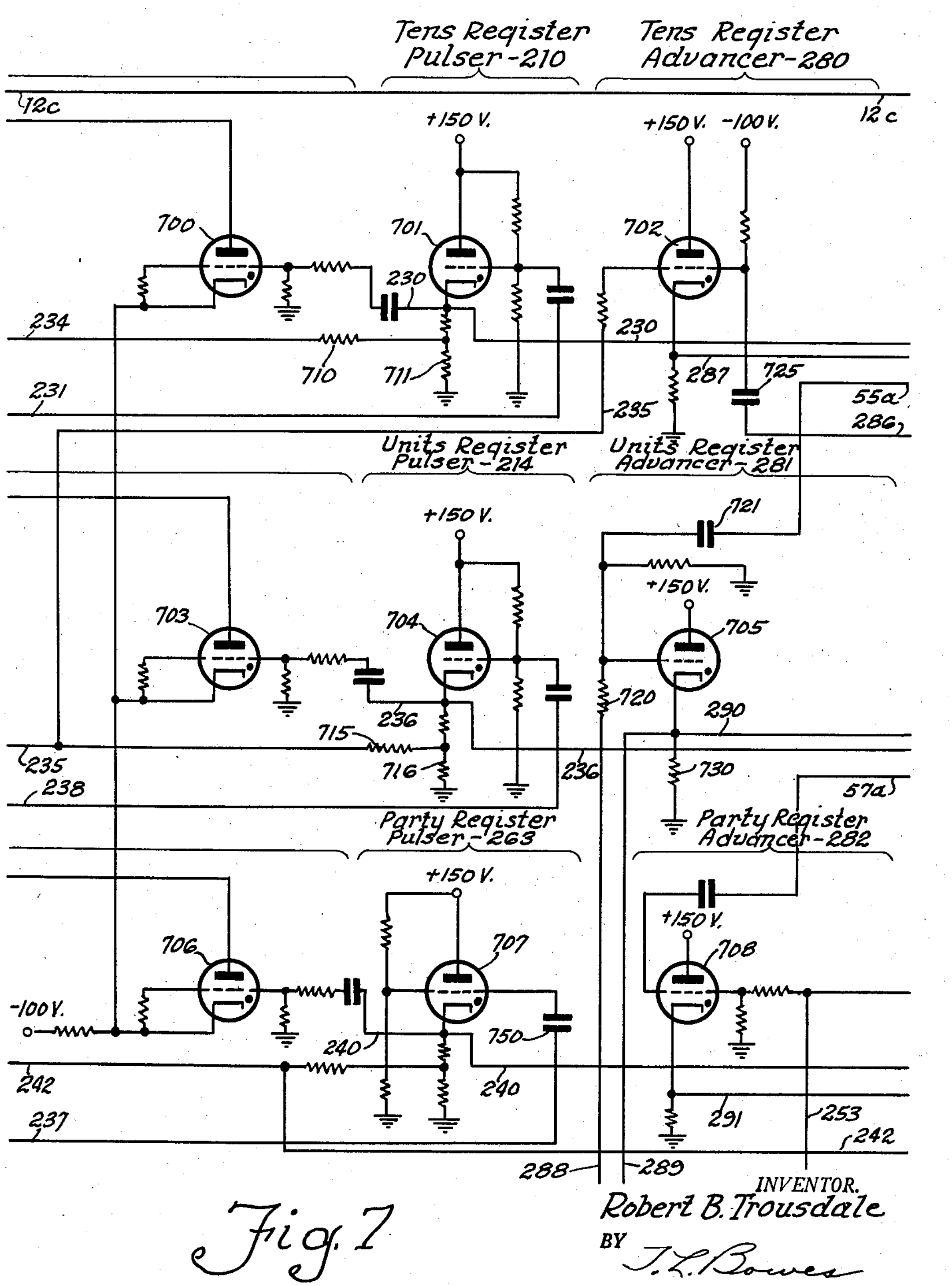
Figure 8:
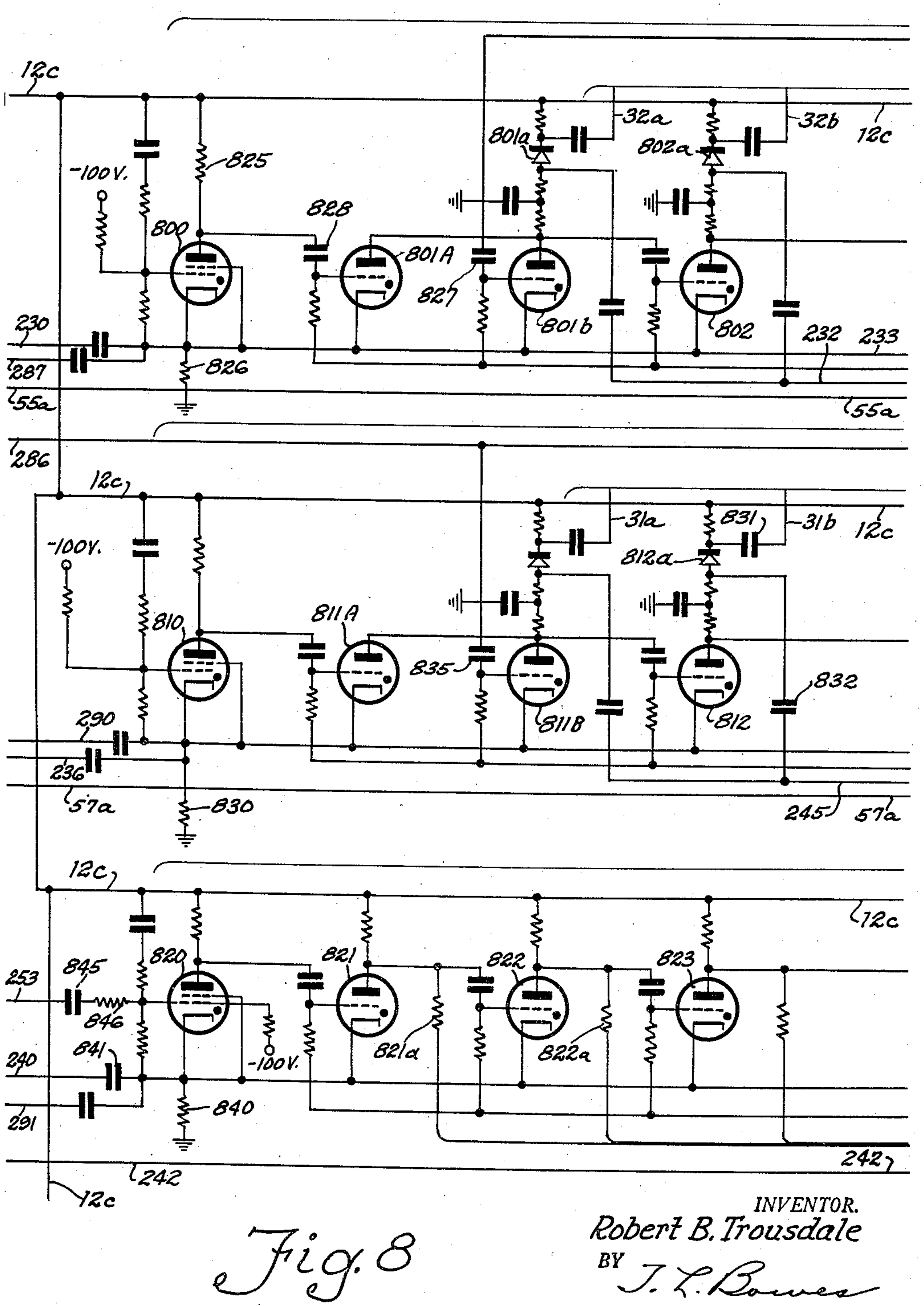
Figure 9:
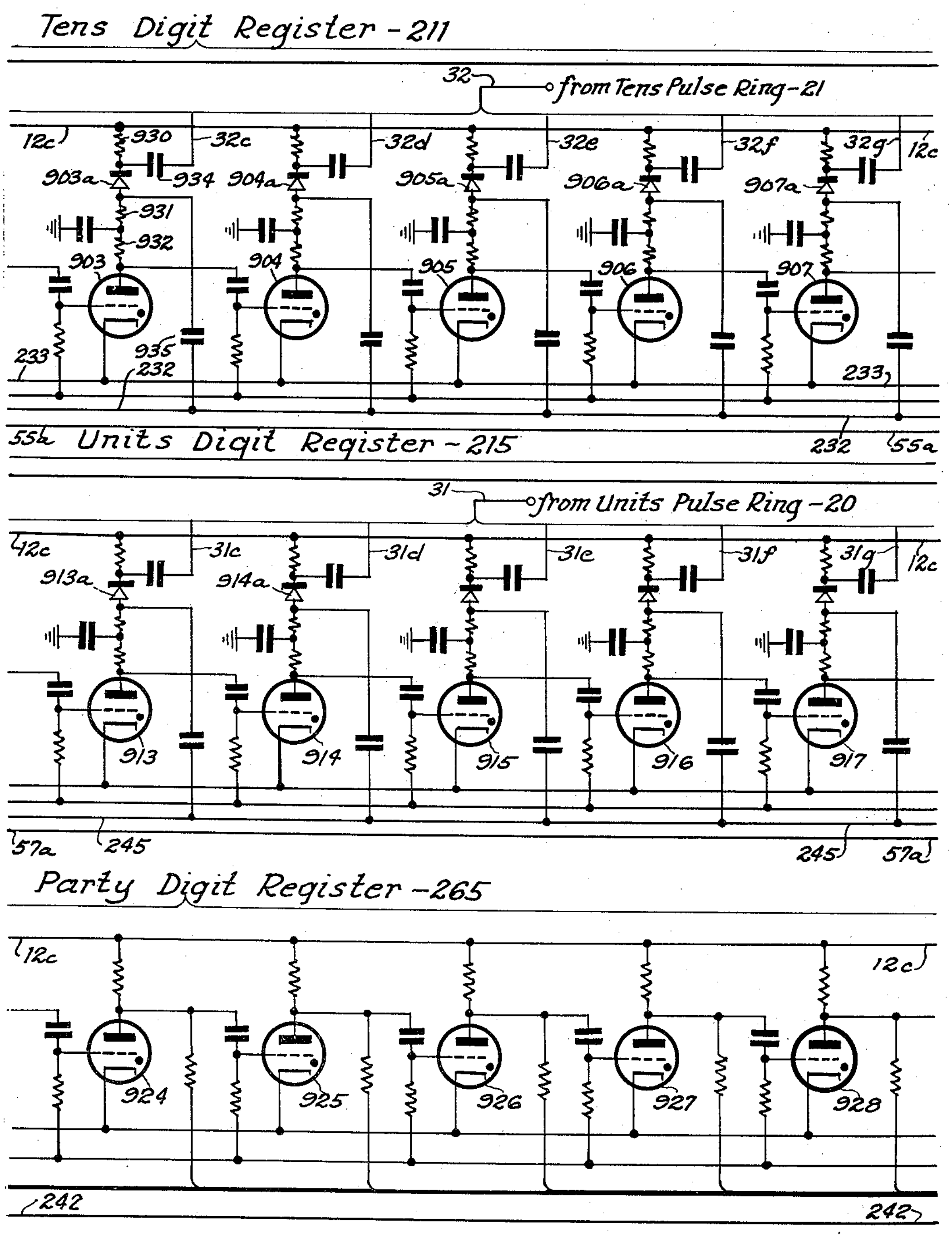
Figure 10:
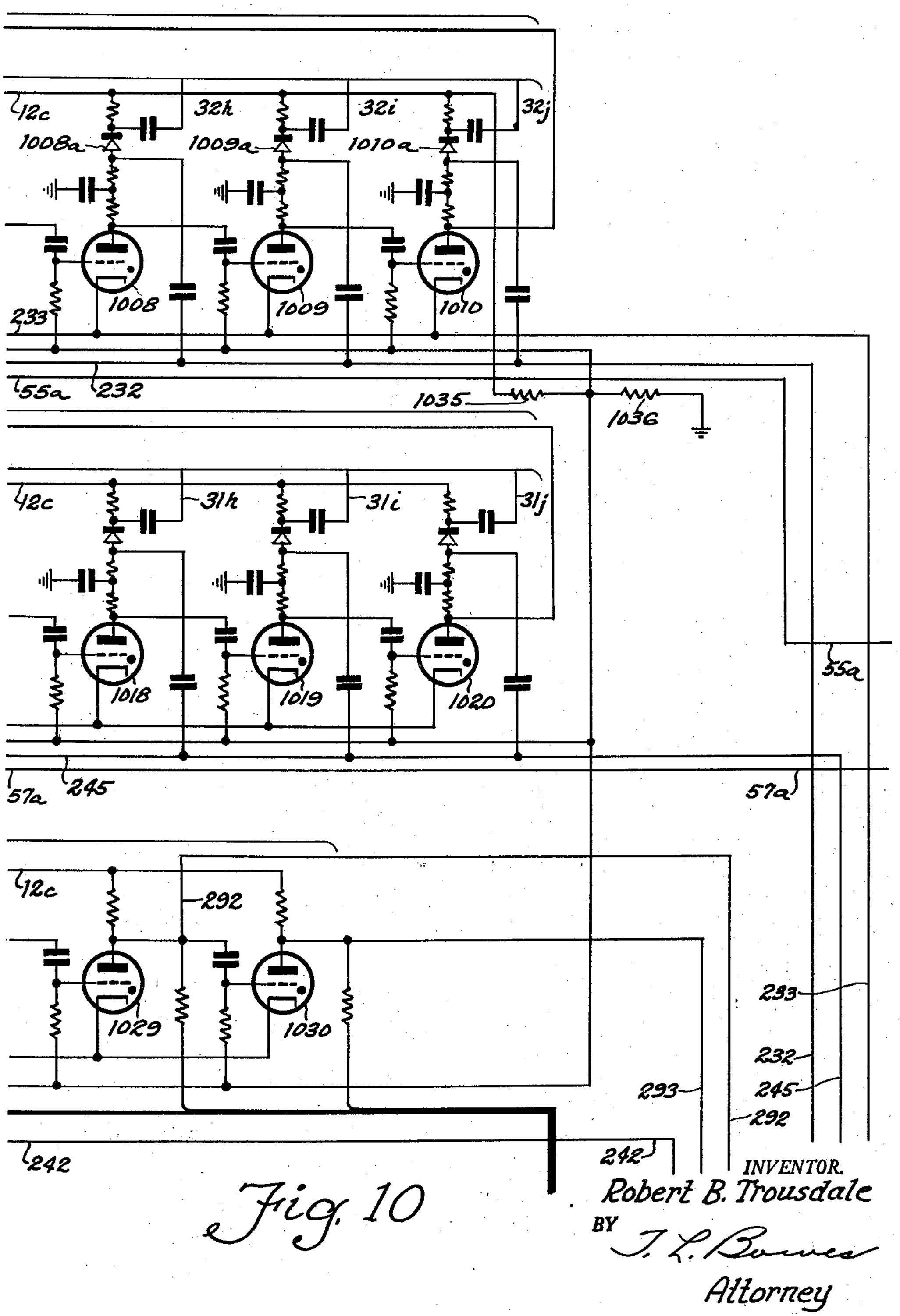
Figure 13:
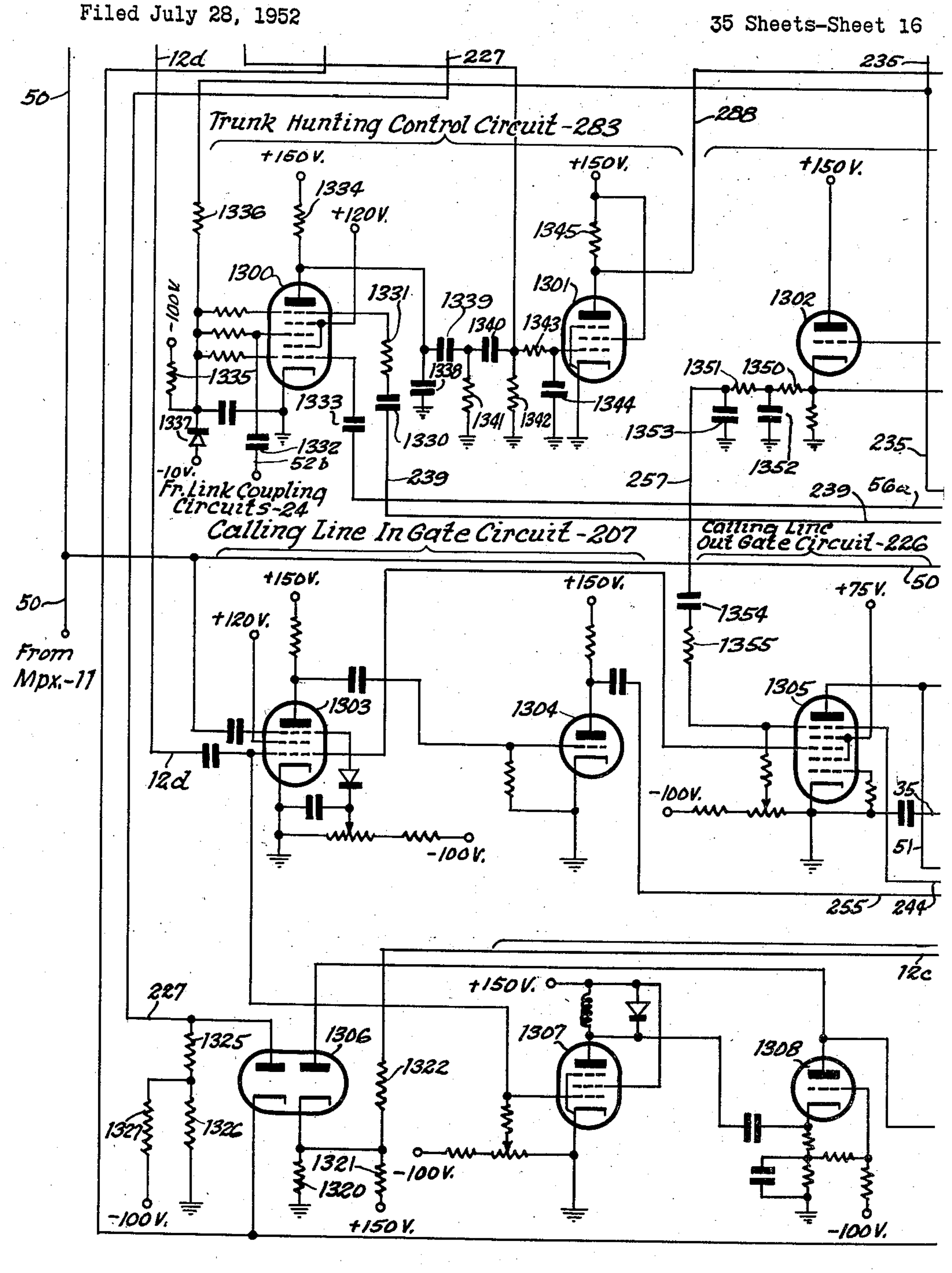
Figure 14:
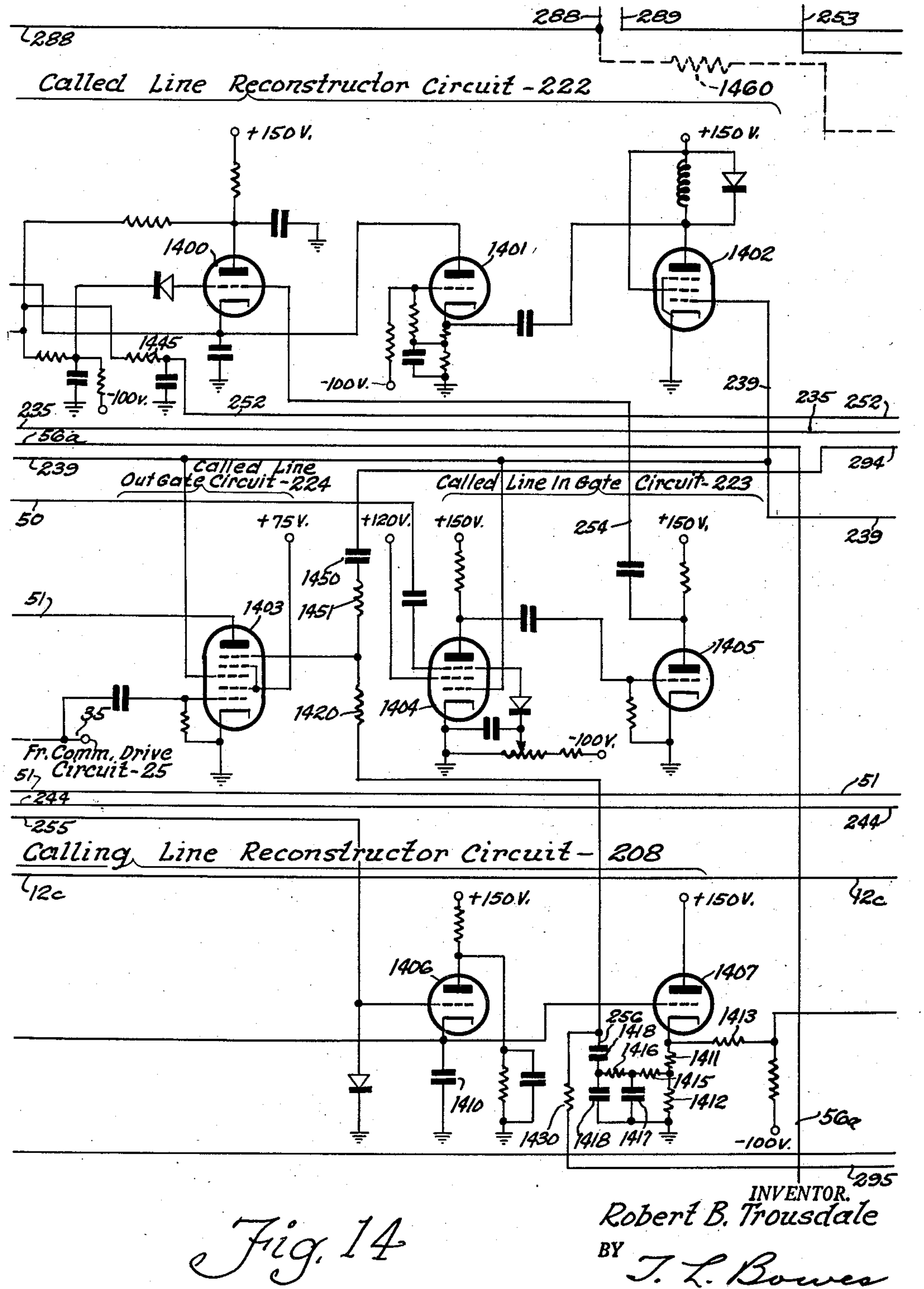
Figure 15:
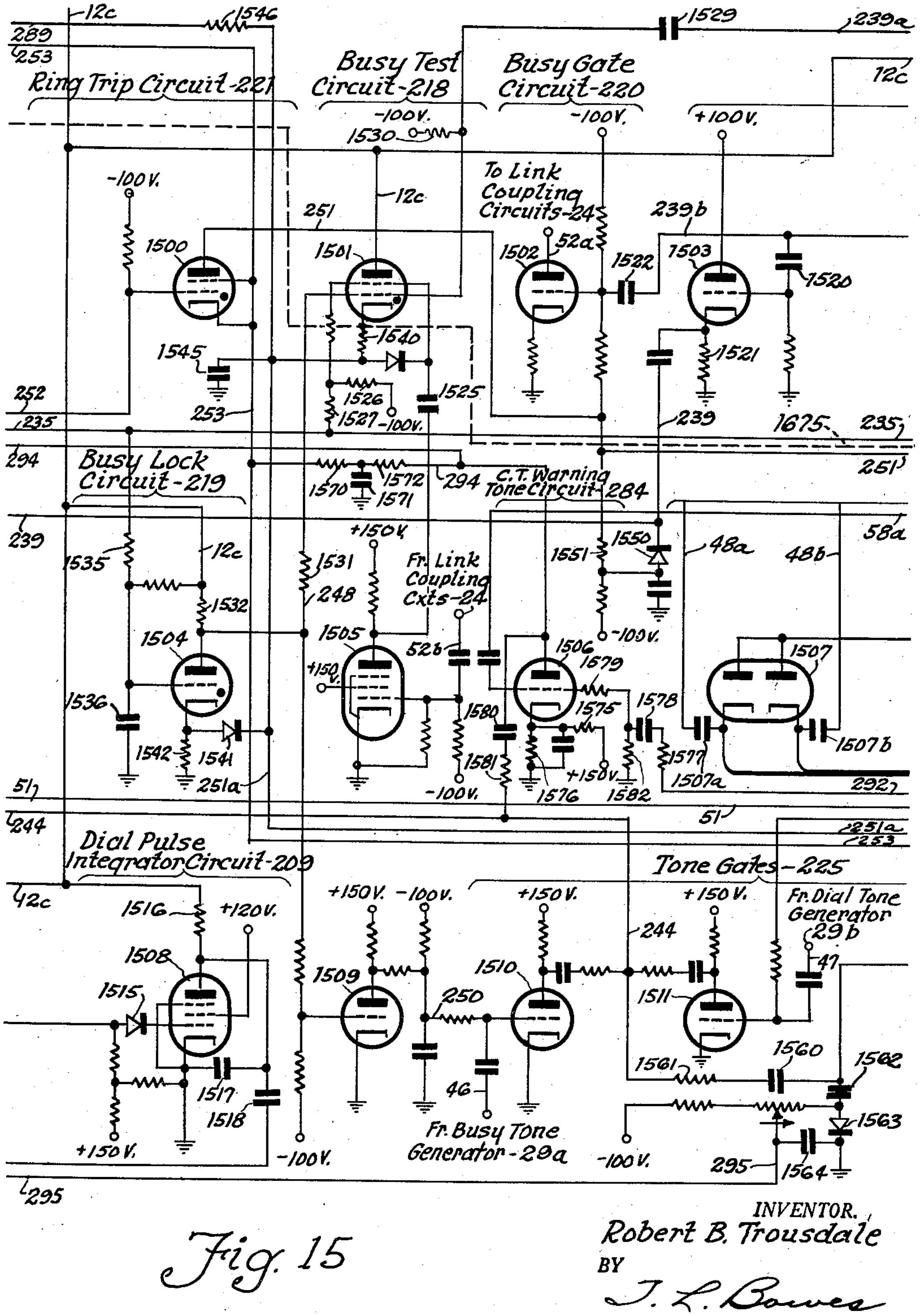
Figure 16:
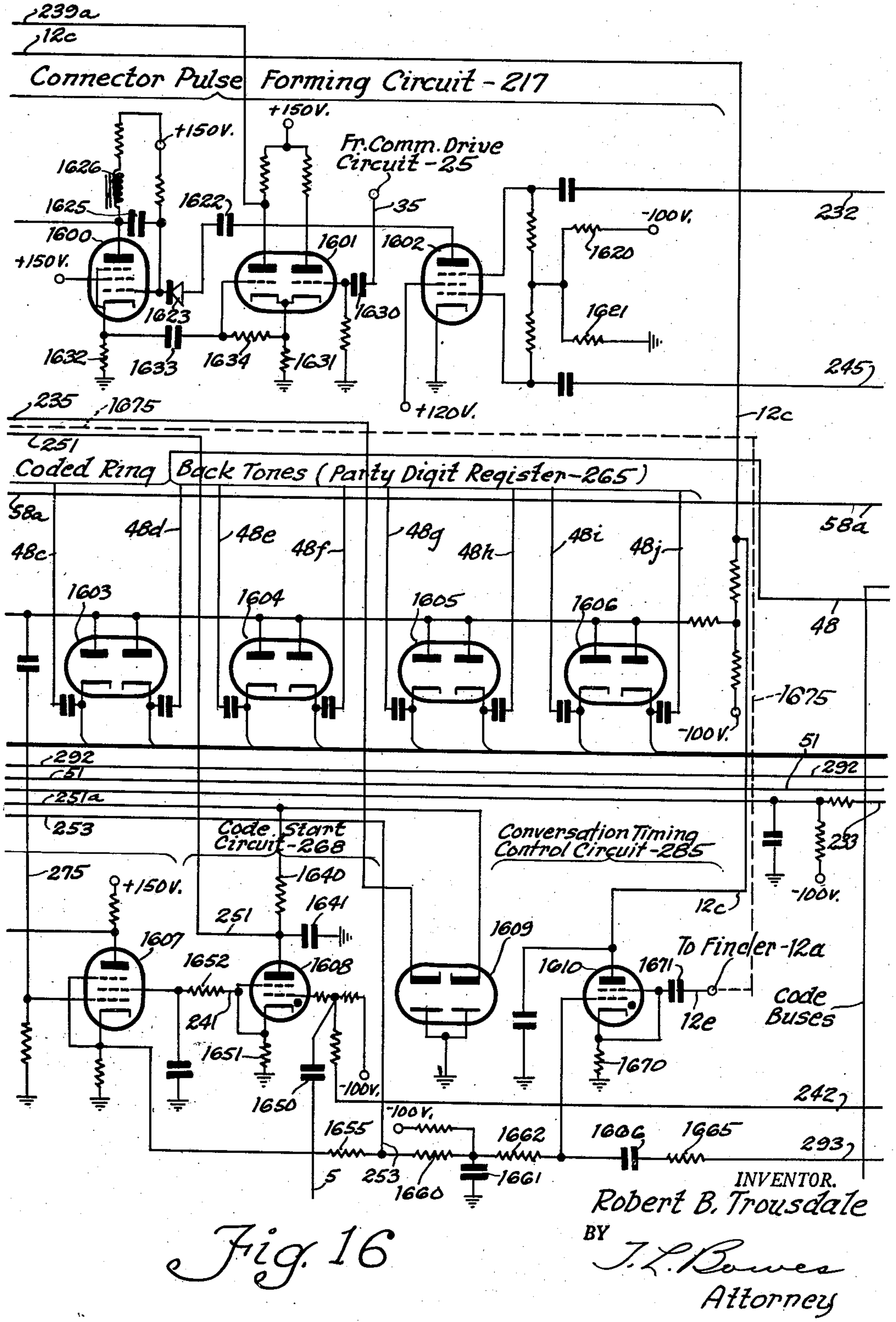

Referring now more particularly to Figs. 6–10, inclusive, and 13–16, inclusive, of the drawings, wherein the circuitry of the connector **12*b* is illustrated, it will be readily understood that the details of this connector may best be understood in terms of the functional significance of the various components thereof. In order to correlate these nine figures with the schematic showing of Figs. 2B and 2C, it may be pointed out that the tens, units, and party inverters 260, 261, and 262 are shown in Fig. 6 as respectively including the inverter tubes 600, 603, and 606, the tens sequence timing circuit 212 is shown in Figs. 6 and 7 as comprising a start tube 601, a timing tube 602, and a condenser discharge tube 700, the units sequence timing circuit 216 is shown in Figs. 6 and 7 as comprising a start tube 604, a timing tube 605, and a condenser discharge tube 703, and the party sequence timing circuit 264 is shown in Figs. 6 and 7 as comprising a start tube 607, a timing tube 608, and a condenser discharge tube 706. The tens register pulsers 210, 214, and 263 are shown in Fig. 7 of the drawing as respectively including the pulser tubes 701, 704, and 707. The tens, units, and party register advancers 280, 281, and 282 are shown in Fig. 7 of the drawings as respectively including the pulser tubes 702, 705, and 708. The tens digit register 211 is shown in Figs. 8, 9, and 10 of the drawings as including the primer tube 800, the parallel connected impulse counting tubes 801A and 801B which together comprise the first impulse counting stage and nine other impulse counting tubes 802, 903–907, inclusive, and 1008–1010, inclusive. The units digit register 215 is shown in Figs. 8, 9, and 10 as comprising the primer tube 810, the parallel connected tubes 811A and 811B which together comprise the first impulse counting stage, and nine other impulse counting tubes 812, 913–917, inclusive, and 1018–1020, inclusive. The party digit register 265 is shown in Figs. 8, 9, 10, 15, and 16 of the drawings as comprising the primer tube 820, ten impulse counting tubes 821–823, inclusive, 924–928, inclusive, 1029, and 1030, and five double diode gate tubes 1507 and 1603–1606, inclusive. The trunk hunting control circuit 283 is shown in Fig. 13 of the drawings as comprising the trunk hunting control tube 1300 and the trunk hunting inverter tube 1301, the calling line in gate circuit 207 is shown in Fig. 13 of the drawings as comprising the gate tube 1303 and the inverter 1304, the called line reconstructor circuit 222 is shown in Figs. 13 and 14 of the drawings as comprising a peaker tube 1402, a condenser discharging tube 1401, a condenser charging tube 1400, and a cathode follower output tube 1302, the calling line out gate circuit 226 is shown in Fig. 13 of the drawings as comprising a single triple grid gate tube 1305, the calling line reconstructor circuit 208 is shown in Figs. 13 and 14 of the drawings as comprising the peaker tube 1307, the condenser discharge tube 1308, the condenser charging tube 1406, a clamping diode including the right-hand section of the duo-diode 1306 and a cathode follower tube 1407, the called line out gate circuit 224 is shown in Fig. 14 of the drawings as comprising the single triple grid gate tube 1403, the called line in gate circuit 223 is shown in Fig. 14 of the drawings as comprising the gate tube 1404 and the inverter tube 1405, the ring trip circuit 221 is shown in Fig. 15 of the drawings as comprising the ring trip tube 1500, the busy test circuit 218 is shown in Fig. 15 of the drawings as comprising the busy test tube 1501 and the inverter tube 1505, the busy lock circuit 219 is shown in Fig. 15 of the drawings as comprising the busy lock tube 1504 and the inverter tube 1509, the dial impulse integrator circuit 209 is shown in Figs. 15 and 13 as comprising the dial impulse integrator tube 1508 and a diode clamping tube comprising the left-hand section of the duo-diode 1306, the busy gate circuit 220 is shown in Fig. 15 of the drawings as comprising the gate tube 1502, and the connector pulse forming circuit 217 is shown in Figs. 15 and 16 of the drawings as comprising a connector pulse mixer tube 1602, a connector pulse sharpening tube 1601, an inverter tube 1600, and a cathode follower output tube 1503. The conversation timing warning tone circuit 284 is shown in Fig. 15 as comprising the gate tube 1506, the tone gate circuits 225 are shown in Figs. 15 and 16 as comprising the busy tone gate tube 1510, the dial tone gate tube 1511 and the ringback tone gate tube 1607, the code start circuit 1508 is shown in Fig. 16 as comprising the code start tube 1608, and the conversation timing control circuit 285 is shown in Fig. 16 as comprising the control tube 1610**.

The manner in which the identified tubes of the connector are interconnected is pointed out more fully below with reference to the operation of the individual circuits. Although the identified tubes may be of any desired commercial type having the required operating characteristics, it is pointed out that preferably the tubes 600, 603, 606, 1400, 1401, 1308, and 1406 are duo-diode triodes of the commercial type 6AQ6, the tubes 1302, 1304, 1407, 1405, 1509, 1506, 1510, 1511, 1502, and 1503 are triodes of the commercial type 6C4, the tube 1601 is a double triode of the commercial type 6J6, the tubes 1303, 1404, and 1602 are pentodes of the commercial type 6AS6, the tubes 1301, 1307, 1402, 1600, 1607, 1505, and 1508 are pentodes of the commercial type 6AU6, the tubes 1300, 1305, and 1403 are preferably of the RCA development type A5727 and are provided with three control grids each having a substantial mutual conductance with respect to the anode when operated at a potential negative with respect to the cathode, and the tubes 1306, 1507, 1603–1606, and 1609 are hot cathode duo-diodes of the commercial type 6AL5. Preferably, the gas filled thyratrons of the hot cathode type included in the connector **12*b*, namely the tubes 601, 604, 607, 800, 810, 820, 1500, 1501, 1608, and 1610, are of the RCA commercial type 5696. The cold cathode gas filled triodes included in the connector 12*b* are preferably of the RCA commercial type 5823. This group includes the tubes 602, 605, 608, 700–708, inclusive, 801A, 801B, 802, 811A, 811B, 812, 821–823, inclusive, 903–907, inclusive, 913–917, inclusive, 924–928, inclusive, 1008–1010, inclusive, 1018–1020, inclusive, 1029, 1030, and 1504**.

Before considering the operation of the connector **12*b*, it is pointed out that certain of the circuits of this connector are identical or substantially identical with corresponding circuits in the connector disclosed and described in detail in my copending application, Serial No. 257,712 referred to above. Specifically, the tens, units and party inverter circuits 260, 261, and 262, the tens, units, and party sequence timing circuits 212, 216, and 264, the tens, units and party register pulsers 210, 214 and 263, the calling line in gate circuit 207, the called line in gate circuit 223, the busy gate circuit 220, the busy lock circuit 219, and the busy and dial tone gate circuits in the tone gates 225** are all substantially identical to the corresponding circuits identified by the same reference numbers in my copending application, Serial No. 257,712 referred to above. Accordingly, only a general description of these circuits will be made herein in connection with the tracing of the above-described call from the substation A to the substation B′, since reference may be had to my copending application, Serial No. 257,712 for a detailed description of these circuits.

In considering the operation of the connector **12*b*, reference is again made to the above-described call originating at the substation A and routed by way of the link 12 to the called substation B′. From the description of this call it will be found that when the finder-connector link 12 is idle, the finder 12*a* withholds operating anode potential from the conductor 12*c* and also withholds finder gate pulses from the conductor 12*d*. Immediately the finder 12*a* is associated with the calling line 23, the +B switching circuit 201 thereof operates to impress a positive potential of 140 volts on the conductor 12*c* and almost immediately thereafter functions to impress finder gate pulses upon the conductor 12*d* in the time position 64*b* assigned to the calling line 23. When operating anode potential is thus applied to the conductor 12*c*, the primer tube 800 in the tens digit register 211 is fired to produce current flow therethrough over a path which includes the anode resistor 825 and the cathode resistor 826 of the tube 800. Current flow through the resistor 826 raises the parallel connected cathodes of the counting tubes in the tens digit register 211 to a relatively high value since the tube 800 is of the hot cathode type and hence has a relatively small voltage drop thereacross when ionized, so that the impulse counting tubes of the register 211 are prevented from prematurely firing in the manner more fully described below. Also, when operating anode potential is applied to the conductor 12*c*, the priming tube 810 in the units digit register 215 is fired to prevent the impulse counting tubes of this register from prematurely firing and the primer tube 820 in the party digit register 265** is also fired to prevent the counting tubes in this register from firing prematurely.

The relatively large voltage drop produced across the resistor 826 in the manner described above is transmitted over the conductor 233 to the control grid of the dial tone gate tube 1511 thereby rendering this tube operative to amplify the dial tone signal voltage impressed upon the control grid thereof from the dial tone signal conductor 47. The amplified dial tone signal appearing at the anode of the tube 1511 is impressed upon the third control grid of the calling line out gate tube 1305 over the conductor 244, and this signal voltage modulates the pulses gated by the tube 1305 in the time position **64*b* assigned to the calling line 23** with the dial tone signal so that this signal is delivered to the calling line to signal the calling subscriber that the dialing operation may be started.

Referring now more particularly to the calling line in gate circuit 207, the finder gate pulses produced on the conductor **12*d* in the finder 12*a* control this circuit to gate multiplexer pulses occurring on the multiplexer output conductor 50 in the time position 64*b* assigned to the calling line 23 to the calling line reconstructor circuit 208. Thus, the positive signal modulated multiplexer pulses appearing on the conductor 50 are impressed upon the suppressor grid of the gate tube 1303 and the positive finder gate pulses developed on the conductor 12*d* are impressed upon the first control grid of the tube 1303 so that this tube is rendered conductive only when multiplexer pulses are impressed upon the suppressor grid of this tube coincidentally with excitation of the tube control grid by finder gate pulses. Accordingly, the tube 1303 is rendered operative to repeat only those multiplexer pulses which occur in the time position assigned to the calling line and these pulses are amplified and inverted in the inverter tube 1302 and transmitted over the conductor 255 to the calling line reconstructor circuit 208**.

In considering the operational details of the calling line reconstructor circuit 208, it is pointed out that this circuit is identical in many respects to the corresponding circuit shown in copending application, Serial No. 257,712 referred to above, and reference may be had to this specification for a complete and detailed illustration of the circuit 208. However, for the purposes of the present invention it may be stated that the circuit 208 functions to store the amplitude of the signal modulated multiplexer pulses as amplified through the tubes 1303 and 1304 for an interval equal to the duration of one pulse frame. In general this is accomplished by charging the condenser 1410 through the charging tube 1406 in accordance with the amplitude of each pulse repeated to the reconstructor circuit 208 by the calling line in gate circuit 207 and discharging this condenser through the tube 1308 just prior to each such condenser charging operation. As the amplitude of the signal bearing multiplexer pulses impressed upon the control grid of the tube 1406 varies in accordance with intelligence, voice, or other signals from the calling line 23, the voltage on the condenser 1410 is correspondingly varied to detect or reproduce the intelligence component of the multiplexer pulses.

During dialing at the calling substation A, and more particularly during the open circuit or break period of each dial impulse, the flow of multiplexer pulses through the gate circuit 207 is interrupted. However, the flow of finder gate pulses to the control grid of the peaker tube 1307 is not interrupted due to the holding action of the +B switching circuit 201 in the finder **12*a*. As a result the discharge tube 1308 is periodically rendered conductive during the open circuit period of each dial impulse with the result that the condenser 1410 is discharged down to a relatively low level. Thus the circuit 208** is arranged to discriminate between directive dial impulses and supervisory signals on the one hand, and voice or intelligence signals on the other hand.

In accordance with the present invention the storage condenser 1410 is also connected to a positive potential by means of the right-hand diode section of the tube 1306 and the voltage divider network including the resistors 1320, 1321, and 1322. Before the finder **12*a* is operatively associated with the calling line, the potential on the conductor 12*c* is zero so that a small positive potential is produced at the cathode of the right-hand diode section of the tube 1306 and this diode prevents the condenser 1410 from charging positively with respect to the potential at the junction point of the resistors 1320 and 1321. However, when operating anode potential is applied to the conductor 12*c*, the potential at the junction point of the resistors 1320 and 1321 increases to a relatively high positive value so that the right-hand diode section of the tube 1306 is rendered non-conductive and the charging condenser 1410 is thereafter permitted to be charged and discharged under the control of the tubes 1406 and 1308 in the manner described above. With this arrangement, the condenser 1410 is prevented from charging positively during on-hook periods so that when the connector 12*b* is seized a large voltage surge, which would produce a pulse response in the dial impulse registers 211, 215, and 265**, is positively avoided.

The signal voltages thus reconstructed across the condenser 1410 are positively impressed upon the control grid of the cathode follower tube and are repeated across the cathode resistors 1411 and 1412 of this tube. The reconstructed signal voltage produced across the resistors 1411 and 1412 is coupled through the resistor 1413 and the rectifier 1515 to the control grid of the dial pulse integrator tube 1508. The voltage divider including the resistors 1413 and **1413*a*, connected between the cathode of the tube 1407 and —100 v., changes the voltage level of signals appearing at the cathode of tube 1407 to a more negative value such that positive clipping is accomplished by the rectifier 1515, as will be described in more detail hereinafter. Also, in accordance with a feature of the present invention, a portion of the reconstructed signal voltage which appears across the resistor 1412 is passed through a band pass filter to remove the abrupt steps in the wave form produced by the abrupt charging and discharging of the condenser 1410, and the smooth or filtered audio signal is then transmitted over the conductor 256 to the third control grid of the called line out gate tube 1403. This band pass filter includes the series resistors 1415 and 1416 and the shunt condensers 1417 and 1418 which remove the abrupt steps from the reconstructed wave form, and the pure audio signal is coupled through the condenser 1418, the conductor 256, and the resistor 1420 to the third control grid of the gate tube 1403**.

In considering the operation of the dial pulse integrator circuit 209, it is pointed out that this circuit is identical in many respects with the corresponding circuit described in detail in my copending application, Serial No. 257,712 and reference may be had to this specification for a detailed description of this circuit. However, for the purposes of the present invention, it may be stated that this circuit performs the function of discriminating between dial impulses and all other signals developed at the output side of the calling line reconstructor circuit 208.

When the connector **12*b* is not occupied with a call, operating anode potential for the integrator tube 1508 is withheld from this tube in the +B switching circuit 201 of the finder 12*a*. When anode potential is impressed upon the conductor 12*c* the tube 1508 is biased so as to conduct heavily, thereby to produce a voltage drop across the anode resistor 1516 of this tube which prevents the condenser 1517** from charging to any appreciable extent.

During the open circuit or break period of each impulse dialed at the substat ion A, the voltage at the cathode of the tube 1407 is reduced to its on-hook value and this low frequency dial impulse change produced at the cathode of the tube 1407 is impressed upon the control grid of the dial pulse integrator tube 1508 so as to cut off this tube. Consequently, the condenser 1517 is charged through the resistor 1516 at a rate determined by the time constant of this resistance-capacitance circuit. When the open circuit period of the dial impulse ends, the potential at the cathode of the tube 1407 rises rapidly thereby reinitiating current conduction through the tube 1508, and the condenser 1517 is discharged abrutply to its previous low potential level. Accordingly, saw-tooth voltage pulses are developed across the condenser 1517, the magnitude of which is determined solely by the duration of the open circuit period of the corersponding dial impulse.

In order to remove undesired transient spikes which may be super-imposed upon the dial impulses in the reconstructor circuit 208, the rectifier 1515 is provided, which becomes non-conductive as soon as grid current starts to flow in the tube 1508 and thereby positively prevents the transmission of signals to the control grid of the tube 1508 during the conductive intervals thereof. Also, in order to accommodate relatively high dialing speeds, a variable time constant differentiating circuit including the condenser 1518, and the diode section **606*a* of the party inverter tube 606 (Fig. 6) is provided. While this variable time constant differentiation circuit is effective to produce a uniform output pulse over a wide range of dialing speeds, as described in detail in my copending application, Serial No. 257,712 referred to above, in order to remove completely any positive portion of the differentiated wave form, there is provided in accordance with the present invention a further dial pulse clipping network including the left-hand diode section of the tube 1306 and the resistors 1325, 1326, and 1327. The left-hand diode section of the tube 1306, which is biased to a negative voltage by means of the voltage divider network including the resistors 1326 and 1327, operates to clip the small remaining positive bump in the wave form obtained from the variable time constant differentiating circuit, which bump is caused by the finite conducting resistance of the diode section 606*a*. Accordingly, with the present dial impulse intergrator circuit a clean base line broken only by negative dial impulse control pulses is produced on the conductor 227 and supplied over this conductor to the tens, units, and party inverters 260, 261, and 262**.

Normally, the units and party inverter tubes 603 and 606 are biased against conduction so that the control pulses produced by the dial impulse integrator circuit 209 during dialing of the first digit are repeated only through the tens inverter tube 600 and appear as positive impulses on the conductor 231 which are transmitted to the tens sequence timing circuit 212 and the tens register pulser 210. In the particular call under consideration where in the tens digit designation of the called line 32 is "3," three short positive control pulses are repeated by the tens inverter circuit 260 to each of the circuits 210 and 212.

The tens register pulser 210 responds to each of the positive control pulses repeated thereto by developing positive pulses of uniform amplitude and duration which are produced across the common cathode drive resistor 826 of the tens digit register 211. In this connection it is pointed out that the tens register pulser 210 is identical with the corresponding circuit described in detail in my copending application, Serial No. 257,712 referred to above, and reference may be had to this specification for a complete and detailed description of this circuit.

In considering the operation of the tens digit register 211 to register the numerical value of any tens digit dialed at a calling substation, it is pointed out that this circuit is identical in many respects to the corresponding circuit described in detail in my copending application, Serial No. 257,712 referred to above. However, in accordance with the present invention, the tens digit register 211 is provided with facilities for recycling this register so that the impulse counting tubes thereof may be fired in an endless sequence to permit trunk hunting through more than one successive tens digit level and to permit trunk hunting from the end of one pulse frame to the start of the next pulse frame.

Generally considered, the register 211 is driven by the large positive register drive pulses produced across the resistor 826 by the pulser 210 and the impulse counting tubes of this register are connected as a pulse counting chain wherein the cathodes of all of the tubes 801A, 802, 903–907, inclusive, and 1008–1010, inclusive, are all connected to the common drive conductor 233, the anodes are all returned through suitable anode resistors to the +B switch conductor 12*c*, the anode of each tube is positively coupled to the control grid of the next succeeding tube through suitable coupling condensers, and the control grid of each tube is normally biased to a predetermined positive potential by means of a common voltage divider network including the resistors 1035 and 1036 which are connected in series from the conductor 12*c* to ground. The impulse counting tube 801B is provided for the purpose of recycling the tens digit register 211 after the pulse counting chain has been stepped to the tenth impulse counting stage which includes the tube 1010. Thus, the anode of the tube 1010 is coupled through the condenser 827 to the control grid of the tube 801B, and the anode and cathode of this tube are connected in parallel with the anode and cathode of the impulse counting tube 801A.

The first register drive pulse produced across the resistor 826 raises the positive potential on the common cathode conductor 233 sufficiently to cut off the primer tube 800 and prevent any of the impulse counting tubes from firing for the duration of the pulse. However, when the register drive pulse across the resistor 826 disappears, a positive pulse produced across the anode resistor 825 of the priming tube 800 is coupled through the condenser 828 to the control grid of the first impulse counting tube 801A thereby firing this tube and registering the first dial impulse. The second register drive pulse extinguishes the first counting tube 801A and at the end of this register drive pulse the second counting tube 802 is fired to produce space current flow therethrough. The manner in which one or all of the remaining eight counting tubes of the register 211 are successively fired as additional impulses of a given tens digit are dialed at the calling substation will be fully apparent from the explanation just given. In the call under consideration wherein the called line 32 has a tens digit designation of "3," the third counting tube 903 will be ionized in response to the third impulse of the tube and will remain conductive for the duration of the call.

The impulse counting tubes are employed selectively to control the gating crystal rectifiers 801*a*, 802*a*, 903*a*–907*a*, inclusive, and 1008*a*–1010*a*, inclusive, to gate to the connector pulse forming circuit 217 only those tens pulses which occur in the tens pulse time position assigned to a particular called line. The details of the improved crystal gating rectifier arrangement of the register 211 are described in my copending application, Serial No. 292,676 referred to above. However, for the purposes of the present invention it is pointed out that when one of the impulse counting tubes, such as the tube 903 in the illustrated call, is ionized, the flow of current through the anode resistors 930, 931, and 932 from the conductor 12*c* to the anode of the tube 903 renders the gating rectifier 903*a* fully conductive so that tens pulses appearing on the conductor 32*c* are coupled through the condenser 934, the gating rectifier 903, and the coupling condenser 935 to the common output bus 232 of the tens digit register 211, and the selected tens pulses appearing on the conductor 232 are transmitted to the connector pulse forming circuit 217. In this connection it will be understood that the tens pulses selectively controlled by each of the impulse counting tubes are momentarily gated to the output conductor 232 as these tubes are successively fired during the dial impulses constituting the first digit. However, only the last fired tube of the tens digit register 211, which in the illustrated call is the tube 903, remains ionized for the remainder of the call or until the trunk hunting facilities of the system step the tens digit register to a succeeding impulse counting stage as will be described in more detail hereinafter.

When the dialing operation is started and the first register drive pulse has been produced across the common cathode resistor 826 in the tens digit register 211, the primer tube 800 is extinguished and the first impulse counting tube 801A is ionized. Since the impulse counting tubes 801A, 802, 903, etc., are of the cold cathode type, the voltage drop thereacross when one of these tubes is ionized is substantially greater than the voltage drop across the priming tube 800 when this tube is ionized. Therefore the voltage produced across the common cathode resistor 826 due to conduction of any one of the impulse counting tubes is substantially less than the voltage produced across this resistor when the priming tube 800 is ionized. Accordingly, the voltage on the common cathode conductor 233 is substantially decreased after the priming tube 800 is extinguished and this potential decrease is transmitted over the conductor 233 to the control grid of the dial tone gate tube 1511 so as to render this tube non-conductive. As a consequence, the tube 1511 is blocked against repeating the dial tone signal on the conductor 47 to the calling line out gate circuit 226, and dial tone transmission to the calling substation is arrested.

Referring now more particularly to the tens sequence timing circuit 212, it is pointed out that this circuit is identical with the corresponding circuit described in detail in my copending application, Serial No. 257,712 referred to above. However, for the purpose of the present invention it may be stated that the first impulse of the first digit dialed at the calling substation A results in a positive control pulse upon the conductor 231 which is impressed upon the control grid of the tens sequence start tube 601 and has the effect of firing this tube, following which the control grid of this tube loses control in the usual manner. When the tube 601 is fired, a large positive voltage of approximately 130 volts is produced across the cathode resistor 610 of this tube, and this voltage is impressed upon the timing condenser 611 through the series resistor 612.

Concurrently with firing of the start tube 601, the tens register pulser tube 701 fires so as to produce a positive pulse which is impressed upon the conductor 230 and is supplied to the control grid of the discharge tube 700 so as to fire this tube. Thus, during the arrival of the successive impulses of the first digit at the connector **12*b*, the discharge tube 700 is controlled by the tens register pulser 701 to prevent the condenser 611 from charging to a level at which firing of the discharge tube 602 can occur. In the illustrated call, the first digit comprises three impulses so that the tube 700 functions to discharge the condenser 611 three times. However, at the end of of the third impulse and during the inter-digit pause between the first and second digits, the condenser 611 is permitted to charge to a sufficiently positive value that the timing tube 602 is fired. Hence, at the end of the first digit the tubes 601 and 602** are both ionized and remain conductive for the duration of the call.

When the timing tube 602 is fired in the manner just explained, a large positive potential is produced at the cathode of this tube which is transmitted over the conductor 234 to the series connected cathode resistors 710 and 711. The positive voltage produced across the resistor 711 has the effect of biasing the tens register pulser tube 701 against conduction so that further pulses developed by the dial impulse integrator circuit 209 during the dialing of the second and third digits at the calling substation are prevented from firing the pulser tube 701 and hence from advancing the tens digit register 211. The positive potential produced on the conductor 234 when the tube 602 fires is also coupled to the control grid of the units inverter tube 603 to condition this tube to repeat pulses to the units register pulser 214 during the dialing of the second digit at the calling substation.

During dialing of the second digit the negative control pulses produced by the dial impulse integrator circuit 209 are impressed upon the control grid of the units inverter tube 603 from the conductor 227 and are repeated as positive pulses at the anode of this tube. The resulting positive pulses developed at the anode of the tube 603 are impressed upon the control grid of the units sequence start tube 604 and the control grid of the units register pulser tube 704 over a path which includes the conductor 238.

The units register pulser 214 functions in a manner identical to that described above in connection with the tens register pulser 210 to produce large register drive pulses of uniform amplitude and duration across the common cathode resistor 830 in the units digit register 215 and these pulses drive the register 215 to the proper setting. The manner in which the units digit register 215 responds to the drive pulses produced across the resistor 830 by the pulser tube 705 is exactly the same as the above-described response of the tens digit register 211 to the drive pulses supplied thereto by the tens register pulser 702. From this explanation it will be understood that the first positive register drive pulse, representative of the first dial impulse of the second digit, which is developed across the resistor 830 has the effect of extinguishing the priming tube 810 and at the end of this pulse the first counting tube 811A is fired. It will also be understood that as successive pulses, each representative of another dial impulse, are developed across the resistor 830, the counting tubes of the units digit register 215 are ionized in sequence at the rate of one counting tube for each dial impulse. In the particular call under consideration wherein the numerical value of the second tube is "2," the second counting tube 812 remains conductive at the end of the second digit. With this tube conducting, the rectifier **812*a* is rendered fully conductive and positive units pulses appearing on the conductor 31*b* are transmitted through the condenser 831, the rectifier 812*a*, and the condenser 832 to the common output bus 245 of the units digit register 215. The selected units pulses are transmitted over the conductor 245 to the connector pulse forming circuit 217**.

In accordance with the present invention the units digit register 215 is provided with facilities for recycling this register after the tenth impulse counting tube 1020 thereof has been fired. Accordingly, the anode of the tube 1020 is coupled through the condenser 835 to the control grid of an auxiliary impulse counting tube 811B, the anode and cathode of which are connected in parallel with the first impulse counting tube 811A. Accordingly, as successive register drive pulses are produced across the resistor 830 by the trunk hunting facilities of the connector, in a manner to be described in more detail hereinafter, and the tenth impulse counting tube 1020 is extinguished, the auxiliary counting tube 811B will be fired so as to provide an endless or re-entrant impulse counting chain in the units digit register 215. Also, in accordance with the present invention, the positive pulse produced at the anode of the last counting tube 1020 in the units digit register 215 is coupled over the conductor 286 to the tens register advancer 280 to fire the tens register advancer tube 702 and thereby advance the setting of the tens digit register 211 one step, as will be described in more detail hereinafter in connection with the trunk hunting facilities of the present invention.

Referring now more particularly to the units sequence timing circuit 216, this circuit operates in the same manner as the tens sequence timing circuit 212 and when the second digit ends, the timing condenser 615 thereof is charged positively by an amount sufficient to cause the timing tube 605 to fire. When the tube 605 is fired the resultant current flow through the cathode resistor 716 thereof has the effect of raising the cathode potential of the units register pulser tube 704 to a value sufficient to block this tube from responding to further control pulses produced during dialing of the third digit. Furthermore, the positive potential produced at the cathode of the tube 605 raises the control grid potential of the party inverter tube 606 to condition this tube to transmit pulses therethrough during the dialing of the third digit at the calling substation.

In accordance with the present invention the firing of the units sequence timing tube 705 at the end of the second digit is employed to initiate the busy test operation and, in the event that the called line is marked as a private branch exchange trunk, the trunk hunting facilities of the connector are also initiated at the end of the second digit. Accordingly, the positive potential produced at the cathode of the units sequence timing tube 605 is transmitted over the conductor 235 to the trunk hunting control circuit 283 wherein this potential is employed as an enabling bias for the third control grid of the trunk hunting control tube 1300. The potential on the conductor 235 is also employed as an enabling bias for the control grid of the tens register advancer tube 702. Also, the potential on the conductor 235 is employed as an enabling bias for the busy test tube 1501 to permit busy test operation to be performed, and also to the busy lock circuit 219 to initiate the busy test interval.

Referring now more particularly to the connector pulse forming circuit 217, it will be recalled that this circuit is provided to combine the selected tens pulses gated by the tens digit register 211 with one of the units pulses gated by the units digit register 215 to form a single connector pulse which occurs in the time position of each pulse frame assigned to the called line. These relatively wide connector pulses are utilized to control the busy gate circuit 220, the called line in gate circuit 223, the called line reconstructor circuit 222, and the called line out gate circuit 224 in the performance of the functions respectively assigned to these circuits. In addition, the connector pulses are employed to select that one of the commutator drive pulses **96*a* which occurs during the pulse time position assigned to the called line, and the selected commutator drive pulses, which may be called busy test pulses, are supplied to the busy test circuit 218** to perform the busy test operation in this circuit.

Operation of the connector pulse forming circuit 217 may best be explained by reference to the illustrated call originating at the substation A and intended for the party line substation B′. In this case, and as explained above, the tens digit register 211 is controlled by the first digit dialed at the calling substation to select the third tens pulse 74*a* of each pulse frame and to gate this pulse over the conductor 232 to the connector pulse forming circuit 217. The unit digit register 215 is controlled by the second digit dialed at the calling substation to select the second, twelfth, twenty-second, etc., units pulses 63*a*, 63*b*, 63*c*, etc., of each pulse frame and to transmit these pulses over the conductor 245 to the connector pulse forming circuit 217. The tens pulses appearing on the conductor 232 are impressed upon the suppressor grid of a pentode type connector pulse forming tube 1602 and the units pulses appearing on the conductor 245 are impressed upon the first control grid of this tube. Both the suppressor grid and the first control grid of the tube 1602 are biased against conduction by means of the bias network including the resistors 1620 and 1621 so that normally the tube 1602 is non-conductive. However, upon coincidence of the tens pulse impressed upon the suppressor grid of the tube 1602 with one of the units pulses impressed upon the control grid of this tube, a negative one microsecond connector pulse appears at the anode of the tube 1602. This connector pulse is coupled through the condenser 1622 and the rectifier 1623 to the first control grid of the connector pulse inverter tube 1600, which is of the pentode type. The rectifier 1623 operates to remove base line hash from the negative connector pulse produced at the anode of the tube 1602 and this pulse is sufficiently large to drive the inverter tube 1600 beyond cutoff thereby slipping off the top portion thereof. As a result, a positive connector pulse is produced at the anode of the inverter tube 1600 which is free from base line hash and is flat-topped.

In order to improve the wave form of the positive connector pulse produced at the anode of the tube 1600, a condenser 1625 is connected from the anode of this tube to the first control grid thereof to provide a small amount of negative feedback, and a peaking coil 1626 is connected in the anode circuit of the tube 1600 to improve the high frequency response thereof. Since the inverter tube 1600 has a substantial gain, a large positive rectangular connector pulse is produced at the anode of the tube 1600, is coupled through the condenser 1520 to the control grid of the cathode follower output tube 1503, and is repeated across the cathode resistor 1521 of this tube. The connector pulses produced across the resistor 1521 are supplied over the conductor 239 to the control grid of the peaker tube 1402 in the called line reconstructor circuit 222, the control grid of the gate tube 1404 in the called line in gate circuit 223, and the third control grid of the trunk hunting tube 1300 in the trunk hunting control circuit 283. The connector pulses are also transmitted over the conductor 239*b* and through the coupling condenser 1522 to the control grid of the busy gate tube 1502.

In order to provide relatively narrow pulses appearing in the time position assigned to the called line which may be used to perform the busy test operation in the busy test circuit 218, there is provided a busy test pulse forming tube 1601 which is of the double triode type. The connector drive pulses 96*a* appearing on the conductor 35 are coupled to the control grid of the right-hand triode section of the tube 1601 through the coupling condenser 1630 and are repeated as positive pulses across the cathode resistor 1631 which is common to both of the triode sections of the tube 1601. The relatively wide connector pulses produced at the anode of the tube 1600 also appear as negative pulses of smaller amplitude across the cathode resistor 1632 of the tube 1600 and these negative pulses are coupled through the condenser 1633 to the series connected resistors 1634 and 1631. The resistor 1634 preferably has a value of one megohm, whereas the cathode resistor 1531 preferably has a value of 120 ohms so that substantially the full amplitude of the negative connector pulses appears across the grid resistor 1634. The values of the resistors 1631, 1632, and 1634, and the condenser 1633, are chosen such that the amplitude of the connector pulses produced across the resistor 1634 is sufficient to bias the control grid of the left-hand section of the tube 1601 to the midpoint on its operating characteristic. The commutator drive pulses produced across the common cathode resistor 1631 operate to drive the cathode of the left-hand section of the tube 1601 partially toward cutoff, and at the instant when the connector pulse and one of the commutator drive pulses coincide, the left-hand section of the tube 1601 is driven completely to cutoff. Accordingly, the left-hand triode section of the tube 1601 arithmetically adds the connector pulse signal and the commutator drive pulse signal so that the wave form at the anode of the left-hand section of the tube 1601 consists of positive commutator drive pulses, one of which is superimposed upon a positive connector pulse appearing in the time position assigned to the called line. This wave form is transmitted over the conductor 239*a* to the busy test circuit 218 wherein the single commutator drive pulse which is superimposed upon the connector pulse is selected and is employed to perform the busy test operation in a manner described in more detail in connection with the busy test circuit 218.

Referring now more particularly to the busy test circuit 218, this circuit performs the function of comparing the time position of the busy test pulses developed by the connector pulse forming circuit 217 with the time positions of busy pulses which may be present on the busy pulse in conductor 52*b* to determine whether or not the called line is idle or busy. In the event the called line, i.e., the line 32, is idle, coincidence is lacking between the time position 63*c* of the busy test pulses produced by the circuit 217 and the time position occupied by any of the busy pulses present on the busy pulse in conductor 52*b*. In such case the circuit 218 functions to prevent the busy lock circuit 219 from operating and also to condition the ringback tone gate tube 1607 to transmit therethrough an interrupted ringback tone signal which is selected by the party digit register 265 and which is employed to initiate and control the operation of the ringing control circuit provided in the line circuit terminating the called line in accordance with the party line ringing signal supplied thereto.

On the other hand, if the busy test pulses developed in the connector pulse forming circuit 217 coincide in time position with busy pulses present on the busy pulse in conductor 52*b*, an indication is provided that the called line is busy. If the called line is marked as a private branch exchange trunk, the trunk hunting operation in the connector 12*b* is then initiated and the setting of the units digit register 215, and, if necessary, the setting of the tens digit register 211, is driven either to the time position of an idle line within the called line trunk group, or in the alternative is driven to the last line within the called line trunk group. In the event that all of the lines in the called line trunk group are busy, including the last line of this group, the busy test circuit 218 does not operate during the entire trunk hunting operation but instead permits the busy lock circuit 219 to operate after a predetermined busy test interval and lock the connector 12*b* in its line busy setting.

In considering the operation of the busy test circuit 218, it will be noted that busy pulses which are developed on the busy pulse out conductor 52*a* by each of the busy finders and connectors of the system, are amplified in the busy pulse driver channel of the link coupling circuits 24 and are impressed upon the control grid of the busy test inverter tube 1505 over a path which includes the conductor **52*b*. The tube 1505 is of the pentode type and provides relatively high gain for the busy pulses impressed upon the control grid thereof so that these pulses are amplified and inverted in the tube 1505 and appear as relatively large negative pulses at the anode thereof. The amplified busy pulses appearing at the anode of the tube 1505 are coupled through the condenser 1525 to the shield grid of the busy test tube 1501. Normally, the shield grid of the tube 1501 is biased negatively by means of the bleeder network including the resistors 1526 and 1527. However, at the end of the second digit, the units sequence timing tube 605 is fired and a positive potential is applied to the conductor 235. This positive potential is impressed upon the biasing network including the resistors 1526 and 1527 so that the shield grid potential of the tube 1501 is reduced substantially to zero after the second digit has been dialed, and the busy pulses impressed upon the shield grid of the tube 1501** serve to drive this grid negative with respect to the cathode potential thereof.

The relatively narrow busy test pulse wave form produced at the anode of the tube 1601 in the connector pulse forming circuit 217 is transmitted over the conductor **239*a* and through the coupling condenser 1529 to the first control grid of the busy test tube 1501. Normally, this grid is biased to a predetermined negative potential by a voltage divider circuit comprising the resistors 1530, 1531, and 1532 which are bridged between the negative terminal of the bias potential source and the +B switch conductor 12*c*. This negative bias potential serves to prevent the busy test tube from firing when the potential on the shield grid of this tube is reduced to zero through ionization of the timing tube 605. In addition, the negative bias potential on the control grid of the busy test tube 1501 is sufficiently large to permit only that one of the commutator drive pulses 96*a* which is superimposed upon a connector pulse in the tube 1601 to drive this grid positive relative to the tube cathode. Accordingly, if no busy pulse is present on the shield grid of the busy test tube 1501 coincidentally with the commutator drive pulse which is superimposed upon the connector pulse, the busy test tube 1501 fires to indicate the idle condition of the called line. However, if busy pulses are delivered to the shield grid of the tube 1501 to drive this grid negative coincidentally with excitation of the tube control grid with a busy test pulse, the tube 1501 is not fired and the busy condition of the selected called line is indicated. In this connection it will be understood that operation of the busy test circuit 218 is substantially improved by providing a relatively narrow busy test pulse on the first control grid of the tube 1501** and relatively wide busy pulses which are impressed upon the shield grid of this tube. This is readily apparent when it is realized that the busy test pulses appearing in the time position assigned to the called line are relatively narrow and are centered within the time position of the called line so that these pulses are completely straddled by the relatively wide busy pulses, and in the event that the called line is busy, the busy test tube is positively prevented from firing.

Referring now more particularly to the trunk hunting control circuit 283, it will be recalled that this circuit is provided for the purpose of initiating the trunk hunting operation in the connector **12*b* in the event that the called line tests busy and is also a member of one of the trunk groups as defined by the trunk marking pulses produced by the trunk marking pulse generator 56 in the common equipment 17. Assuming that the called line 32 is busy, it will be recalled that in the illustrated trunking arrangement the line 32 is a member of the trunk group including the lines 32–39, inclusive, 30, 41, and 42. Accordingly, when the line 32 is called and is found busy, the connector pulses which are impressed upon the conductor 239 by the connector pulse forming circuit 217 and are coupled through the condenser 1330 and the resistor 1331 to the third control grid of the trunk hunting control tube 1300, appear coincidentally with busy pulses which are transmitted from the link coupling circuits 24 over the conductor 52*b* and through the condenser 1332 to the second control grid of the tube 1300. Furthermore, the connector pulses impressed upon the conductor 239 also appear coincidentally with trunk marking pulses which are developed in the trunk marking pulse generator 56 in the common equipment 17 and which are transmitted over the conductor 56*a* and through the coupling condenser 1333 to the first control grid of the trunk hunting control tube 1300**.

The trunk hunting control tube 1300 functions to compare the above-described connector pulses, busy pulses, and trunk marking pulses, and if all these pulses occur coincidentally, the trunk hunting control tube conducts and anode current flows through the anode resistor 1334 thereof. Normally the three control grids of the trunk hunting control tube 1300 are biased beyond cutoff by means of the voltage divider network including the resistors 1335 and 1336 which are connected between the conductor 235 and the negative terminal of the bias potential source. However, after the end of the second digit the units sequence timing tube 605 fires so as to produce a relatively large positive potential on the conductor 235, thereby decreasing the negative bias on the three control grids of the trunk hunting control tube 1300. However, it will be noted that this bias potential increase cannot become more positive than −10 volts due to the fact that a rectifier 1337 is connected from the junction point of the resistors 1335 and 1336 to a −10 volt bias source. Accordingly, when a positive potential is produced on the conductor 235, the bias potential on the control grids of the tube 1300 is raised to −10 volts, at which point the rectifier 1337 conducts and holds the bias potential constant.

The anode circuit of the trunk hunting control tube 1300 includes a relatively small condenser 1338 which is connected from the anode of the tube 1300 to ground so that the anode circuit of the tube 1300 comprises an integration network including the anode resistor 1334, which preferably has a value of 10 megohms, and the condenser 1338 which preferably has a value of 50 mmfd. and a large saw-tooth wave form is generated across the condenser 1338 which has a repetition rate equal to the pulse frame rate of the system, i.e., 10 kilocycles per second. This saw-tooth wave form is coupled through a high pass filter including the series condensers 1339 and 1340 and the shunt resistors 1341 and 1342 to a shunt-type rectifier consisting of the diode section **600*a* of the tens inverter tube 600, the cathode of this diode section being connected to ground and the anode of this diode section being connected to the ungrounded terminal of the resistor 1342. The negative voltage developed by the shunt rectifier 600*a* is then passed through a low pass filter including the series resistor 1343 and the shunt condenser 1344 to remove the 10 kilocycle component of the saw-tooth wave form and the negative filtered saw-tooth wave form is then impressed upon the first control grid of the trunk hunting inverter tube 1301. Immediately this negative wave form is impressed upon the control grid of the tube 1301, this tube is cut off and a positively increasing voltage is produced across the anode resistor 1345 of the tube 1301. The positive pulse thus produced at the anode of the tube 1301 is transmitted over the conductor 288 and through the resistor 720 to the control grid of the units register advancer tube 705. Thus, the positive potential produced at the anode of the tube 1301 functions as an enabling bias for the units register advancer tube 705**.

Referring now more particularly to the units register advancer circuit 281, it will be recalled that this circuit is provided for the purpose of advancing the units digit register 215 under the control of the trunk hunting drive pulses produced by the trunk hunting drive pulse generator 55 when a trunk hunting operation is to be performed in the connector. More specifically, the units register advancer tube comprises a triggered cold cathode gas tube oscillator of the relaxation type which is substantially identical with the units register pulser 214, and functions to provide across the common cathode resistor 830 in the units register 215 positive register drive pulses at the rate of one register drive pulse for each trunk hunting drive pulse transmitted to the control grid thereof over the conductor 55*a* and through the coupling condenser 721. It will thus be understood that the resistor 830 functions as a common output resistor for both the units register pulser 214 and the units register advancer 281 as well as functioning as a common cathode drive resistor for the units digit register 215.

Normally, the control grid of the units register advancer tube 705 is biased so that the tube 705 is prevented from firing and hence this tube does not normally respond to the trunk hunting drive pulses appearing on the conductor 55*a*. However, when the trunk hunting control circuit 283 produces a positive enabling bias potential on the conductor 288 in the manner described above, the control grid of the tube 705 is made sufficiently positive to permit this tube to be fired by the trunk hunting drive pulses coupled thereto through the condenser 721. As a result, the tube 705 is fired by each of the trunk hunting drive pulses so as to produce corresponding register drive pulses across the resistor 830 of uniform amplitude and duration. In this connection it will be understood that the cathode circuit of the tube 705 is so designed that the gas tube 705 is extinguished a short interval after it is fired by a trunk hunting drive pulse so that the tube 705 may be successively fired at the trunk hunting drive pulse rate.

The register drive pulses produced across the resistor 830 by the units register advancer 281 are substantially identical to the register drive pulses appearing across the resistor when the units register pulser 241 fires in response to the control pulses produced during dialing of the second digit. Accordingly, the units digit register 215 is advanced one impulse counting stage for each of the trunk hunting register pulses produced across the resistor 830. When the first trunk hunting register pulse is produced across the resistor 830 in response to firing of the tube 705, the units impulse counting tube 812, which had previously remained ionized after the end of the second digit, is extinguished, and after this first trunk hunting register drive pulse ends the next units impulse counting tube 913 is fired.

When the tube 913 fires, the gating rectifier 913*a* in the anode circuit thereof is rendered fully conductive so as to gate the third, thirteenth, tweny-third, etc., units pulses 64*a*, 64*b*, 64*c*, etc., to the common output conductor 245 and over this conductor to the connector pulse forming circuit 217. The connector pulse forming circuit 217 responds by advancing the setting of the connector pulses developed thereby by one time position so that these pulses now appear in the time position 64*c*, i.e., the time position assigned to the line 33. If the line 33 is also busy, the new time position 64*c* of the connector pulses will again occur coincidentally with busy pulses appearing on the conductor 52*b* and trunk marking pulses appearing on the conductor 56*a* so that the trunk hunting control tube continues to conduct and the positive enabling bias continues to appear on the conductor 288. As a result, the units register advancer tube is permitted to respond to another trunk hunting drive pulse and produces a second trunk hunting register pulse across the resistor 830 which has the effect of extinguishing the impulse counting tube 913 and of ionizing the fourth impulse counting tube 914.

When the tube 914 is conducting, the units pulses appearing on the conductor 31*d* are gated through the rectifier 914*a* and are transmitted over the conductor 245 to the connector pulse forming circuit 217 so that the time position of the connector pulses is again advanced by one time position, i.e., to the time position 65*c* assigned to the line 34. If the line 34 is also busy, the above-described coincidence between the connector pulses, busy pulses, and trunk marking pulses continues, and the units register advancer operates under the control of the trunk hunting drive pulses to continue to advance the setting of the units digit register by successive units pulse time positions.

If the setting of the units digit register 215 is advanced to the tenth impulse counting stage and no idle line has been found, the units register advancer 281 again responds to a trunk hunting drive pulse and produces a corresponding trunk hunting register drive pulse across the resistor 830. When this pulse is produced across the resistor 830, the tube 1020 is extinguished and at the end of this register drive pulse the positive pulse appearing at the anode of the last impulse counting tube 1020 is coupled through the condenser 835 to the auxiliary impulse counting tube 811B, thereby firing this tube and recycling the units digit register.

Since the units pulses are produced at a 100 kilocycle rate, i.e., one units pulse for each tens pulse period, it is necessary to advance the setting of the tens digit register by one impulse counting stage simultaneously with the recycling of the units digit register. Accordingly, the positive recycling pulse produced at the anode of the last units impulse counting tube 1020 is also transmitted over the conductor 286 and through the coupling condenser 725 to the control grid of the tens register advancer tube 702. The tens register advancer tube is substantially identical to the units register advancer tube 705 and responds to the above-described units recycling pulses by producing a corresponding tens register drive pulse across the common resistor 826. In this connection it is noted that the tens register advancer tube 702 is normally biased to prevent this tube from firing to avoid possible false firing of the tens register advancer tube 702 during dialing of the first two digits. However, when the units sequence timing tube 605 fires at the end of the second digit, the positive potential produced on the conductor 235 is supplied to the control grid of the tens register advancer tube 702 as an enabling bias to permit this tube to respond thereafter to the above-described recycling pulses.

When the units digit register 215 is recycled in the manner described above, the tens digit register is advanced by one tens pulse period so that the impulse counting tube 903 is extinguished and the following impulse counting tube 904 is fired. When the tube 904 is fired, the rectifier 904*a* in the anode circuit thereof is rendered fully conductive so that tens pulses appearing on the conductor 32*d* are gated to the common output conductor 232 and the connector pulse forming circuit 217 again responds to the above-described change in the settings of the registers 211 and 215 by advancing the time position of the connector pulses from the time position 71*c* to the time position 62*d*, i.e., the time position assigned to the line 41.

If the line 41 is also busy the trunk hunting facilities of the connector again operate in the manner described above to shift the time position of the connector pulses by one time position to the time position 63*d*, i.e., the time position assigned to the line 42. However, since the line 42 constitutes the last line in the called line trunk group, the line 42 is not marked by a trunk marking pulse. Accordingly, when the connector pulses are shifted into the time position 63*d*, there is no coincidence between these pulses and trunk marking pulses produced on the conductor 56*a* so that the trunk hunting control tube 1300 is rendered non-conductive irrespective of the appearance of busy pulses in the time position 63*d* on the conductor 52b. Thus, the trunk hunting control circuit 283 functions to reduce the potential on the conductor 288 when the last line in the trunk group is reached irrespective of the idle or busy condition of this line. When the potential on the conductor 288 is decreased in the manner described above, the units register advancer tube is blocked from responding to further trunk hunting drive pulses and the setting of the units and tens digit registers remains unchanged.

In the above described call wherein the trunk hunting facilities operate to step the units and tens digit registers to the successive time positions assigned to the lines 32 to 42, inclusive, it has been assumed that the tens digit register 211 is advanced one tens pulse period substantially simultaneously with recycling of the units digit register 215. However, due to circuit delays, the units digit register 215 may be recycled a fraction of a second before the tens digit register is advanced to the next tens pulse period so that momentarily connector pulses in the time position assigned to the line 31 are produced and are impressed upon the busy tube 1501. If the line 31 is idle it is possible that the busy test tube 1501 will fire and cut through will occur. However, by this time the tens digit register has been stepped to the next tens pulse period so that when cut through occurs the connector pulses occur in the time position assigned to the line 41. Accordingly, even though line 41 may be busy, cut through may occur in this time position thus resulting in a double connection. However, there is provided the resistor 1460 which is connected from the plate of the trunk hunting control inverter tube 1301 to the cathode of the busy test tube 1501 so that the trunk hunting control potential produced on the the conductor 288 is impressed upon the cathode of the busy test tube 1501. With this arrangement, during trunk hunting the positive potential produced on the conductor 288 raises the cathode potential of the busy test tube 1501 so that this tube is prevented from firing even though the above described condition occurs. However, when trunk hunting ceases, i.e., when an idle line is found within the called line trunk group, the potential on the conductor 288 is reduced so that the busy test tube 1501 is permitted to fire in the normal manner. The value of the resistor 1460 is so chosen that firing of the busy test tube 1501 will not increase the plate potential of the inverter tube 1501 to any substantial degree and hence the grid return bias of the units register advancer tube 705 is not increased positively by an amount sufficient to permit firing of this tube in response to trunk hunting drive pulses. In this connection, it will be understood that the circuit delay in firing the tens register 211 is much too short to effect the trunk hunting control tube 1500 due to the integration circuit in the anode circuit of this tube.

In order to permit trunk hunting from the last line of the system, i.e., the line "00" to the first line of the system, i.e., the line "11," there is provided in the tens digit register 211 facilities for recycling this register. Thus, if the lines 05, 06, 07, 08, 09, or 00 in the trunking arrangement shown in Fig. 33 are called and test busy, the units digit register 215 will be recycled in the manner described above and the recycling pulse produced at the anode of the units impulse counting tube 1020 is supplied to the tens register advancer tube 702 to fire this tube. When the tube 702 is thus fired, the last tens impulse counting tube 1010 is extinguished and after the end of this pulse a positive recycling pulse is produced at the anode of the tube 1010 and is coupled through the condenser 827 to the control grid of the auxiliary counting tube 801B to fire this tube. Accordingly, the setting of the tens digit register 211 is changed from the tenth tens pulse period to the first tens pulse period and trunk hunting through the lines 11–15, inclusive, may then proceed in the manner described above.

If the above-described trunk hunting operation is performed through the entire called line trunk group and the last line thereof, i.e., line 42 is busy, or, in the alternative, if the called line is a private line, i.e., not a member of a trunk group, and is busy, the busy lock circuit 219 functions to lock the connector in its line busy setting, thus preventing further progress of the call. Thus, referring to the busy lock circuit 219, it will be recalled that at the end of the second digit a positive potential is produced on the conductor 235 which is employed in the busy lock circuit to initiate a busy test interval. More specifically, the potential on the conductor 235 is applied to a time delay circuit including the series resistor 1535 and the shunt condenser 1536 so as to charge the condenser 1536 positively at a relatively slow rate. At the end of the busy test interval the voltage across the condenser 1536 is increased to a sufficiently large positive value to fire the busy lock tube 1504. When the tube 1504 fires there is produced a voltage drop through the anode resistor 1532 thereof so that the potential on the control grid of the busy test tube 1501 is reduced beyond cutoff and the busy test circuit 218 is positively prevented from responding to further busy test pulses impressed on this control grid from the conductor 239a so that the progress of the call is halted. The potential decrease produced at the anode of the busy lock tube 1504 is also inverted through the tube 1509 and applied as an enabling bias to the control grid of the busy tone gate tube 1510 thereby permitting this tube to transmit therethrough the busy tone signal appearing on the conductor 46. The busy tone signal which is transmitted through the tube 1510 is coupled to the conductor 244 and is impressed upon the third control grid of the calling line out gate tube 1305. From the calling line out gate circuit the busy tone signal is forwarded through the distributor 15 and the line circuit 10 to the calling line for reproduction by the receiver at the calling substation. Reproduction of this signal serves to inform the calling subscriber that the called line is busy and that the connection should be released.

It will be understood that the busy test interval is related to the trunk hunting drive pulse rate to permit the above-described trunk hunting facilities to hunt through a relatively large number of lines before the end of the busy test interval. Thus, if the busy test interval is one-half second and the trunk hunting drive pulse rate is one hundred pulses per second, the trunk hunting facilities are permitted to step the settings of the units and tens digit registers through the time positions of fifty consecutive lines before the end of the busy test interval. Obviously this busy test interval may be increased sufficiently to permit the trunk hunting operation to be performed through the entire one hundred lines of the system although in actual practice such an arrangement is not normally required.

Again tracing the above-described call originating at the substation A and intended for the substation B' associated with the called line 32, if the called line 32 tests idle the busy test tube 1501 is rendered conductive to produce current flow over a path which includes the resistor 1540, the crystal rectifier 1541, and the resistor 1542 in the proper direction to drive the cathode of the busy lock tube 1504 highly positive. As a consequence, the subsequent rise in positive potential on the control grid of the tube 1504 resulting from charging of the condenser 1536 is prevented from firing the tube 1504. It will be understood, therefore, that the busy lock tube 1504 is only rendered conductive to perform the functions just described in the event that the lines in the called line trunk group are tested and found busy. It will also be understood that the rectifier 1541 is so poled as to prevent the voltage developed across the cathode resistor 1542 when the tube 1504 fires from being applied to the connector cut-through conductor 251a to cause false cut-through operation of the connector.

In the event that the called line tests idle and the busy test tube 1501 fires, current conduction through this tube is thereafter independent of the potentials impressed upon the two grids thereof so that the tube 1501 will continue to conduct for the duration of the call and until the connector 12*b* is released. When the tube 1501 fires, current flows through the resistor 1540, the rectifier 1541, and the resistor 1542 so as to provide a large positive potential on the conductor 251*a*. The resistor 1540 and the shunt condenser 1545 constitute a filter network which removes noise and other extraneous impulses from the conductor 251*a* and thus prevents transmission of such signals to talking circuits of the connector. The potential produced on the conductor 251*a* is then coupled through a second hash filter including the series resistor 1640 and the shunt condenser 1641 and is impressed upon the main cut-through conductor 251. It will thus be understood that if the called line 32 is idle, or, in the alternative, if any one of the other lines in the called line trunk group is idle, the busy test tube 1501 responds to the busy test pulses impressed upon the control grid thereof from the connector pulse forming circuit 217 by firing to develop a positive control potential on the cut-through conductors 251, 251*a* and 289. The positive potential produced on the conductor 251*a* is coupled through the resistor 1546 and transmitted over the conductor 289 to the cathode of the units register advancer tube 705 thereby to produce a relatively large positive voltage across the cathode resistor 730 thereof. The positive voltage thus produced across the resistor 730 upon cut-through serves to bias the units register advancer tube 705 against further response to trunk hunting drive pulses and hence the trunk hunting operation of the connector is positively terminated. It is thus evident that when the trunk hunting operation has proceeded to an idle line in the called line trunk group, the busy test tube 1501 fires and the units register advancer tube 705 is immediately biased beyond cutoff to prevent further advance in the settings of the units digit register 215 and the tens digit register 211.

In order to stabilize certain important potentials in the busy test circuit 218 there is provided a double diode clamping tube 1609, the right-hand section of which is connected to the conductor 251*a* and the left-hand section of which is connected to the conductor 235. These diode clamping tubes render the busy test circuit insensitive to power supply variations, temperature drift, and resistor tolerances as described in detail in my copending application, Serial No. 257,712 referred to above.

In considering the details of the busy gate circuit 220 it is pointed out that this circuit is identical to the corresponding circuit described in my copending application, Serial No. 257,712 and reference may be had to this specification for a complete and detailed description thereof. However, for the purposes of the present invention it may be stated that connector pulses are supplied over the conductor 239*b* and through the condenser 1522 to the control grid of the gate tube 1502 and are repeated through this tube to the busy pulse out conductor 52*a* when cut-through potential is supplied to the conductor 251. As a result, the called line is marked as busy to all of the finders thereof preventing an idle finder from associating itself with the called line. Furthermore, any other connector of the system, as for example the connector 13*b*, which may later be directed to route a call to the called line selected by the connector 12*b*, responds to the connector pulses gated by the tube 1502 to the busy pulse out conductor 52*a* by indicating that the called line is busy.

Referring now more particularly to the called line out gate circuit 224, this circuit is of the same general type as the calling line out gate circuit 226 described heretofore and is provided to resample the signal voltage stored in the calling line reconstructor circuit 208 in the time position assigned to the selected called line and to release connector signal pulses modulated in accordance with the sampled signal voltage to the distributor 15 for distribution to the line circuit terminating the called line. To this end commutator drive pulses are positively applied to the first control grid of the gate tube 1403 and connector pulses appearing on the conductor 239 are positively applied to the second control grid of this tube. The reconstructed signal voltage produced by the calling line reconstructor circuit 208, which is filtered to remove the abrupt steps therein produced during charging of the condenser 1410 in this circuit, is also applied over the conductor 256 and through the resistor 1420 to the third control grid of the gate tube 1403. Accordingly, when the connector pulses coincide with a particular one of the commutator drive pulses 96*a* appearing on the conductor 35, the gate tube 1403 is rendered conductive to produce in the anode circuit thereof a very narrow negative pulse which is amplitude modulated in accordance with the reconstructed signals impressed upon the third control grid of the tube 1403. It is also pointed out that the conductor 239 is connected through the crystal rectifier 1550 and the resistor 1551 to the cut-through conductor 251 so that until the busy test tube fires and a positive potential is applied to the cut-through conductor 251, the second control grid of the gate tube 1403 is highly negative and prevents conduction of this tube.

Connector signal pulses occurring in the time position assigned to the called line and modulated in accordance with the signal voltage reconstructed and stored (for one pulse frame) by the calling line reconstructor circuit 208 are transmitted over the conductor 51 to the distributor 15 for signal distribution to the line circuit terminating the called line 32. However, it will be understood from the foregoing general description of the system that until ringing of the called party line substation is effected under control of the party line ringing facilities of the connector, the above-described connector signal pulses supplied to the distributor 15 in the pulse time position 63*c* are ineffective to establish talking communication with the called line.

While the connector 12*b* of the present invention functions immediately after dialing of the second digit to perform the above-described busy test operation and trunk hunting operation, it will be recalled that the connector 12*b* also responds to the dialing of a third digit by selecting a particular party line ringing signal assigned to the called line substation. In this connection it will be understood that the private branch exchange trunks, which would not have a plurality of substations associated therewith, and other private lines of the system would be assigned a nominal third digit of "1" for uniform directory numbering.

Referring now to the operation of the party line selection facilities of the connector 12*b* during dialing of the third digit, the negative control pulses produced by the dial impulse integrator circuit 209 are impressed upon the control grid of the party inverter tube 606 from the conductor 227. Since the bias voltage on this tube is reduced at the end of the second digit by firing of the units sequence timing tube 605, the inverter tube 606 is operative to repeat therethrough pulses developed during dialing of the third digit. The positive control pulses produced at the anode of the tube 606 are then impressed upon the control grid of the party sequence timing tube 607 over the conductor 237 and are also impressed upon the control grid of the party register pulser 263.

Operation of the party register pulser 263 to produce uniform amplitude register drive pulses across the common cathode resistor 840 of the party digit register 265 corresponding to the impulses of the third digit is the same as the operation of the tens and units register pulsers 210 and 214 described above. More specifically, the positive control pulses coupled through the condenser 750 to the control grid of the tube 707 trigger this tube so that it fires upon the occurrence of each pulse, and the resultant current flow through the series connected condenser 841 and resistor 840 is effective to produce pulses of uniform amplitude and duration across the resistor 840 which are suitable for driving the impulse counting tubes of the party digit register 265.

In considering the party digit register 265, it is pointed out that this circuit is identical in many respects to the corresponding circuit described in detail in my copending application, Serial No. 257,712 referred to above. However, in accordance with the present invention the party digit registers 265 perform certain additional functions in connection with the conversation timing operation as will be described in more detail hereinafter. For the purposes of the present invention it may be stated that the party digit register 265 performs the general function of selecting one of the ten interrupted ringback tone signals shown in Figs. 32 (13)–(22) and of transmitting the selected interrupted ringback tone signal, which corresponds to the particular party line ringing signal assigned to the called party line substation, i.e., the substation B′, to the ringback tone gate tube 1607 in the net work 225. Each of the impulse counting tubes 821–823, inclusive, 924–928, inclusive, 1029, and 1030, in the party digit register 265, individually controls one half of one of the ten gate tubes 1507 and 1603–1606, inclusive. Thus, the anode of the first impulse counting tube 821 is connected through the resistor **821*a* to the cathode of the left-hand diode section of the tone gate tube 1507. The anode of the second impulse counting tube 822 is connected through the resistor 822*a* to the cathode of the right-hand section of the tube 1507. In a similar manner, the remaining impulse counting tubes of the party digit register 265 are connected to the cathodes of the diode sections of the gate tubes 1603–1606**, inclusive.

From the foregoing explanation of the operation of the tens and units digit registers 211 and 215, it will be understood that the first positive register drive pulse developed across the resistor 840 in the party digit register 265, which is representative of the first dial impulse of the third digit, has the effect of extinguishing the priming tube 820 and at the end of this pulse the first counting tube 821 is fired. It will also be understood that if successive pulses which are representative of other dial impulses are developed across the resistor 840, the counting tubes of the party digit register 265 are ionized in sequence at the rate of one counting tube for each dial impulse. In the particular call under consideration, i.e., that involving the party line substation B′ at the called line 32, to which substation is assigned the party line digit of "2," the second counting tube 822 remains conductive at the end of the third digit. With this tube conducting, the polarities of the potentials respectively impressed upon the anode and cathode terminals of the right-hand diode section of the tube 1507 are such that this diode is rendered conductive and gates therethrough the interrupted ringback tone signal appearing on the conductor **48*b* and coupled to the cathode of this tube through the condenser 1507*b*. More specifically, the interrupted ringback tone signal shown in Fig. 32 (14), which consists of the two short pulses 170*a* and 171*a* of ringback tone, is gated through the right-hand section of the tube 1507 and is transmitted over the conductor 275 to the first control grid of the ringback tone gate tube 1607**.

Referring now more particularly to the party sequence timing circuit 264, it is pointed out that this circuit is substantially identical to the corresponding circuits shown in my copending application, Seral No. 257,712 referred to above. However, in the present invention the busy test and the trunk hunting operations are performed at the end of the second digit so that the party sequence timing circuit performs only the functions of blocking the party register pulser 263 against further production of pulses after the third digit is terminated, and of enabling the code start tube 1608 at the end of the third digit. More particularly, the party sequence start tube 607 is fired at the start of the third digit and the condenser 625 is prevented from firing by the discharge tube 706 until after the third digit has ended. However, when the third digit ends and transmission of pulses to the control grid of the discharge tube 706 ceases, the condenser 625 is charged sufficiently positive to fire the timing tube 608 and produce a relatively large positive potential on the conductor 242 connected to the cathode thereof. The positive potential developed on the conductor 242 is impressed upon the cathode of the party register pulser tube 707 to prevent this tube from responding to further impulses of any character which are supplied to the control grid thereof. This positive potential is also impressed upon the control grid of the code start tube 1608 as an enabling bias potential to permit this tube thereafter to respond to code start impulses appearing on the conductor 5 and coupled to the control grid of this tube through the condenser 1650.

Referring now more particularly to the operation of the code start circuit 268, it is pointed out that this circuit is generally similar to the corresponding circuit described in detail in my copending application, Serial No. 257,712 referred to above. However, in the system of the present invention the busy test operation is initiated after the end of the second digit so that cut-through can occur before the third or party line digit is completed. Since the code start tube 1608 is enabled by the cut-through conductor 251, it is necessary to prevent the code start tube 1608 from firing before the end of the party line digit. Accordingly, the control grid of the code start tube 1608 is controlled from the party sequence timing tube 608 so that the tube 1608 is supplied with an enabling bias potential over the conductor 242 at the end of the third digit. Immediately positive potential is produced on the conductor 242, the control grid of the tube 1608 is raised sufficiently positive to permit this tube to respond to the next occurring one of the code start pulses 180 (Fig. 32 (11)), which occurs at the end of the guard interval separating each of the ringing periods in the harmonic ringing cycle. As a result, the code start tube 1608 is fired by one of the code start pulses 180 and when this tube fires, a large positive potential is produced across the cathode resistor 1651 thereof. The positive potential produced across the resistor 1651 is transmitted over the conductor 241 and through the resistor 1652 to the screen grid of the ringback tone gate tube 1607, thereby enabling the tube 1607 to transmit therethrough the interrupted ringback tone signal impressed upon the control grid thereof from the party digit register 265.

Referring now more particularly to the operation of the ringback tone gate tube 1607, it will be recalled that this tube performs the function of gating the selected interrupted ringback tone signal by way of the calling line out gate circuit 226 to the calling line to inform the calling subscriber that the called line is being rung and to permit him to hear the particular code sequence which is employed. The interrupted ringback tone signal gated by the tube 1607 is also employed to control the ringing facilities at the called line so that the harmonic ringers at the substations A′ and B′ associated with the called line 32 are rung in unison during the ringing intervals 170 and 171 of the selected code #2 until the call is answered at the called substation B′. Thus, the interrupted ringback tone signal impressed upon the control grid of the tube 1607 is gated through this tube when the code start potential is applied to the screen grid thereof, and appears at the anode of the tube 1607 as the pulses **170*a* and 171*a* of ringback tone (Fig. 32 (14)). This interrupted ringback tone signal is coupled through the condenser 1560 and the resistor 1561 to the conductor 244 and is transmitted by way of the calling line out gate circuit 266 to the calling subscriber. The interrupted ringback tone signal produced at the anode of the tube 1607 is also coupled through the condenser 1562 to the rectifier 1653** wherein the ringback tone signal is rectified so as to reproduce across the condenser 1564 ringing pulses which correspond, except for polarity, to the pulses 170 and 171 shown in Fig. 32(2). These ringing pulses are transmitted over the conductor 295 and through the resistors 1430 and 1420 to the third control grid of the called line out gate tube 1403. The amplitude of the positive ringing pulses produced across the condenser 1654 is sufficiently large to render the gate tube 1403 heavily conductive for the interval of these pulses so that the tube 1403 during this interval releases connector signal pulses which are of approximately 50 percent greater amplitude than the amplitude of the normal connector signal pulses released by this tube. These large amplitude signal pulses are transmitted to the distributor 15 over the conductor 51 wherein they are detected and routed to the line circuit 16 and over the conductor 54 and control the ringing control tube 1151 so that this tube releases ringing current over the called line 32 during the intervals of the ringing pulses 170 and 171. In this connection it will be recalled that during the intervals of the pulses 170 and 171 a 66⅔ c.p.s. ringing current is multiplexed to the conductor 61*a* so that only 66⅔ c.p.s. ringing current is transmitted over the called line 32 and then only during the intervals of the ringing pulses 170 and 171 which constitute the code #2. Ringing of the substations A′ and B′ continues until the call is answered at the called party line substation B′ or until the call is terminated at the calling substation A.

When the call is answered at the called substation B′, multiplexer pulses in the time position 63*c* assigned to the called line, are impressed upon the multiplexer output conductor 50 and are transmitted to the called line in gate circuit 223. In considering the operation of the circuit 223 it is pointed out that this circuit is identical with the corresponding circuits shown in detail in my copending application, Serial No. 257,712. However, for the purpose of the present invention it may be stated that the suppressor grid of the gate tube 1404 is excited by signal bearing multiplexer pulses impressed thereon from the multiplexer output conductor 50, and the inner control grid of the tube 1404 is excited by connector pulses impressed thereon over the conductor 239. Only the signal bearing multiplexer pulses occurring in the time position assigned to the called line are gated through the tube 1404 and are inverted through the inverter tube 1405 and transmitted over the conductor 254 to the charging tube 1400 in the called line reconstructor circuit 222. All other signal modulated multiplexer pulses present on the conductor 50 are excluded from the called line reconstructor circuit 222 due to lack of coincidence between these pulses and the connector pulses impressed upon the control grid of the gate tube 1404.

Referring now more particularly to the called line reconstructor circuit 222, it is pointed out that this circuit is identical in many respects with the corresponding circuit described in detail in my copending application, Serial No. 257,712 referred to above. However, in accordance with the present invention, the output from the cathode follower tube 1302 in the called line reconstructor circuit 222 is coupled through a low pass filter before being impressed upon the calling line out gate circuit 226. More specifically, the reconstructed signal produced at the cathode of the tube 1302 is transmitted through a low pass filter network, including the series resistors 1350 and 1351 and the shunt condensers 1352 and 1353, and the output from this low pass filter is transmitted over the conductor 257, through the condenser 1354 and the resistor 1355 to the third control grid of the calling line out gate tube 1305. The potential developed at the cathode of the output tube 1302 when the called line answers, is also impressed upon the control grid of the ring trip tube over a path which includes the series resistor 1445 and the conductor 252 so that the ring trip tube 1500 is fired immediately the called line answers and multiplexer pulses are transmitted through the called line in gate circuit 223 to the called line reconstructor circuit 222.

Referring now more particularly to the ring trip circuit 221, it is again pointed out that this circuit is provided for the purpose of disabling the ringback tone gate tube 1607 when the call is answered at the called substation B′. Furthermore, in accordance with the present invention the ring trip circuit 221 is employed to initiate the conversation timing period and is also employed to provide energizing potential for the conversation timing warning tone gate tube 1506. The anode of the ring trip tube 1500 is energized from the cut-through conductor 251 after the busy test operation is performed. Normally the control grid of this tube is biased to prevent the tube from firing until a positive potential is applied to the conductor 252. However, when the called line answers and a positive potential is produced on the conductor 252, the ring trip tube 1500 fires and a large positive potential is produced on the conductor 253 connected to the cathode of this tube. The ring trip potential produced on the conductor 253 is coupled through the resistor 1655 to the cathode of the ringback tone gate tube 1607 and biases this tube against conduction so that the transmission through the gate tube 1607 of the interrupted ringback tone signal is terminated and the ringing operation at the calling substation B′ ceases. The ring trip potential produced on the conductor 253 is also coupled through the time delay network including the series resistor 1570 and the shunt condenser 1571, to the anode resistor 1572 of the conversation timing warning tone gate tube 1506. The ring trip potential on the conductor 253 is also employed as an enabling bias for the control grid of the party register advancer tube 708 to enable this tube to respond to conversation timing pulses impressed upon the control grid thereof over the conductor 57*a*. Also, the ring trip potential on the conductor 253 is coupled through the condenser 845 and the resistor 846 to the control grid of the primer tube 820 in the party digit register 265. The ring trip potential on the conductor 253 is also coupled through a time delay network, including the series resistor 1660 and the shunt condenser 1661, to the control grid resistor 1662 of the conversation timing control tube 1610 to provide an enabling bias for this tube a predetermined time interval after the called line answers.

Since the party line ringing facilities, including the party digit register 265, are not active after the called line answers and the ringing operation at the called substation B′ is terminated, the party digit register 265 is employed to time out a conversation period of predetermined length, at the end of which conversation period the link 12 is conditioned to inform the calling and called line subscribers that the conversation period is over and that they should hang up. The above conditioning takes place irrespective of any action on the part of the calling and called line subscribers. More specifically, when the called line answers and a ring trip potential is produced on the conductor 253, the primer tube 820 in the party digit register is fired so as to extinguish all of the impulse counting tubes of this register, including the impulse counting tube which remained conductive at the end of the third or party line digit. At the same time that the primer tube 820 is fired the party line advancer tube 708 is conditioned to respond to the conversation timing pulses impressed upon the conductor 57*a*.

The party register advancer circuit 282 is substantially identical to the party register pulser circuit 263 and produces across the common cathode drive resistor 840 in the register 265 large positive register drive pulses in response to each of the conversation timing pulses impressed upon the control grid of the tube 708 when the tube 708 is conditioned to respond thereto by the application of a positive potential to the conductor 253. In this connection it will be recalled that the conversation timing pulses are preferably developed at a rate of approximately forty seconds between each pulse and the impulse counting tubes of the party digit register 265 are fired in sequence at the rate of one such tube for each conversation timing pulse. When the eleventh register drive pulse following initiation of the conversation timing period has extinguished the last counting tube 1030 in the party digit register 265, the positive potential produced at the anode of this tube after the eleventh register drive pulse disappears is transmitted over the conductor 293, through the resistor 1665 and the condenser 1666 to the control grid of the conversation timing control tube 1610, and the potential on the conductor 293 operates to fire the conversation timing control tube 1610 approximately seven minutes after the called line answers. In this connection it will be understood that the conversation timing period may vary by as much as forty seconds depending upon the time at which the conversation timing period is initiated since the conversation timing pulses are continually developed at a rate of one pulse every forty seconds.

When the tube 1610 fires, a large positive potential is produced across the cathode resistor 1670 thereof and this potential is employed to condition the finder connector link 12 so that it informs the calling and called line subscribers that the conversation period is over. In the illustrated embodiment shown in Figs. 2A and 2B of the drawings, the positive potential produced across the resistor 1670 is coupled through the condenser 1671 to the conductor **12*e* and is transmitted over this conductor to the +B switching circuit 201 in the finder 12*a*. In the circuit 201, this positive potential may be impressed upon the cathode of the B+ switch tube in the +B switching circuit 201 so as to extinguish this tube. When the B+ switch tube in the +B switching circuit 201 is extinguished, the positive operating anode potential developed by the circuit 201 is removed from the +B switch conductor 12*c* so that operating anode potential is removed from the coincidence tube circuits in the finder 12*a* and the above enumerated components in the connector 12*b*. Accordingly, the finder-connector link 12** is released from operative association with the calling and called lines at the end of the conversation timing period. Since both the calling and called lines are still off-hook, they will individually call in different finder-connector links and dial tone will be returned to the calling and called lines to inform the subscribers at these lines that the conversation timing period is over and that they should hang up.

In accordance with an alternative embodiment of the conversation timing facilities of the present invention, the subscribers may be informed that the conversation timing period is over without completely releasing the finder-connector link from operative association with the calling and called line. With this arrangement the separate conductor between the finder and the connector in the link 12 is not required, the necessary conditioning of the link 12 being done internally of the connector **12*b*. With this alternative arrangement the positive potential produced across the resistor 1670 is coupled to the busy test circuit 218 in the connector 12*b*** so that the connector is busied even though a connection has previously been established between the calling and called lines and a busy tone signal is returned to the calling line subscriber to inform him that the conversation timing period is over and he should hang up.

More specifically, in accordance with the above-described alternative embodiment of the conversation timing facilities, the positive potential produced across the resistor 1670 is coupled through the condenser 1671 and over the conductor 1675 (illustrated in dotted lines in Figs. 15 and 16) to the cathode of the busy test tube 1501 in the busy test circuit 218. With this arrangement, when the conversation timing control tube 1610 fires a positive pulse is applied to the cathode of the busy test tube 1501 through the condenser 1671 and over the conductor 1675 so that the busy test tube 1501 is extinguished due to the fact that its cathode is raised higher than the anode potential thereof and ionization in the tube ceases. When the busy test tube 1501 is extinguished in the manner described above the busy lock tube 1504 is then permitted to fire since the positive bias normally applied to the cathode resistor 1542 of the tube 1504 is removed when the busy test tube 1501 is extinguished. In this connection it will be recalled that the control grid of the tube 1504 is operated at the potential of the conductor 235 during the call so that when the positive bias is removed from the cathode of the tube 1504 this tube fires.

When the busy lock tube 1504 fires, the flow of anode current through the resistor 1532 thereof biases the control grid of the busy test tube 1501 sufficiently negatively to prevent firing of this tube after the conversation timing control pulse has been transmitted to the cathode of the tube 1501. Accordingly, the connector **12*b* is permanently locked in a busy condition at the end of the conversation timing period. The busy tone gate 1510 is enabled by the busy lock tube 1504 so that a busy tone signal is transmitted to the calling line and the busy gate tube 1502 is biased beyond cut-off so that no busy pulses are impressed upon the conductor 52*a* in the time position of the called line. As a result, the called line 32** calls in a different finder-connector link and dial tone is returned to the called line subscriber of the original call to inform him that the call has been terminated and that he should hang up.

In order to warn the calling and called line subscribers that the call is about to be terminated under the control of the conversation timing facilities of the system, there is provided the conversation timing warning tone circuit 284 which functions to provide a brief 400 cycle tone signal to both the calling and called line subscribers a predetermined time interval before the end of the conversation timing period. More specifically, there is provided the conversation timing warning tone gate tube 1506 to which operating anode potential is applied from the ring trip conductor 253 through the above-described delay network including the resistor 1570 and the condenser 1571. Normally, the cathode of the tone gate tube 1506 is biased positively by means of the voltage divider network including the resistors 1575 and 1576 to prevent this tube from conducting, so that the tube 1506 is normally prevented from transmitting therethrough a 400 cycle warning tone signal impressed upon the control grid thereof over the conductor **58*a***.

Since the next to the last tube 1029 in the party digit register 265 is extinguished approximately forty seconds before the end of the conversation timing period, this tube is employed as a control circuit for the conversation timing warning tone circuit 284. More specifically, the positive pulse produced at the anode of the tube 1029 when this tube is extinguished is transmitted over the conductor 292, through the resistor 1577, through the condenser 1578 and the resistor 1579 to the control grid of the tube 1506 to provide an enabling bias for this tube. When the control grid of the tube 1506 is biased positively in the manner described above, this tube transmits therethrough a warning tone signal, preferably of 400 cycles, which is coupled over the conductor 294 and through the condenser 1450 and the resistor 1451 to the third control grid of the called line out gate tube 1403. Thus, the warning tone signal is transmitted by way of the called line out gate circuit 224 and the distributor 15 to the line circuit 16 associated with the called line to inform the called line subscriber that the conversation timing period is almost over and the call is about to be terminated automatically. The warning tone signal gated by the tube 1506 is also coupled from the anode of this tube through the condenser 1580 and the resistor 1581, and over the conductor 244 to the third control grid of the calling line out gate tube 1305. Accordingly, the warning tone signal is also gated to the calling line subscriber by way of the calling line out gate circuit 226, the distributor 15, and the line circuit 10 to inform the calling subscriber that the conversation timing period is about to be terminated.

The positive potential impressed upon the conductor 292 is transmitted to the control grid of the tube 1506 by way of a differentiation network including the condenser 1578 and the resistor 1582, which network has a time constant of approximately one second. Accordingly, the positive potential produced on the conductor 292 is differentiated and only a positive pulse corresponding to the positive potential rise on this conductor, which is of approximately one second duration, is applied to the control grid of the tube 1506 to enable this tube to transmit therethrough the warning tone signal. The warning tone is thus heard for approximately one second by both the calling and called line subscribers, and since the warning tone signal slowly dies out as the condenser 1578 charges up and the tube 1506 is gradually cut off, the signal resembles the tone produced by a gong.

In the event that a party line substation having assigned thereto the party line digit of "9" is called, the party digit register 265 will be advanced to the stage 1029 during the dialing operation, and when the party at the called line substation answers, the ring trip circuit 221 will fire in the manner described above and the ring trip potential produced on the conductor 253 will also fire the priming tube 820 in the party digit register 265 so as to extinguish the ninth impulse counting tube 1029 therein which remained ignited at the end of the party line digit. It will thus be evident that if no other provision is made, when the ninth tube 1029 is extinguished in the manner described above on a call routed to the ninth party line substation, a positive potential will be produced on the conductor 292 which would enable the warning tone gate tube 1506 and provide a warning tone signal at the start of the conversation period. To prevent this, the anode potential for the tube 1506 is coupled through the time delay network including the resistor 1570 and the condenser 1571 and this delay network has a time constant greater than the one second time constant of the element 1578 and 1582 in the control grid circuit of the tube 1506, so that anode potential is not provided for the tube 1506 until after the positive pulse produced by the differentiation circuit 1578, 1582 in response to extinguishing of the tube 1029 has died out. Accordingly, when the ninth party substation answers and the above-described positive potential is produced on the conductor 292, the warning tone gate tube 1506 is prevented from passing a warning tone signal until shortly before the end of the conversation timing period when the tube 1029 is refired in the manner described in detail above.

It will also be evident that a call routed to the tenth party line substation will cause the last tube 1030 in the party digit register 265 to fire and when the party at the tenth party line substation answers, the ring trip circuit 221 will fire so as to extinguish the tube 1030 in the party digit register 265. If no other facilities were provided, the positive potential produced on the conductor 293 when the tube 1030 is extinguished would operate to fire the conversation timing control tube 1610 as described above and release the link 12 prematurely. However, in accordance with a further feature of the present invention, there is provided a time delay network including the resistor 1660 and the condenser 1661 which has a longer time constant than the differentiation circuit including the condenser 1661 and the resistor 1662 in the control grid circuit of the tube 1610. As a result, the positive enabling potential derived from the ring trip conductor 253 is not impressed upon the control grid of the tube 1610 until after the positive pulse produced by extinguishing the tube 1030 has been reduced in amplitude sufficiently to prevent the tube 1610 from firing. Accordingly, the conversation timing control tube 1610 is not fired when the tenth party answers the call but instead remain non-conductive until the end of the conversation timing period, at which time this tube is fired in the manner described in detail above to release the link 12.

*Distributor 15*

As pointed out in the general description of the system, this circuit is provided for the general purpose of distributing signals derived from the signal sample modulated connector pulses developed in the connectors of the system in the time positions of each pulse frame respectively assigned to the calling and called lines of the system to the line circuits terminating these lines. More specifically, this circuit is capable of distributing signals derived from the signal modulated connector pulses appearing in different time positions on the common distributor channel input conductor 51 to the respective line circuits under the directive control of the connectors **12*b*, 13*b*, 14*b***, etc., embodied in the system.

The distributor 15 may be of the type described in detail in either of the above-identified copending applications, Serial No. 134,974 and Serial No. 205,641. However, it will be understood that a particular type of distributor is designed to operate with a particular type of line circuit. With a line circuit of the type shown in Figs. 11 and 18 it is necessary to use a distributor of the type shown in copending application, Serial No. 205,641, since no provision is made in the line circuit of Figs. 11 and 18 for detecting the signals which are modulated on the connector signal pulses produced on the conductor 51, such detection being accomplished in a distributor of the type shown in copending application, Serial No. 205,641. However, it will be understood that a distributor of the type shown in copending application, Serial No. 134,974, may be employed, wherein no detection of the signal modulated connector signal pulses is performed in the distributor, in which case a line circuit of the type disclosed in that application would also be employed.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In an automatic telephone system, a plurality of lines arranged in two different groups adapted to have different groups adapted to have different classes of service available thereto, means for developing recurrent pulses which identify certain ones of said lines as being in one of said groups, and means in part controlled by said recurrent pulses and in part directively controllable over any calling one of said lines for imposing certain restrictions on the use of the lines in one of said groups without imposing the same restrictions on the use of the lines in the other of said groups.

2. In an automatic telephone system, a first group of lines adapted to have a first class of service, a second group of lines adapted to have a second class of service, means for developing recurrent pulses which identify said lines as being in either said first group or second group, and means at least in part controlled by said recurrent pulses for imposing certain restrictions on the use of the lines in one of said groups without imposing the same restrictions on the use of the lines in the other of said groups.

3. In an automatic telephone system, a plurality of lines having individually assigned thereto different time positions in repetitive time position frames, said lines being divided into at least two different groups adapted to have different classes of service available thereto, means for marking the lines in one of said groups by producing repetitive pulses in the time positions individually assigned thereto, and means at least in part controlled by the pulses developed by said marking means for imposing certain restrictions on the use of the lines in one of said groups without imposing the same restrictions on the use of the lines in another of said groups.

4. In an automatic telephone system, a plurality of lines having individually assigned thereto different time positions in repetitive time position frames, said lines being divided into at least two different groups adapted to have different classes of service available thereto, a plurality of directively controllable line selecting links common to said lines, means including said links for concurrently setting up connections between different pairs of said lines, means marking the lines in one of said groups by producing repetitive pulses in the time positions individually assigned thereto, and means included in each link and controlled in part by the pulses developed by said marking means for imposing certain restrictions on the use of the lines in one of said groups without imposing the same restrictions on the use of the lines in another of said groups incident to the setting up of said connections.

5. In an automatic telephone system, a plurality of lines having individually assigned thereto different time positions in repetitive time position frames, said lines being arranged in at least two different groups adapted to have different classes of service available thereto, units pulse generating means for repetitively generating units pulses in each of said time positions, synchronously operated group pulse generating means for generating a series of group pulses during each pulse frame, each of said group pulses spanning a group of said units pulses, tandem related group and units gate circuits respectively controlled by said group and units pulses, means for transmitting signals derived from said lines through said tandem related gate circuits under the selective control of said group and units pulses, means including said last named means for selectively setting up two-way communication connections between different pairs of said lines, means for marking the lines in one of said groups by selecting those units pulses which occur in the time positions individually assigned thereto, and means controlled in part by said selected units pulses for imposing certain restrictions on the use of the lines in one of said groups without imposing the same restrictions on the use of the lines in another of said groups incident to the setting up of said connections.

6. In an automatic telephone system, a plurality of lines having individually assigned thereto different time positions in repetitive time position frames, said lines being arranged in at least two different groups adapted to have different classes of service available thereto, pulse generating means common to said lines for repetitively generating gating pulses in each of said time positions, signal transmission means controlled in part by said gating pulses for establishing two separate signal transmission channels for the transmission of signals in opposite directions between calling and called ones of said lines, means for marking the lines in one of said groups by selecting those gating pulses which occur in the time positions assigned thereto, and means controlled in part by said selected gating pulses for imposing certain restrictions on the use of the lines in one of said groups without imposing the same restrictions on the use of the lines in another of said groups.

7. In an automatic telephone system, a plurality of lines having individually assigned thereto different time positions in repetitive time position frames, said lines being arranged in at least two different groups adapted to have different classes of service available thereto, units pulse generating means for repetitively generating units pulses in each of said time positions, synchronously operated group pulse generating means for generating a series of group pulses during each pulse frame, each of said group pulses spanning a group of said units pulses, electronic switching apparatus controlled in part by said group and units pulses and directively controllable over any calling one of said lines to set up a two-way communication connection between the calling line and any called one of said lines, means for marking the lines in one of said groups by selecting those units pulses which occur in the time positions individually assigned thereto, and means controlled in part by said selected units pulses for imposing certain restrictions on the use of the lines in one of said groups without imposing the same restrictions on the use of the lines in another of said groups incident to the setting up of said connection.

8. In an automatic telephone system, a plurality of lines having individually assigned thereto different time positions in repetitive time position frames, said lines being arranged in at least two different groups adapted to have different classes of service available thereto, units pulse generating means for repetitively generating units pulses in each of said time positions, synchronously operated group pulse generating means for generating a series of group pulses during each pulse frame, each of said group pulses spanning a group of said units pulses, electronic switching apparatus controlled in part by said group and units pulses and directively controllable over any calling one of said lines to set up a two-way communication connection between the calling line and any called one of said lines, a plurality of mixing buses, means for impressing one or more of said units pulses on one or more of said mixing buses, gating circuits individually associated with each of said mixing buses and sequentially controlled by said group pulses to gate therethrough the units pulses impressed upon the mixing bus associated therewith, and means controlled in part by the units pulses gated by said gating circuits for imposing certain restrictions on the use of the lines in one of said groups without imposing the same restrictions on the use of the lines in another of said groups incident to the setting up of said connection.

9. In an automatic telephone system, a plurality of lines having individually assigned thereto different time positions in repetitive time position frames, said lines being arranged in at least two different groups adapted to have different classes of service available thereto, units pulse generating means for repetitively generating units pulses in each of said time positions, synchronously operated group pulse generating means for generating a series of group pulses during each pulse frame, each of said group pulses spanning a group of said units pulses, electronic switching apparatus controlled in part by said group and units pulses and directively controllable over any calling one of said lines to set up a two-way communication connection between the calling line and any called one of said lines, a mixing bus for each tens digit level occupied by the lines in one of said groups, means for impressing units pulses on said mixing buses in accordance with the units digits of the lines in said one group, gating circuits individually associated with each of said mixing buses and sequentially controlled by said group pulses to gate therethrough those units pulses impressed upon the mixing bus associated therewith which occur during the controlling group pulse, and means controlled in part by the units pulses gated by said gating circuits for imposing certain restrictions on the use of the lines in one of said groups without imposing the same restrictions on the use of the lines in another of said groups incident to the setting up of said connection.

10. In an automatic telephone system, a line identification pulse generator for marking any one of a plurality of lines having individually assigned thereto different time positions in repetitive time position frames as being in a restricted service line group, comprising units pulse generating means for repetitively generating units pulses in each of said time positions, synchronously operated group pulse generating means for generating a series of group pulses during each pulse frame, each of said group pulses spanning a group of said units pulses, a plurality of mixing buses, means connecting one or more of said units pulses to one or more of said mixing buses, gating circuits individually associated with said mixing buses and sequentially controlled by said group gating pulses to gate therethrough the units pulses impressed upon the mixing bus associated therewith, and an output channel common to all of said gating circuits for repeating the units pulses gated thereby to the restricted service components of the system.

11. In an automatic telephone system, a line identification pulse generator for marking any one of a plurality of lines having individually assigned thereto different time positions in repetitive time positon frames as being in a restricted service line group, comprising a group of electron discharge tubes individually corresponding to different groups of said lines, group pulse generating means for successively exciting the tubes of said group with group pulses which span different groups of time positions in each time position frame, a pulse combining matrix including a group of mixing buses individually associated with said tubes and a plurality of units pulse paths, units pulse generating means for successively impressing units pulses on said units pulse paths during each of said group pulses and occurring in the respective time positions spanned by said group pulses, means including a plurality of isolating resistors for connecting different ones of said units pulse paths to one or more of said mixing buses to mark those lines having time positions assigned thereto corresponding to said impressed units pulses, means individually associated with each of said mixing buses for standardizing the amplitude of those units pulses impressed thereon and supplying the standardizing units pulses to the tube associated therewith, and an output channel common to all of said tubes for repeating the units pulses gated thereby to the restricted service components of the system.

12. In an automatic telephone system, a line identification pulse generator for marking any one of a plurality of lines having individually assigned thereto different time positions in repetitive time position frames as being in a restricted service line group, comprising a group of electron discharge tubes individually corresponding to different groups of said lines, each of said tubes being provided with first and second control grids, group pulse generating means for successively exciting the first control grids of said tubes with group pulses which span different groups of time positions in each time position frame, a group of units pulse paths, units pulse generating means for successively impressing units pulses on said units pulse paths during each of said group pulses and occurring in the respective time positions spanned by said group pulses, a group of mixing buses individually corresponding to said tubes, resistance mixing means for connecting said units pulse paths to certain ones of said mixing buses to mark those lines having time positions assigned thereto corresponding to the units pulses impressed on said mixing buses, means individual to said mixing buses for impressing the units pulses appearing thereon on the second control grid of the tube associated therewith, pulse clamping circuits individual to the second control grids of said tubes for clamping said second control grids to a positive potential, thereby to limit the amplitude of said impressed units pulses, and an output channel common to all of said tubes for repeating the units pulses transmitted therethrough to the restricted service components of the system.

13. In an automatic telephone system, a plurality of lines, a plurality of directively controllable electronic line selecting and signal transmission links, electronic means including said links for concurrently providing mutually non-interfering two-way communication connections between different pairs of said lines, a source of periodically recurring conversation timing pulses common to all of said links, electronic means included in each link and responsive to the setting up of a two-way communication connection between the pair of lines with which the link is operatively associated for counting said conversation timing pulses, and electronic means included in each link for releasing said one link after a given number of said conversation timing pulses have been counted by said last-named means.

14. In an automatic telephone system, a plurality of lines having individually assigned thereto different time positions in repetitive time position frames, a finder-selector link including a finder and a selector, multiplexer means responsive to the initiation of a call on one of said lines for transmitting pulses to said selector in the time position assigned to the calling line, means in said finder for conditioning said selector to respond to multiplexer pulses appearing in the time position assigned to the calling line, and means in said selector for disabling said last-named means after a conversation timing interval has elapsed.

15. In an automatic telephone system, a plurality of lines having individually assigned thereto different time positions in repetitive time position frames, a finder-selector link including a finder and a selector, a pulse path common to said lines and extending to both said finder and said selector, multiplexer means responsive to the initiation of a call on one of said lines for transmitting pulses over said pulse path in the time position assigned to the calling line, means in said finder responsive to said pulses for supplying operating potentials to at least a part of the components of said selector, thereby to condition said selector to respond to multiplexer pulses appearing on said channel in the time position assigned to the calling line, and means in said selector for disabling said last-named means after a conversation timing interval has elapsed.

16. In an automatic telephone system, a plurality of lines having individually assigned thereto different time positions in repetitive time position frames, a finder-selector link including a finder and a selector, a pulse path common to said lines and extending to both said finder and said selector, multiplexer means responsive to the initiation of a call on one of said lines for transmitting pulses over said pulse path in the time position assigned to the calling line, means in said finder responsive to said pulses for supplying operating potentials to at least a part of the components of said selector, thereby to condition said selector to respond to multiplexer pulses appearing on said channel in the time position assigned to the calling line, and means in said selector and responsive to multiplexer pulses appearing on said pulse path in the time position assigned to the called line for disabling said last-named means after a conversation timing interval has elapsed.

17. In an automatic telephone system, a plurality of lines having individually assigned thereto different time positions in repetitive time position frames, an electronic multiplexer for sampling signals produced on said lines in the time positions individually assigned thereto, an electronic distributor for distributing signal samples to said lines in the time positions individually assigned to said lines, a plurality of line selecting and signal transmission links adapted to be operatively associated with calling ones of said lines one at a time, each of said links being directively controllable over any calling line with which it is operatively associated to deliver pulses carrying signal samples derived from the calling line to said distributor in the time position assigned to any called one of said lines and to deliver pulses carrying signal samples derived from the called line to said distributor in the time position assigned to the calling line, means including said links for transmitting signal samples from said multiplexer to said distributor, and means included in each of said links for modulating said pulses with a warning tone signal a given time interval after the called line answers.

18. In an automatic telephone system, a plurality of lines having individually assigned thereto different time positions in repetitive time position frames, an electronic multiplexer for sampling signals produced on said lines in the time positions individually assigned thereto, an electronic distributor for distributing signal samples to said lines in the time positions individually assigned to said lines, a plurality of line selecting and signal transmission links adapted to be operatively associated with calling ones of said lines one at a time, each of said links being directively controllable over any calling line with which it is operatively associated to deliver pulses carrying signal samples derived from the calling line to said distributor in the time position assigned to any called one of said lines and to deliver pulses carrying signal samples derived from the called line to said distributor in the time position assigned to the calling line, means including said links for transmitting signal samples from said multiplexer to said distributor, and means included in each of said links and responsive to the transmission of pulses from said multiplexer in the time position assigned to the called line for modulating said pulses with a warning tone signal a given time interval after the called line answers.

19. In an automatic telephone system, a plurality of lines having individually assigned thereto different time positions in repetitive time position frames, an electronic multiplexer for sampling signals produced on said lines in the time positions individually assigned thereto, an electronic distributor for distributing signal samples to said lines in the time positions individually assigned to said lines, a plurality of line selecting and signal transmission links adapted to be operatively associated with calling ones of said lines one at a time, each of said links being directively controllable over any calling line with which it is operatively associated to deliver pulses carrying signal samples derived from the calling line to said distributor in the time position assigned to any called one of said lines and to deliver pulses carrying signal samples derived from the called line to said distributor in the time position assigned to the calling line, means including said links for transmitting signal samples from said multiplexer to said distributor, means included in each of said links and responsive to the transmission of pulses from said multiplexer in the time position assigned to the called line operatively associated therewith for initiating a conversation timing cycle, and means included in each of said links for rendering the said link inoperative to deliver pulses to said distributor in the time position assigned to the called line at the end of said conversation timing cycle.

20. In an automatic telephone system, a plurality of lines having individually assigned thereto different time positions in repetitive time position frames, an electronic multiplexer for sampling signals produced on said lines in the time positions individually assigned thereto, an electronic distributor for distributing signal samples to said lines in the time positions individually assigned to said lines, a plurality of line selecting and signal transmission links adapted to be operatively associated with calling ones of said lines one at a time, each of said links being directively controllable over any calling line with which it is operatively associated to deliver pulses carrying signal samples derived from the calling line to said distributor in the time position assigned to any called one of said lines and to deliver pulses carrying signal samples derived from the called line to said distributor in the time position assigned to the calling line, means including said links for transmitting signal samples from said multiplexer to said distributor, means included in each of said links and responsive to the transmission of pulses from said multiplexer in the time position assigned to the called line operatively associated therewith for initiating a conversation timing cycle, and means included in each of said links for modulating the pulses delivered to said distributor in the time position assigned to the calling line operatively associated therewith with a supervisory tone signal and concurrently rendering the link inoperative to deliver pulses to said distributor in the time position assigned to the called line at the end of said conversation timing cycle.

21. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switching directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, and means responsive to the transmission of pulses through said third pulse gating means in the time position assigned to the called line for developing a control potential after a given conversation timing interval has elapsed.

22. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switching directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, means responsive to the transmission of pulses through said third pulse gating means in the time position assigned to the called line for modulating the pulses gated to said output channel by said second pulse gating means in the time position assigned to the called line with a warning tone signal after a first time interval has elapsed, and means for developing a control potential a given time interval after said first time interval.

23. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, fourth pulse gating means controlled in accordance with the identity of the calling line for gating pulses to said pulse output channel in the time position assigned to the calling line, and means responsive to the transmission of pulses through said third pulse gating means for modulating the pulses gated to said output channel by said second and fourth pulse gating means with a warning tone signal after a given time interval has elapsed.

24. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, fourth pulse gating means controlled in accordance with the identity of the calling line for gating pulses to said pulse output channel in the time position assigned to the calling line, means responsive to the transmission of pulses through said third pulse gating means in the time position assigned to the called line for developing a control potential after a given conversation timing interval has elapsed, and means responsive to said control potential for modulating the pulses gated to said output channel by said fourth pulse gating means in the time position assigned to the calling line with a supervisory tone signal.

25. In an automatic telephone system which includes a plurality of lines having individually assigned thereto different time positions in repetitive time position frames, an impulse responsive signal repeating selector provided with a pulse input channel, a busy pulse channel, and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the calling line, a busy test circuit for comparing the time position of said selector pulses with the time positions of busy pulses fed to said selector over said busy pulse channel, thereby to determine whether the called line is idle or busy, second pulse gating means jointly controlled by said busy test circuit and said selector pulses for gating pulses to said output channel in the time position assigned to the called line in the event said selector pulses are not coincident with busy pulses fed to said selector over said busy pulse channel, third pulse gating means controlled by said selector pulses for admitting pulses to said selector from said pulse input channel in the time position assigned to the called line, fourth pulse gating means controlled in accordance with the identity of the calling line for gating pulses to said pulse output channel in the time position assigned to the calling line, means responsive to the transmission of pulses through said third pulse gating means in the time position assigned to the called line for developing a control potential after a given conversation timing interval has elapsed, means responsive to said control potential for rendering said busy test circuit inoperative, and means operative when said busy test circuit is rendered inoperative by said last named means for modulating the pulses gated to said output channel by said fourth pulse gating means with a busy tone signal.

26. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, a string of electric discharge tubes of the gaseous discharge type, means responsive to the transmission of pulses through said third pulse gating means in the time position assigned to the called line for firing the tubes of said string in sequence at a predetermined low frequency rate, and means responsive to the firing of the last tube in said string for developing a conversation timing control potential.

27. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, a string of electric discharge tubes of the gaseous discharge type, means responsive to the transmission of pulses through said third pulse gating means in the time position assigned to the called line for firing the tubes of said string in sequence at a predetermined low frequency rate, means responsive to the firing of one of said tubes other than the last tube in said string for modulating the pulses gated by said second pulse gating means with a warning tone signal, and means responsive to the firing of the last tube in said string for developing a conversation timing control potential.

28. In an automatic telephone system which includes a plurality of lines having individually assigned thereto different time positions in repetitive time position frames and means common to said lines for developing periodically recurring conversation timing pulses, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, a string of electric discharge tubes of the gaseous discharge type, means responsive to the transmission of pulses through said third pulse gating means in the time position assigned to the called line and controlled by said conversation timing pulses for firing the tubes of said string in sequence at the rate of one tube for each conversation timing pulse, and means responsive to the firing of the last tube in said string for developing a conversation timing control potential.

29. In an automatic telephone system which includes a plurality of lines having individually assigned thereto different time positions in repetitive time position frames, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, a string of electric discharge tubes of the gaseous discharge type, means including said string of tubes for selecting a party line ringing signal and modulating the pulses gated to said output channel by said second pulse gating means with the selected party line ringing signal, means operative after selection of said party line ringing signal and responsive to the transmission of pulses through said third pulse gating means in the time position assigned to the called line for firing the tubes of said string in sequence at a predetermined low frequency rate, and means responsive to the firing of the last tube in said string for developing a conversation timing control potential.

30. In an automatic telephone system which includes a plurality of lines having individually assigned thereto different time positions in repetitive time position frames and means common to said lines for developing periodically recurring conversation timing pulses, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means responsive to each interruption in pulse flow through said first pulse gating means for developing selector pulses in the time position assigned to the called line, second pulse gating means controlled by said selector pulses for gating pulses to said output channel in the time position assigned to the called line, third pulse gating means controlled by said selector pulses for admitting pulses to said selector from said pulse input channel in the time position assigned to the called line, a string of electric discharge tubes of the gaseous discharge type, means including said string of tubes for selecting a party line ringing signal and modulating the pulses gated to said output channel by said second pulse gating means with the selected party line ringing signal, means operative after selection of said party line ringing signal and responsive to the transmission of pulses through said third pulse gating means in the time position assigned to the called line and controlled by said conversation timing pulses for firing the tubes of said string in sequence at the rate of one tube for each conversation timing pulse, and means responsive to the firing of the last tube in said string for developing a conversation timing control potential.

31. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, means including a third digit register responsive to the control pulses produced during a third successive digit for selecting one of a plurality of different supervisory tone signals which respectively correspond to said different ringing signals, means for modulating the pulses gated to said output channel by said second pulse gating means with said selected supervisory tone signal, third pulse gating means controlled by said selector pulses for admitting pulses to said selector from said pulse input channel in the time position assigned to the called line, and means including said third digit register and responsive to the transmission of pulses through said third pulse gating means for developing a control potential after a given conversation timing interval has elapsed.

32. In an automatic telephone system which includes a plurality of lines having individually assigned thereto different time positions in repetitive time position frames, at least some of said lines having a plurality of sub-stations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, means including a third digit register responsive to the control pulses produced during a third successive digit for selecting one of a plurality of different supervisory tone signals which respectively correspond to said different ringing signals, means for modulating the pulses gated to said output channel by said second pulse gating means with said selected supervisory tone signal, third pulse gating means controlled by said selector pulses for admitting pulses to said selector from said pulse input channel in the time position assigned to the called line, means responsive to the transmission of pulses through said third pulse gating means for zeroing said third digit register, means including said third digit register and operative after said third digit register has been zeroed for developing a control potential after a given conversation timing interval has elapsed.

33. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, means responsive to the transmission of pulses through said third pulse gating means for extinguishing all of the tubes of said third digit register, means operative after all of said tubes have been extinguished for firing the tubes of said string one at a time and at a predetermined rate, and means responsive to firing of the last tube of said string by said last-named means for developing a conversation timing control potential.

34. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, means responsive to the transmission of pulses through said third pulse gating means for extinguishing all of the tubes of said third digit register, means operative after all of said tubes have been extinguished for firing the tubes of said string one at a time and at a predetermined rate, means responsive to firing of one of said tubes other than the last tube in said string for modulating the pulses gated by said second pulse gating means with a warning tone signal, and means responsive to firing of the last tube of said string by said next to last-named means for developing a conversation timing control potential.

35. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel, and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, means responsive to the transmission of pulses through said third pulse gating means for extinguishing all of the tubes of said third digit register, means operative after all of said tubes have been extinguished for firing the tubes of said string one at a time and at a predetermined rate, means responsive to firing of the last tube of said string by said last-named means for developing a conversation timing control potential, and means controlled by said control potential for terminating the transmission of pulses through at least one of said pulse gating means and extinguishing all of the tubes of said third digit register.

36. In an automatic telephone system which includes a plurality of lines having individually assigned thereto different time positions in repetitive time positon frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, register pulser means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, means responsive to the transmission of pulses through said third pulse gating means for extinguishing all of the tubes of said third digit register, register advancer means controlled by said last-named means for firing the tubes of said string independently of said register pulser means and at a predetermined rate, and means responsive to firing of the last tube of said string by said last-named means for developing a conversation timing control potential.

37. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a spring of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, means responsive to the transmission of pulses through said third pulse gating means for extinguishing all of the tubes of said third digit register, means operative after all of said tubes have been extinguished for firing the tubes of said string one at a time and at a predetermined rate, a normally closed warning tone gate circuit, means responsive to firing of one of said tubes other than the last tube in said string for opening said warning tone gate circuit to gate a warning tone signal therethrough, means for modulating the pulses gated by said second pulse gating means with said gated warning tone signal, and means responsive to firing of the last tube of said string for developing a conversation timing control potential.

38. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identitfy of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, a ring trip circuit responsive to the transmission of pulses through said third pulse gating means in the time position assigned to the called line for developing a ring trip potential, a normally closed warning tone gate circuit, means controlled by said ring trip potential for extinguishing all of the tubes in said string, register advancer means controlled in part by said ring trip potential for firing the tubes of said string one at a time and at a predetermined rate, means responsive to firing of one of said tubes other than the last tube of said string by said register advancer means for opening said warning tone gate circuit to gate therethrough a warning tone signal, means for modulating the pulses gated by said second pulse gating means with said gated warning tone signal, and means responsive to firing of the last tube of said string by said register advancer means for developing a conversation timing control potential.

39. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admiting pulses to said selector from said pulse input channel in the time position assigned to the called line, a ring trip circuit responsive to the transmission of pulses through said third pulse gating means in the time position assigned to the called line for developing a ring trip potential, a normally closed warning tone gate circuit, means controlled by said ring trip potential for extinguishing all of the tubes in said string, register advancer means controlled in part by said ring trip potential for firing the tubes of said string one at a time and at a predetermined rate, means responsive to firing of one of said tubes other than the last tube of said string by said register advancer means for opening said warning tone gate circuit to gate therethrough a warning tone signal, means for modulating the pulses gated by said second pulse gating means with said gated warning tone signal, means for preventing said warning tone gate circuit from opening when the tube controlling said warning tone gate circuit is fired during selection of said supervisory tone signal, and means responsive to firing of the last tube of said string by said register advancer means for developing a conversation timing control potential.

40. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, a ring trip circuit responsive to the transmission of pulses through said third pulse gating means for developing a ring trip potential, priming means controlled by said ring trip potential for extinguishing all of the tubes in said string, register advancer means controlled in part by said ring trip potential for firing the tubes of said string one at a time and at a predetermined slow rate, a warning tone gate circuit, means for applying said ring trip potential to said warning tone gate circuit as operating potential therefor, means responsive to firing of one of said tubes other than the last tube of said string by said register advancer means for unblocking said warning tone gate circuit for a brief warning tone interval, thereby to gate a warning tone signal of corresponding duration therethrough, means for modulating the pulses gated by said second pulse gating means with said gated warning tone signal, means for delaying the application of the ring trip potential developed by said ring trip circuit to said warning tone gate circuit for a period longer than said warning tone interval, thereby to prevent said warning tone gate circuit from opening when the tube controlling said warning tone gate circuit is fired during selection of said supervisory tone signal, and means responsive to firing of the last tube of said string by said last-named means for developing a conversation timing control potential.

41. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, a ring trip circuit responsive to the transmission of pulses through said third pulse gating means for developing a ring trip potential, means controlled by said ring trip potential for extinguishing all of said tubes and then refiring said tubes one at a time and at a predetermined slow rate, a conversation timing control tube, means for applying said ring trip potential to said control tube as enabling bias therefor, and means responsive to firing of the last tube in said string for firing said conversation timing control tube.

42. In an automatic telephone system which includes a plurality of lines having individually assigned thereto different time positions in repetitive time position frames, at least some of said lines having a plurality of substations associated therewith which may be signalled by different party line ringing signals, an impulse responsive signal repeating selector provided with a pulse input channel and a pulse output channel, and including, in combination, first pulse gating means controlled in accordance with the identity of a calling one of said lines for gating pulses to said selector from said pulse input channel in the time position assigned to the calling line, the pulse flow from said pulse input channel through said first pulse gating means to said selector being interrupted during a portion of each switch directing impulse transmitted over the calling line, means for developing a control pulse in response to each interruption in pulse flow through said first pulse gating means, means including a pair of digit registers successively responsive to the control pulses produced by said control pulse means during two successive digits for developing selector pulses in the time position assigned to the called line, second pulse gating means controlled by said selector pulses for gating pulses to said output channel in the time position assigned to the called line, a third digit register including a string of electric discharge tubes of the gaseous discharge type, means controlled by the control pulses produced during a third successive digit for firing the tubes of said string at the rate of one tube for each control pulse, tone gate circuits individually controlled by said tubes and each operative to gate a different supervisory tone signal when the tube controlling the circuit is fired, means for modulating the pulses gated to said output channel by said second pulse gating means with said selected supervisory tone signal, third pulse gating means controlled by said selector pulses for admitting pulses to said selector from said pulse input channel in the time position assigned to the called line, a ring trip circuit responsive to the transmission of pulses through said third pulse gating means for developing a ring trip potential, means controlled by said ring trip potential for extinguishing all of said tubes and then refiring said tubes one at a time and at a predetermined slow rate, a conversation timing control tube, means for applying said ring trip potential to said control tube as enabling bias therefor, means responsive to firing of the last tube in said string for firing said conversation timing control tube, and means for delaying the application of said ring trip potential to said control tube to prevent said control tube from firing when the last tube in said string is fired during selection of said supervisory tone signal.

43. In an automatic telephone system, a plurality of lines arranged in two different groups adapted to have different classes of service available thereto, means for developing recurrent pulses which identify certain ones of said lines as being in one of said groups, and means in part controlled by said recurrent pulses and in part directively controllable over any calling one of said lines for restricting the service available to the lines in one of said groups by limiting the time duration of calls initiated therefrom.

44. In an automatic telephone system, a plurality of lines arranged in two different groups adapted to have different classes of service available thereto, means for developing recurrent pulses which identify certain ones of said lines as being in one of said groups, means for setting up telephonic connections between calling and called ones of said line, and means controlled in part by said recurrent pulses and operable independently of the calling and called line subscribers for terminating a call a predetermined time interval after the call is initiated.

45. In an automatic telephone system, a plurality of lines arranged in two different groups adapted to have different classes of service available thereto, means for developing recurrent pulses which identify certain ones of said lines as being in one of said groups, means for setting up telephonic connections between calling and called ones of said line, and means controlled in part by said recurrent pulses for transmitting a warning tone signal to the calling and called subscribers involved in calls initiated by calling lines in one of said groups to inform these calling and called subscribers that the call therebetween has been in progress for a given time interval.

46. In an automatic telephone system, a plurality of lines arranged in two different groups adapted to have different classes of service available thereto, means for developing recurrent pulses which identify certain ones of said lines as being in one of said groups, means for setting up telephonic connections between calling and called ones of said line, means controlled in part by said recurrent pulses for terminating the call a predetermined time interval after the call is initiated on a line in one of said groups, and means controlled in part by said recurrent pulses for thereafter transmitting a supervisory signal over at least one of the calling and called lines to advise the subscriber at said one line that the call has been terminated.

References Cited in the file of this patent

UNITED STATES PATENTS

| | | |
|---|---|---|
| 2,490,833 | Ransom | Dec. 13, 1949 |
| 2,544,944 | Wicks | Mar. 13, 1951 |
| 2,570,274 | Ransom | Oct. 9, 1951 |
| 2,585,022 | Lewis | Feb. 12, 1952 |
| 2,592,784 | Bakker | Apr. 15, 1952 |
| 2,602,121 | Lomax | July 1, 1952 |
| 2,613,279 | Hurault | Oct. 7, 1952 |
| 2,619,548 | Lesti | Nov. 25, 1952 |
| 2,633,496 | Duhamel | Mar. 31, 1953 |
| 2,638,505 | Van Mierlo et al. | May 12, 1953 |
| 2,652,455 | Lomax | Sept. 15, 1953 |
| 2,754,367 | Levy | July 10, 1956 |

UNITED STATES PATENT OFFICE

CERTIFICATE OF CORRECTION

April 14, 1959

Patent No. 2,882,341

Robert B. Trousdale

It is hereby certified that error appears in the printed specification of the above numbered patent requiring correction and that the said Letters Patent should read as corrected below.

Column 84, lines 45 and 46, strike out "adapted to have different groups"; column 98, line 26, for "spring" read -- string --; line 61, for "identitfy" read -- identity --.

Signed and sealed this 15th day of December 1959.

(SEAL)

Attest:

KARL H. AXLINE

Attesting Officer

ROBERT C. WATSON

Commissioner of Patents